United States Patent
Graves

(10) Patent No.: US 9,654,849 B2
(45) Date of Patent: *May 16, 2017

(54) SYSTEM AND METHOD FOR PHOTONIC SWITCHING

(71) Applicant: Huawei Technologies Co., Ltd., Shenzhen (CN)

(72) Inventor: Alan Frank Graves, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/713,403

(22) Filed: May 15, 2015

(65) Prior Publication Data

US 2016/0337725 A1    Nov. 17, 2016

(51) Int. Cl.
| | |
|---|---|
| H04J 14/00 | (2006.01) |
| H04Q 11/00 | (2006.01) |
| H04L 12/56 | (2006.01) |
| H04L 12/875 | (2013.01) |

(52) U.S. Cl.
CPC ....... H04Q 11/0003 (2013.01); H04L 45/741 (2013.01); H04L 47/56 (2013.01); H04Q 11/0005 (2013.01); H04Q 2011/005 (2013.01); H04Q 2011/0045 (2013.01)

(58) Field of Classification Search
CPC .......... H04Q 11/0005; H04Q 11/0066; H04Q 11/0003; H04Q 2011/0024; H04Q 2011/0045; H04Q 2011/005; G02B 6/3546; G02B 6/3556; G02B 6/3558; G02B 6/356; H04L 47/56; H04L 45/741; H04L 49/356; H04L 49/357

USPC ......... 398/45, 51, 54, 49, 50, 46, 48, 52, 56
See application file for complete search history.

(56) References Cited

U.S. PATENT DOCUMENTS

| | | | | |
|---|---|---|---|---|
| 7,139,270 B1 * | 11/2006 | Fatehi | ............... | H04J 3/1617 370/392 |
| 7,301,954 B1 * | 11/2007 | Chu | ............... | H04L 49/90 370/230 |
| 7,369,555 B2 * | 5/2008 | Jarl | ............... | H04L 12/5601 370/389 |
| 8,971,321 B2 * | 3/2015 | Graves | ............... | H04Q 11/0005 370/389 |

(Continued)

FOREIGN PATENT DOCUMENTS

| | | |
|---|---|---|
| CN | 1339890 A | 3/2002 |
| CN | 101997761 A | 3/2011 |

(Continued)

OTHER PUBLICATIONS

Benson, T., et al., "Understanding Data Center Traffic Characteristics," WREN '09, Barcelona, Spain, Aug. 21, 2009, 8 pgs.

*Primary Examiner* — Hibret Woldekidan
(74) *Attorney, Agent, or Firm* — Slater Matsil, LLP

(57) ABSTRACT

A method includes receiving a first packet payload, and where the first packet payload originates from a first top-of-rack switch (TOR) and receiving a second packet payload, where the second packet payload originates from a second TOR. The method also includes placing the first packet payload in a transport container and placing the second packet payload in the transport container. Additionally, the method includes transmitting the transport container to a photonic switch.

25 Claims, 43 Drawing Sheets

(56) References Cited

U.S. PATENT DOCUMENTS

| | | | |
|---|---|---|---|
| 9,282,384 B1* | 3/2016 | Graves | H04Q 11/0005 |
| 2002/0031133 A1* | 3/2002 | McWilliams | H04L 12/5601 |
| | | | 370/401 |
| 2013/0229916 A1* | 9/2013 | Isobe | H04L 1/1854 |
| | | | 370/230 |
| 2014/0269351 A1* | 9/2014 | Graves | H04L 49/10 |
| | | | 370/250 |
| 2014/0317616 A1* | 10/2014 | Chu | G06F 9/45533 |
| | | | 718/1 |
| 2014/0334818 A1* | 11/2014 | Mehrvar | H04Q 11/0066 |
| | | | 398/51 |
| 2014/0334821 A1* | 11/2014 | Mehrvar | H04Q 11/0005 |
| | | | 398/54 |
| 2015/0063353 A1* | 3/2015 | Kapadia | H04L 45/745 |
| | | | 370/392 |
| 2015/0304164 A1* | 10/2015 | Goetje | H04L 41/0806 |
| | | | 370/255 |
| 2015/0312659 A1* | 10/2015 | Mehrvar | H04Q 11/0062 |
| | | | 398/45 |
| 2016/0037240 A1* | 2/2016 | Yang | H04Q 11/0005 |
| | | | 398/45 |
| 2016/0044393 A1* | 2/2016 | Graves | H04Q 11/0003 |
| | | | 398/51 |
| 2016/0337723 A1* | 11/2016 | Graves | H04Q 11/0003 |
| 2016/0337724 A1* | 11/2016 | Graves | H04Q 11/0003 |

FOREIGN PATENT DOCUMENTS

| | | | |
|---|---|---|---|
| EP | 2466769 A1 | 6/2012 | |
| JP | 2001326687 A | 11/2001 | |
| WO | 2014183126 A1 | 11/2014 | |

* cited by examiner

FIG. 36A

MACROMODULE WITH 0.5*N*M*P P → 1
SELECTORS, ASSOCIATED CM AND P
PORT COLLISION DETECTION BLOCKS

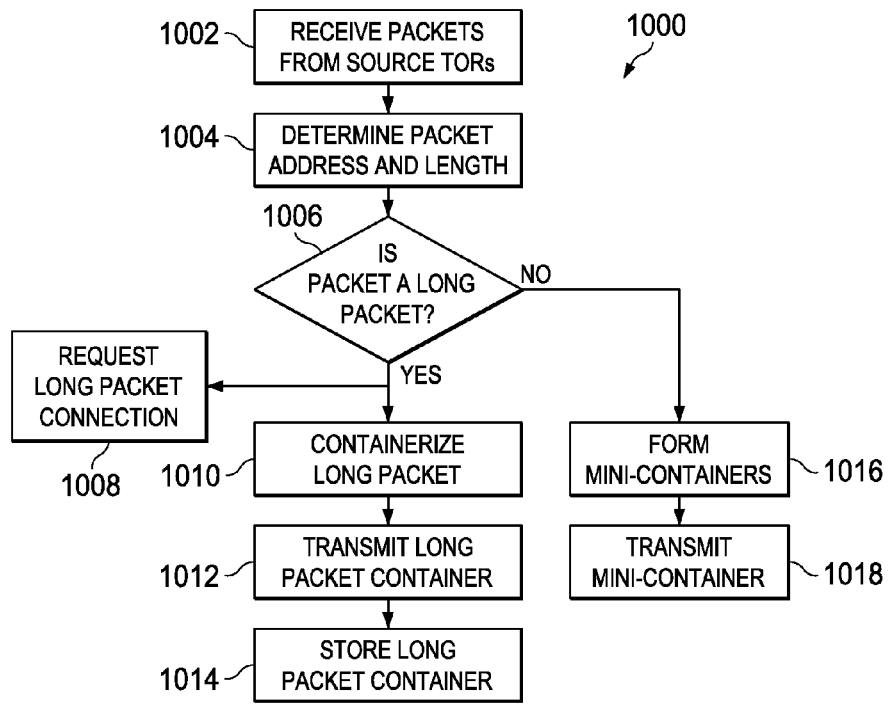
FIG. 39
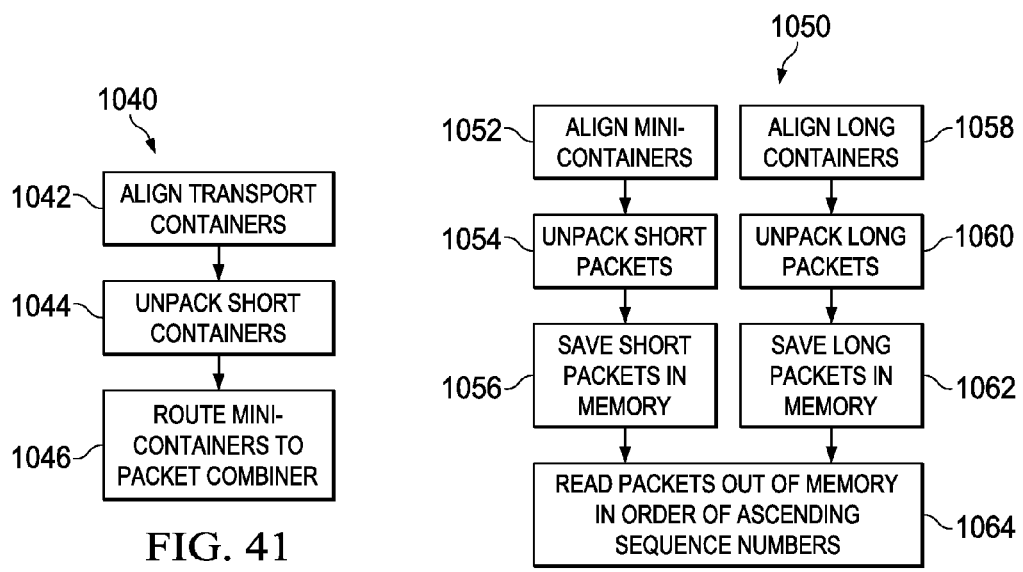
FIG. 41
FIG. 42

SYSTEM AND METHOD FOR PHOTONIC SWITCHING

TECHNICAL FIELD

The present invention relates to a system and method for photonics, and, in particular, to a system and method for photonic switching.

BACKGROUND

Data centers route massive quantities of data. Currently, data centers may have a throughput of 5-10 terabytes per second, which is expected to increase in the future. Data centers contain huge numbers of racks of servers, racks of storage devices, and other racks often with top-of-rack (TOR) switches, which are interconnected via massive centralized packet switching resources. In data centers, electrical packet switches are used to route data. However, electrical packet switches have capacity limitations. To overcome those capacity issues, it may be desirable to use an optical packet switch in a data center.

Optical burst mode switches collect batches of packets from each source TOR which are destined for the same destination TOR across a switch and map them into multi-packet containers or bursts of data, which are transmitted across the switch. These containers may be many times the length of the longest packets. Burst mode switches work well when the per-destination packet rate is high, because the containers fill rapidly, even with a short container timeout. However, when a burst mode switch is used within a data center for switching between top of rack (TOR) switches, the traffic may be fragmented, and containers may be slow to fill. This may lead to a long fill period for some containers, with a long-timeout period, which may introduce delay and/or containers timing out, leading to partially filled or almost empty containers being transmitted, which may significantly reduce bandwidth efficiency and traffic data throughput.

SUMMARY

An embodiment method includes receiving a first packet payload, and where the first packet payload originates from a first top-of-rack switch (TOR) and receiving a second packet payload, where the second packet payload originates from a second TOR. The method also includes placing the first packet payload in a transport container and placing the second packet payload in the transport container. Additionally, the method includes transmitting the transport container to a photonic switch.

An embodiment photonic switching system including a first photonic switching fabric having a first plurality of input ports, each of the first plurality of input ports coupled to one of a plurality of top-of-rack switches (TORs) and a second photonic switching fabric having a second plurality of input ports, each of the second plurality of input ports coupled to a TOR group, each TOR group including a subset of the plurality of TORs.

An embodiment method includes receiving a transport container, where the transport container contains a first packet payload and a second packet payload and extracting the first packet payload from the transport container. The method also includes extracting the second packet payload from the transport container and routing the first packet payload to a first top-of-rack switch (TOR). Additionally, the method includes routing the second packet payload to a second TOR.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following description taken in conjunction with the accompanying drawings, in which:

FIGS. 36A-D illustrate an embodiment control system for an ultra-fast photonic switch;

FIG. 39 illustrates a flowchart of an embodiment method of splitting photonic packets;

FIG. 41 illustrates a flowchart of an embodiment method of routing mini-containers; and FIG. 42 illustrates a flowchart of an embodiment method of combining packet streams.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

It should be understood at the outset that although an illustrative implementation of one or more embodiments are provided below, the disclosed systems and/or methods may be implemented using any number of techniques, whether currently known or not. The disclosure should in no way be limited to the illustrative implementations, drawings, and techniques illustrated below, including the exemplary designs and implementations illustrated and described herein, but may be modified within the scope of the appended claims along with their full scope of equivalents.

An embodiment photonic packet switching system splits incoming packets into two streams based on a threshold packet length, which may be pre-set, adjustable, or dynamic. The identification or addressing of top-of-rack switches (TORs) is split into two parts: a group address for a group of TORs, for example 8 or 16 TORs; and an individual TOR address within that group. The long packets are transmitted to a long packet photonic switch in their own long packet containers on a source TOR-to-destination TOR basis using both the individual TOR address and the TOR group address. Multiple short packets from the same or different top-of-rack switches (TOR) in the same source TOR group destined for the same destination TOR group are combined in a short packet transport structure with each packet associated with the individual source and destination TOR within the same source and destination group. The short packet transport structure is then switched by a short packet photonic switch, which switches based on the group address and which may have fewer ports than the long packet photonic switch in a ratio of the number of TORs per group. Mini-containers are extracted from the short packet transport structure after photonic switching, and the mini-containers are directed to the appropriate destination TOR. The mini-container streams are then combined with the long packet containers.

Figure 1:
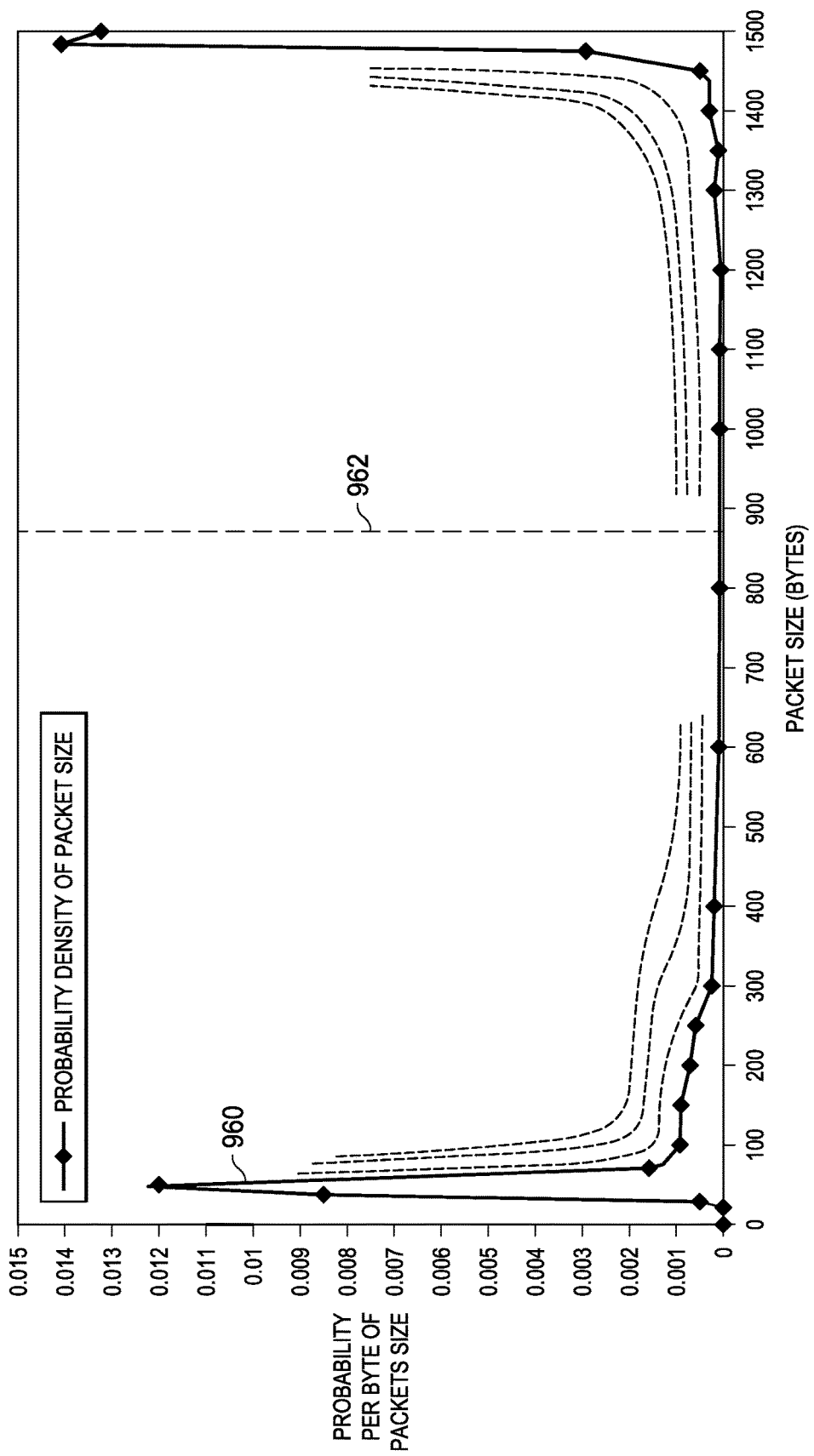
FIG. 1 illustrates a graph of a typical distribution of packet size in a data center.

For a system with a maximum packet size of 1500 bytes, the threshold may be between about 400 bytes and about 1000 bytes. The data packet length for traffic in a data center may be bimodal, with many packets at or close to the maximum packet length, and many packets having a very small packet size. FIG. 1 illustrates a graph of the bimodal distribution of traffic based on an example data center. Curve 960 shows the distribution of data, and line 962 shows the threshold between long packets and short packets. The threshold may be varied from system to system or dynamically based on traffic. Packets may be separated by size for different treatment of long packets and short packets.

In the bimodal packet density distribution over packet length, the portion of the distribution above the threshold length is dominated by packets close to the maximum length and the portion of the distribution below the threshold length is dominated by packets at close to the minimum length. Thus, different approaches may be used for the two sets of packet lengths. When the packet stream is dominated by large packets in the packet range, with a low probability of shorter packets, individual fixed length containers matched in payload capacity to the longest packets may be used. Because the longest length packets dominate the distribution, those few packets which are of a shorter length may be padded out to fill the container without seriously impacting the overall efficiency, because the rate of occurrence of these packets is low. On the other hand, packets below the threshold are dominated by the shortest packets. Short containers may be used, where short packets are assembled into multi-packet containers. The containers may be between about 30 ns and about 120 ns, or shorter. Thus, the packets above the threshold are individually padded out to the length of a maximum length packet and encapsulated in a fixed length container, with one packet per container. The long packets are switched as individual packets, which may be switched, for example, by a large port count space switch operating at 100 Gb/s per port, with a frame time of around 100 ns to around 120 ns, or a 40 Gb/s per port rate with a frame time of around 250 ns to around 300 ns. The packets above the threshold typically make up about 85% to about 95% of the total bandwidth depending on the threshold (although a smaller percentage of the number of packets). The short packet traffic typically only carries about 5% to about 15% of the bandwidth (although a larger percentage of the number of packets). The short packets may be mainly from around 50 bytes to around 150 bytes, but include packets up to the threshold length.

Short packet streams may be multiplexed together from multiple TORs in a TOR group before switching the groups on a group-to-group basis, photonically. By multiplexing together the short packet traffic from N TORs, the traffic flow increases into the overall transport container building buffers by N:1. Also, the maximum number of destinations is reduced by a factor of N, reducing the maximum number of buffers by up to N:1. A factor of up to $N^2$ increase in the average container fill rate significantly reduces the slow flow issues, and reduces the incidence of solitary packet flows, because the packets are more likely to be accompanied by other flows within the same group-to-group stream, with $N^2$ being the maximum number of source/destination TOR links per short packet container stream.

Figure 2:
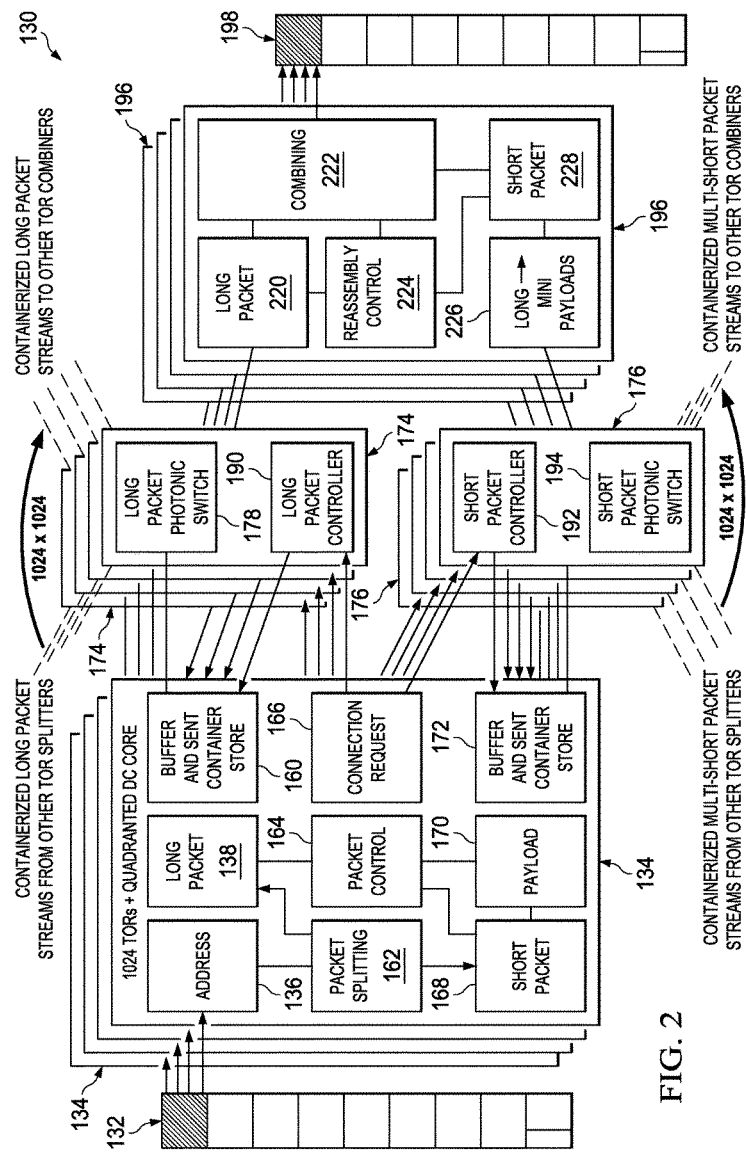
FIG. 2 illustrates an embodiment system with two photonic switching fabrics.

FIG. 2 illustrates photonic switching system 130 for switching optical packets by a separate long packet photonic switch fabric and short packet photonic switch fabric. Long packets and short packets are assembled into similarly sized containers. With 1024 quad-output TORs, four 1024×1024 long packet photonic switches and a companion set of four 1024×1024 short packet photonic switches are used in a quadranted architecture. Packets are transmitted by the 1024 TOR switches 132 to packet splitters 134, where the packet streams are bifurcated into two streams of packets, where one stream contains packets above the set length threshold and the other stream contains packets below the length threshold. The packet splitters are shown in FIG. 2 as being separate from the TOR, but may be integrated into the TOR. The packet splitters create two streams of conditioned packet containers, where the containers in each stream have a specific destination packet combiner. The packet combiners are illustrated as stand-alone devices, but may be integrated into the destination TORs. The packet combiner receives incoming short packet containers and long packet containers from all packet splitters destined for that destination. Also, the packet combiner reassembles the packet flows from the two paths using packet sequence integrity to correctly reconstitute each packet stream, which is then passed into the rest of the TOR. This facilitates the use of large port count fast synchronous photonic switches to switch both packet streams, for thousands of 100 Gb/s ports. For example, a 4096×4096 port photonic switch has a throughput capacity of 400 Tb/s. Four such switches can be used as quadrant switches in a flat (non-hierarchical) data center core to service more than 1.6 Petabits/second (1.6× $10^{15}$ bits/sec.).

The arrival of a packet at the input of the packet splitter 134 indicates that a new long packet container is needed when the packet is a long packet, or that a new short packet container may be needed, depending on whether an unfilled non-timed-out container to the destination is available. The destination TOR address of a packet and the packet length are determined in address module 136 in packet splitters 134. There may be one packet splitter per source TOR. In one example, the destination TOR address and the packet length are determined based on the packet. In another example, the packet splitter is integrated in the source TORs and the destination TOR address and packet length are known. The packet length, address, and packet are sent to splitting block 162.

The packets are separated into a long packet stream and a short packet stream by splitting block 162, where the packet length is compared to the threshold. Packets with a length above the threshold are classified as long packets, while packets with a length less than or equal to the threshold are classified as short packets. A sequence number is assigned to the packet at the source TOR, for reassembly of the packet order for flows to each specific destination TOR from each specific source TOR. Short packets are directed to short packet block 168, while long packets are directed to long packet block 138.

In long packet block 138, long packets are containerized, with one packet placed in the payload, which is padded out to have the maximum packet length, before becoming associated with a container. The container contains the TOR-to-TOR addressing information, although this is not used in the intervening photonic switch, because of the use of advanced signaling of connection requests. The addressing information includes the source TOR address and destination TOR address, the actual packet length which is used for removing the padding in the packet combiner, a cyclic redundancy check (CRC) over the container, and a sequence number, which is used for correctly packet-order sequencing each source TOR-specific data flow in the packet combiner.

Also, the containers may be accelerated, so the container clock rate is higher than the input clock length. The inter-container gap (ICG) or inter-packet gap (IPG) may be increased by time-compressing the container to facilitate the switch being reconfigured between the end of one container and the start of the next container, and to reduce the impact of skew (differences in delay). Acceleration may also be applied because the incidence of some bursts of shorter than maximum length packets may cause a transient increase in container rate, which may be smoothed to a small steady increase by using buffering. There may be residual skew between the packet splitter and the photonic switch(es), and in the photonic switch(es) between switch stages. The destination address is passed to connection request module 166 to set up the long packet switch connection.

When the need for a new long packet container is established, a connection request is transmitted by connection request module 166 to long packet photonic switch controller 190, in long packet photonic switching fabric 174, which sets up the switch connections in long packet photonic switch 178 in parallel with formatting, packing, containerizing, and accelerating the packet in its container.

After sufficient time for the connection to be set up, the long packet container is transmitted to long packet photonic switch 178 for switching to the destination, after rate smoothing from buffer and sent container store 160. The sent container store 160 has an output gating function, which may temporarily halt the container flow, causing the buffers to fill, or causing a dummy container in the flow to be overwritten. Dummy containers are containers with no traffic payload which may be used for various purposes, such as padding out streams under light traffic conditions to avoid buffer under-flow, to carry maintenance messages, or for purposes such as optical link calibration and timing calibration as background tasks. Long packet photonic switch 178 may be a three stage highly dilated Clos photonic switch or a matrixed photonic switch. The long packet container is also written to the storage component of the buffer and sent container store 160. When an acknowledgment message (ACK) is received, the copy of the container is deleted from the sent container store, because receiving an ACK indicates that the original transmitted container was successfully routed. On the other hand, when a negative acknowledgment message (NACK) is received, the stored copy of the container is marked for retransmission.

Some of the containers in the container flow are not valid traffic containers. When packet splitter 134 does not have any long packets arriving and waiting for the containerization process, the packet splitter inserts a dummy packet or dummy container into the flow. The dummy container is passed to long packet photonic switch 178 as part of the normal flow. The switch may discard the dummy container. When a dummy container is generated, it is noted by the controller of the output gating. The gate controller also tracks whether the sent container store is holding a container ready for retransmission. When the dummy container is initiated, a connection request for a new connection for a container in the sent container store is initiated. When there is not a container ready for retransmission, the dummy container may be routed to a destination TOR, for example to the destination TOR which has not been communicated with for the longest to refine the calibration of the optical links through the switch to that TOR, to avoid a protracted training cycle on the front end of every traffic container.

Short containers are mapped into payloads which may carry multiple packets in short packet block 168. The short packet containers are transmitted when they are full or when a time period (the time-out) expires. A timer is triggered by the creation of a new short packet container for a destination which does not already have an open container. The containers are assembled in payload module 170. At the time the container is opened, a request for a container destination connection in a future frame is sent to short packet photonic switch controller 192 in short packet photonic switching fabric 176 from connection request module 166 to set up a connection in short packet photonic switch 194 for the container.

When the container is full or the timer expires, after rate smoothing from buffer and sent container store 172, the container is transmitted to short packet photonic switch 194 for switching to the destination. A copy of the sent short packet container is saved in the storage component of the buffer and sent container store 172. When an ACK is received, the copy of the sent container is discarded, because receiving an ACK indicates that the original transmitted container has been successfully routed, and when a NACK is received, the stored container is marked for retransmission.

Packet control module 164 coordinates the long and short packet transmissions.

The two packet streams are switched by long packet photonic switch 178 and short packet photonic switch 194. In one example, separate switches are used. Alternatively, different ports on a single switch are used (not pictured). The switched containers are directed to packet combiners 196. There may be one packet combiner per destination TOR.

Long packet containers are received by long packet block 220. The long packet container is deconstructed, and the padding is removed using the padding length indicator. The packet destination address is read to confirm that the container has been delivered to the correct TOR, and the packet source address and sequence number are read from the container overhead.

Short packets are received by payload module 226. The short packet payloads are extracted from the container and the packets, along with the source address and sequence number, are written into the software defined buffer based on the source address.

Then, in short packet module 228, the short packets are de-containerized. The short packet containers are deconstructed, and the pointer information is read to extract the packet payloads, which include the packets and their sequence numbers. The transport container source and destination addresses are read and the destination address is used to validate that the container has been correctly delivered. The source address is associated with each packet.

The packets and their associated sequence numbers are routed to a software defined buffer associated with that source address. The software definition facilitates buffers being created within zones of large shared memory. In combining module 222, the long packet stream and short packet stream are combined based on the sequence numbers. This is controlled by reassembly controller 224. The sequences of long and short packets from the source TORs are adaptively interleaved based on recreating the original ascending sequence in the sequence numbers to recreate the original packet stream from each source TOR by reading data from each buffer in strict packet sequence number order. The order in which data is read from the multiple buffers may be determined by a variety of methods, including round robin, or other approaches more responsive to the fill level. The output flow is assembled from all of the specific source related buffers. Because the individual buffers are read in strict packet sequence order without gapping in the sequence, the individual flows are in the same order as they entered the packet splitter. Thus, packet sequence integrity is maintained within each TOR-to-TOR flow.

Finally, the combined packet streams are directed to destination TORs 198.

Additional details on optically switching long and short packets separately are included in U.S. patent application Ser. No. 14/712,295 filed on May 14, 2015, and entitled "System and Method for Photonic Switching," which this application incorporates hereby by reference.

The long packet photonic switch and short packet photonic switch may have the same port count, because they both have one input per source TOR and one output per destination TOR. However, the long packet photonic switch typically carries between about 85% and about 95% of the load in normal to peak traffic, and a somewhat smaller share of the load at lower traffic levels. The short packet traffic falls off more gradually than the long packet traffic at low traffic loads due to background processes in the data center. On the other hand, the short packet photonic switch carries between about 5% and about 15% of the load at normal to high traffic levels, and a somewhat larger share of the load (but not an increased absolute level of short packet traffic) at lower traffic levels. There is a modest headroom or margin in the long packet photonic switch, which facilitates a relaxation of the acceleration to compensate for bursts or groups of shorter long packets. For the short packet photonic switch, there may be a capacity for a growth of about 6.67:1 to about 20:1 in peak utilized bandwidth, depending on the threshold which may be used for preventing the short packet switch from saturating.

On the long packet path, shorter than full length long packets may arrive in bursts, where the packet arrival rate is greater than a steady stream of full length packets. For example, when 1500 byte packets arrive at a rate of one packet every 120 ns as with 100 Gb/s operation, 1000 byte packets may arrive at a maximum rate of one packet every 80 ns. Short bursts of shorter than full length long packets may cause a significant transient increase in the bit rate when these packets are padded out to 1500 bytes. This significantly increases the clock rate, but may be reduced to a smaller clock rate increase when the packets are first-in first-out buffered in a packet buffer, which may be from about 16 packets to around 40 packets. Additional details on clock rate changes are further discussed in U.S. patent application Ser. No. 14/455,034 filed on Aug. 8, 2014, and entitled "System and Method for Photonic Network," which this application incorporates hereby by reference.

Figure 3:
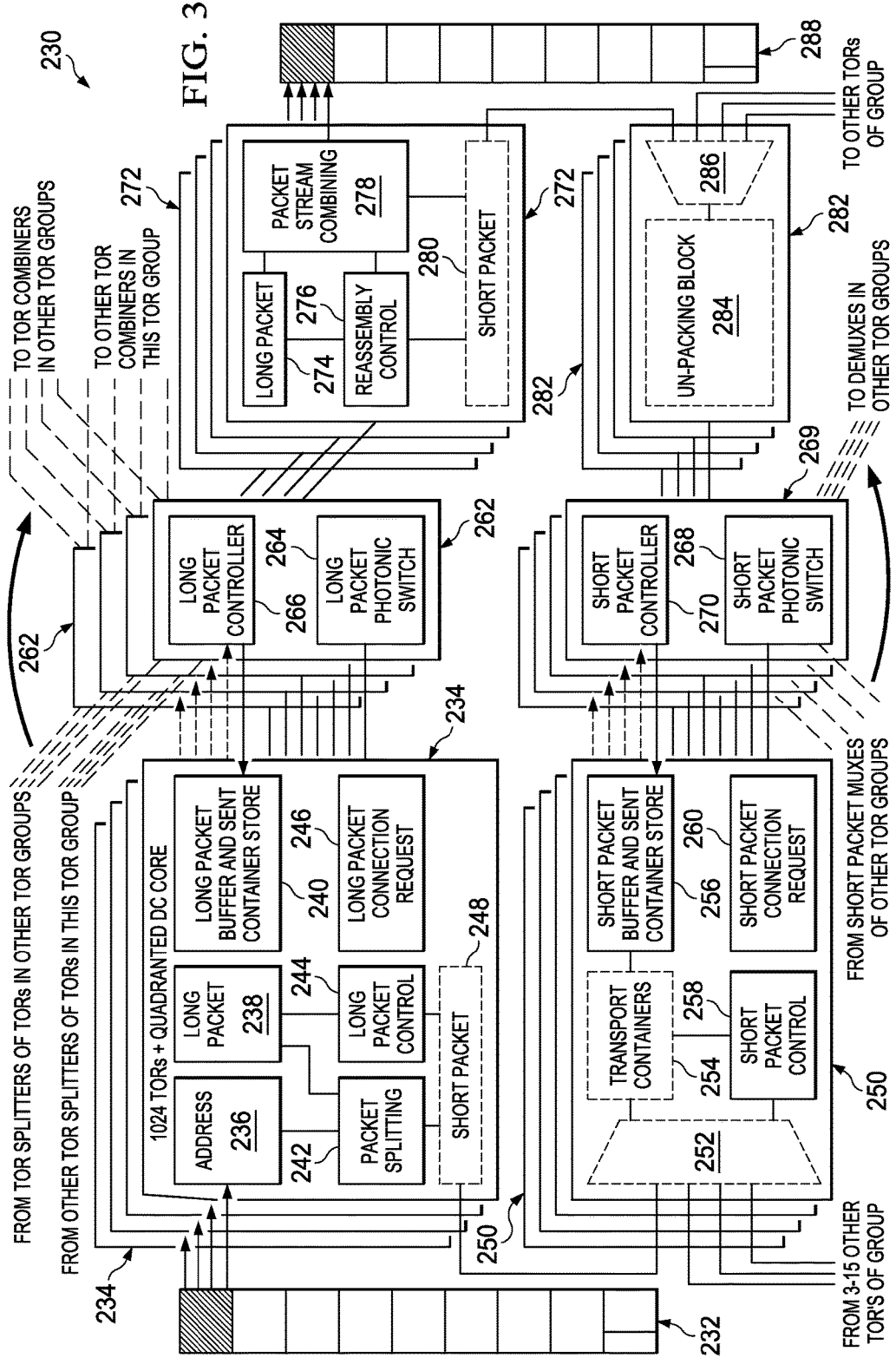
FIG. 3 illustrates another embodiment system with two photonic switching fabrics.

FIG. 3 illustrates system 230 for using TOR grouping for the short packet traffic of a photonic switching system where long packets and short packets are switched separately, where short packets from TORs in the same TOR group are combined and switched TOR group-to-TOR group. The TOR addresses for the short packets are in the form of a TOR group address used for TOR group-TOR group switching of multiplexed short packet containers within the short packet photonic switch, and the individual TOR address for identifying individual TORs within a TOR group within the destination electronic short packet demultiplexers 282.

The packet stream from source TORs 232 enters packet splitters 234. There may be one packet splitter per TOR. In one example, the packet splitters are integrated into the TORs, with each TOR having four sets of 100 Gb/s long packet inputs and outputs towards the switch and short packet inputs and outputs to and from electronic short packet multiplexers. Alternatively, the packet splitters are stand-alone devices. The packet length and address are determined in address block 236. The packet length, address, and packet are sent to packet splitting block 242. In one example, the packet length and address are known, for example from the TOR. In another example, the packet length and address are determined based on the packet parameters and header addresses. The address may be translated from a destination TOR address to a two part address, with a destination TOR group address and an individual TOR address identifying individual TORs within a TOR group. The long packet address may be a two part address or a one part address, for example produced by combining the TOR address within the group and the TOR group address.

In packet splitting block 242, the packets are split based on the packet length, for example comparing the packet length to a threshold. Packets with a length above the threshold are classified as long packets, while packets with a length less than or equal to the threshold are classified as short packets. A sequence number from a known sequence of sequence numbers for each destination address is assigned to the packets before packet splitting, for reassembly of the packet order at the destination TOR for flows from a source TOR. Short packets are directed to short packet module 248, while long packets are directed to long packet block 238.

In long packet block 238, long packets are containerized, with one packet placed in the payload, which is padded out to have the maximum packet length before becoming associated with a container. The container contains the TOR-to-TOR addressing information, including the source TOR group address, individual source TOR address, destination TOR group address, and individual destination TOR address, the packet length, which is used for removing the padding in the packet combiner, a CRC over the container, and a sequence number, which is used for sequencing in the packet combiner.

Also, the packets may be accelerated. When the container clock rate is higher than the input clock rate, the container duration is reduced. The ICG or IPG is increased to facilitate the photonic switch being reconfigured between the end of one container and the start of the next container, and to increase the margin for residual skew. The destination address is passed to connection request module 166.

Long packet control module 244 performs long packet control by formulating the container header information, managing the flow control of the container, and instructing the connection request block to request a connection upon creation of a container.

Connection requests are transmitted by long packet connection request module 246 to long packet controller 266 in long packet photonic switching fabric 262, which sets up the switch connections in long packet photonic switch 264. The connection is computed in advance of transmitting the long packet container, and is set up synchronously with the long packet container arrival at the synchronous framed photonic switch.

Rate smoothing is performed by buffer and sent container store 240 with an output gating function which may temporarily halt the container flow, causing the buffers to fill, or to cause a dummy container in the flow to be overwritten. Then, after sufficient time for the connection to be computed and set up, the long packet container is transmitted to long packet photonic switch 264 for switching to the destination by long packet photonic switch 264. Long packet photonic switch 264 may be a three stage highly dilated Clos photonic switch or a matrixed photonic switch or another topology. A copy of the long packet container is also written to buffer and sent container store 240. When an ACK is received, the copy of the container is deleted from the sent container store. On the other hand, when a NACK is received, the copy of the container is marked for retransmission.

Some of the containers in the container flow are not valid traffic containers. When packet splitter 234 does not have any long packet arriving and waiting for the containerization process, the packet splitter may insert a dummy packet or dummy container into the flow. The dummy container is passed to long packet photonic switch 264 as part of the normal flow. The switch may discard the dummy packet. When a dummy container is generated, it is noted by the controller of the output gating. The gate controller also tracks whether the sent container store is holding a container ready for retransmission. When the dummy container is initiated, a connection request for a new connection for a container in the sent container store is initiated. When there is not a container ready for retransmission, the dummy container may be routed to a destination TOR, for example to the destination TOR which has not been communicated with for the longest.

The short packets are sent to short packet module 248. The sequence number along with source TOR and destination TOR addresses, including the TOR group addresses and the individual TOR addresses within a TOR group, is assembled into a mini-container. This is passed to multi-TOR short packet containerizer (MTSPC) 250.

MTSPC 250 takes the mini-containers, along with corresponding sequence numbers, source TOR addresses and destination TOR addresses, and maps them to short packet transport containers. The mini-containers from other individual source TORs in the source TOR group which are destined for the same destination TOR group are multiplexed into the same container stream by multiplexer 252. This produces a stream of mini-containers, where each stream of mini-containers is from some or all TORs of the same source TOR group and is destined for some or all TORs of the same destination group. Thus, in a 1024 TOR data center with a TOR grouping of 16, there are a maximum of 64 (1024/16) parallel containers being filled at any one time.

The transport containers are assembled in transport container module 254. The mapping from mini-containers to transport containers is based on the destination TOR group address. Mini-containers from a particular source TOR group to a particular destination TOR group may be combined on the same transport container. This facilitates the transport containers being built up rapidly on a group-to-group basis. A transport container is dedicated to a specific group, and is thus photonically switched on a group-by-group basis. A transport container carries multiple mini-containers which self-identify which individual source within the source group they originate from and which individual destination TOR within the destination TOR group they are destined for. The mini-containers also carry a sequence number to facilitate recombining the mini-containers with the long packets at the destination in the correct packet order. When an existing transport container structure to a given TOR group is available, mini-container payloads for that destination TOR group are added until the transport container structure payload is full or the container timer times out. Then, the transport container is sent. When there is not already an existing transport container to the destination TOR group, a new transport container structure is established.

Short packet control module 258 performs short packet control, for example initiating connection requests on the establishing of a new container, determining whether a container is full or available to accept the next mini-container destined for the same TOR group, and managing the contents of the container header.

When a new transport container structure is opened, a connection request is transmitted to short packet photonic switch controller 270 via short packet connection request block 260. Short packet photonic switch 268 in short packet switching fabric 269 is set up in advance of receiving the short packet transport container.

After sufficient time for the connection to be set up, the short packet transport container is transmitted to short packet photonic switch 268 for switching to the destination TOR group, after rate smoothing from short packet buffer and sent container store 256 with an output gating function which may temporarily halt the container flow, causing the buffers to fill, or to cause a dummy container in the flow to be overwritten. A copy of the short packet transport container is also written to the short packet buffer and sent container store 256. When an ACK is received, the transport copy of the container is deleted from the sent container store, because receiving an ACK indicates that the original transmitted container has been successfully routed. On the other hand, when a NACK is received, the copy of the transport container is marked for retransmission.

The short packets are switched on a group-to-group basis by short packet photonic switch 268. The short packet photonic switch may have fewer ports than the long packet photonic switch. For example, the long packet photonic switch may be a 1024×1024, 2048×2048, or 4096×4086 photonic switch, while the short packet switch may be a 128×128, 256×256, 512×512, or 1024×1024 photonic switch. The short packet switch may have $\frac{1}{16}$, $\frac{1}{8}$, $\frac{1}{4}$, or $\frac{1}{2}$ as many input ports as the long packet switch, or another value. The number of ports of the short photonic switch is based on the number of TORs in a group, which may be referred to as a grouping ratio. For example, with a grouping ratio of 16:1, and a traffic split of 85:15, the traffic per port on the short packet photonic switch is about 3 times greater than the traffic on the long packet photonic switch ports. However, when a split ratio of 95:5 is used, the traffic per port on the short packet photonic switch is about 0.8 times the traffic per port for the long packet photonic switch. When a split ratio of 90:10 is used with 8 TORs per group, the ratio of traffic on ports of the short packet photonic switch to the traffic on the long packet photonic switch is about 0.89:1. When the ratio is greater than 1:1, the short packet path can become overloaded before the long packet photonic switch is overloaded. The short/long threshold can be dynamically changed in response to real time loading of these two fabrics to adjust the load balance. The number of TORs per group may be reduced, or the short/long packet threshold may be adjusted, to prevent overloading of the short packet switch. In another example, second ports are added to the photonic switch sides of the MTSPCs, doubling the short packet container switch port capacity. In an additional example, the short packet transport containers containing the mini-containers are shorter than the long packet containers, increasing the supply of short packet transport containers, but reducing the payload capacity per container, which reduces both the bandwidth wastage when a container is sent unfilled and the incidence of unfilled containers due to traffic address fragmentation.

The transport containers with the mini-containers are assigned a source TOR group address, a destination TOR group address, and a pointer field indicating the locations of the mini-container boundaries. The transport containers are switched by short packet photonic switch 268.

At the destination TOR group, the destination side MTSPC 282 receives the transport container from the short packet photonic switch. Unpacking block 284 breaks down the transport container back into the original constituent mini-containers. The mini-containers are routed to a packet combiner of packet combiners 272 by demultiplexer 286 within the destination TOR group. The particular packet combiner is associated with the individual destination TOR. The source TOR group address is also passed to packet combiners 272 to facilitate recombining the packet flows, which uses the full source address of the source TOR.

In the packet combiner, the packets of the long packet stream and short packet stream are combined. There is one packet combiner per destination TOR. In one example, the packet combiner is integrated in the TOR. Alternatively, the packet combiner is a stand-alone device.

Long packet containers are received by long packet block 274. The long packet container is deconstructed, and the padding is removed using the padding length indicator. The packet destination address is read to confirm that the container has been delivered to the correct TOR, and the packet source address and sequence number are read from the container overhead.

Mini-containers are received by short packet payload module 280. The mini-containers are deconstructed. The mini-container individual source and destination TOR addresses are read, and the destination address is used to validate that the container has been correctly delivered. The packets, along with the source TOR address and sequence number, are written into the software defined buffer based on the full source address.

The long and short packets and their associated sequence number are routed to a software defined buffer associated with that source address. The software definition facilitates buffers being created within zones of large shared memory. In combining module 278, the long packet stream and short packet stream are combined based on the sequence numbers. This is controlled by reassembly controller 276. The sequences from the source TORs are adaptively interleaved based on the sequence numbers to recreate the original packet stream by reading data from each buffer in strict packet sequence number order. The order in which data is read from the multiple buffers may be determined by a variety of methods, including round robin, or other approaches more responsive to the fill level. The output flow is assembled from all of the specific source related buffers. Because the individual buffers were read in strict packet sequence order without gapping in the sequence, the individual flows are packed in the same order as they entered the packet splitter. Thus, packet sequence integrity can be maintained.

Finally, the combined packet streams are directed to destination TORs 288.

The use of MTSPCs in the short packet path, along with the signals from the packet splitters to the source side MTSPCs and from the destination side MTSPCs to the destination packet combiners, increases the delay on the short packet path. For example, when the cabling between the packet splitters and the MTSPCs and between the MTSPCs and the packet combiners is less than 20 m, the delay is about 200 ns per link, or 400 ns overall. Other timing delays occur within the MTSPCs themselves. To recover some of the delay for more balanced delays, a shorter delay timeout may be used on the short packet path, resulting in a shorter lead time between connection requests and packet transmission. This may involve a shorter connection request lead time and faster connection map generation, which can be achieved with a matrixed directly addressable switch or a three stage switch with very high dilation.

Figure 4:
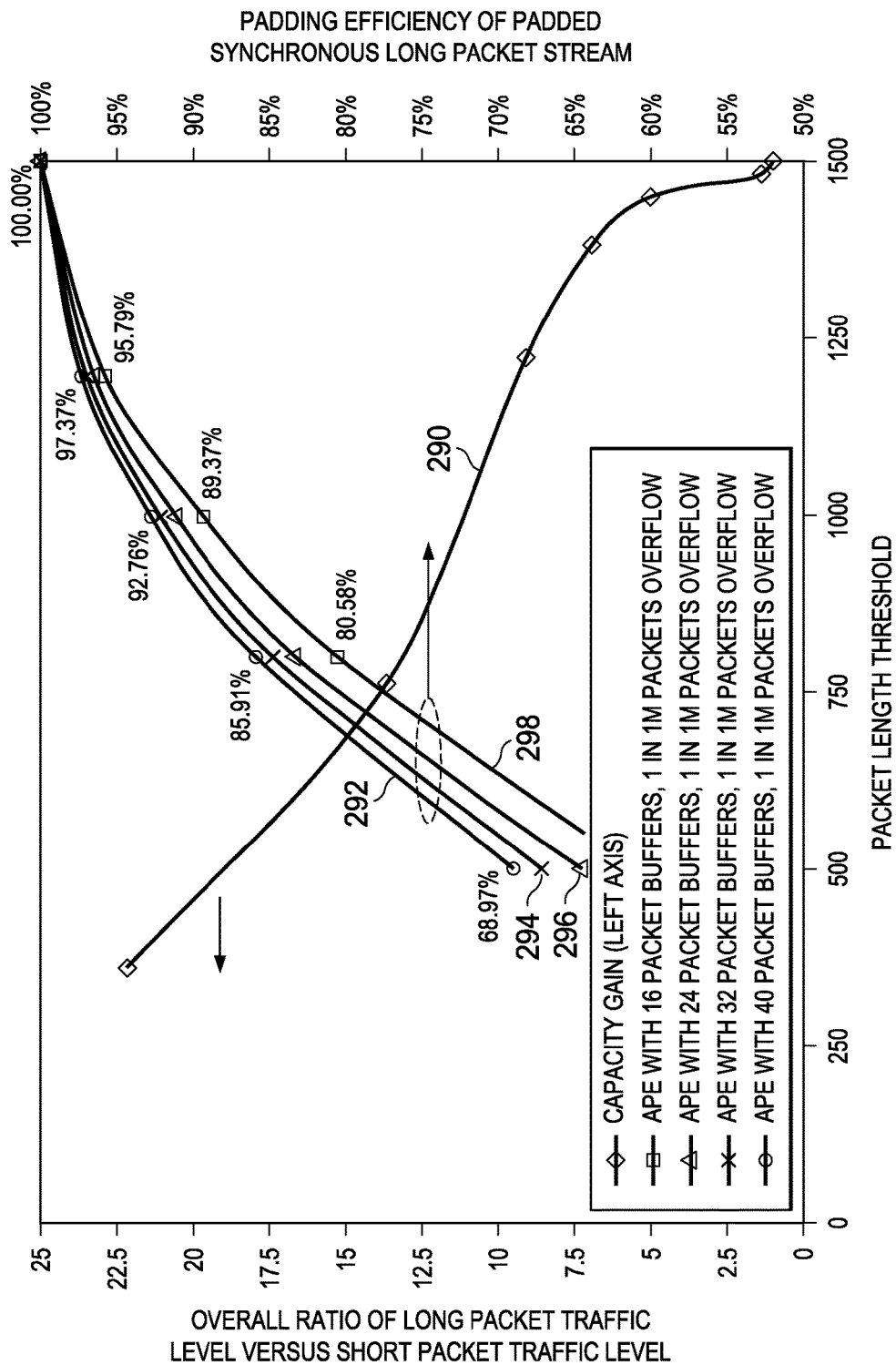
FIG. 4 illustrates a graph of overall node capacity gain versus packet length threshold.

FIG. 4 shows the overall node ratio of long packet traffic to short packet traffic capacities and synchronous circuit switching packet padding efficiency versus packet length threshold for a one in 1,000,000 probability of buffer overflow. The padding efficiency is equal to the reciprocal of the clock rate increase. A padding efficiency of 80% has a clock rate acceleration of 125%, and a padding efficiency of 90% has a clock rate acceleration of 111%. Curve 290 shows the capacity gain as a function of the packet length threshold. Curve 292 shows the padding efficiency with 40 packet buffers, curve 294 shows the padding efficiency with 32 packet buffers, curve 296 shows the padding efficiency with 24 packet buffers, and curve 298 shows the padding efficiency with 16 packet buffers.

Figure 5:
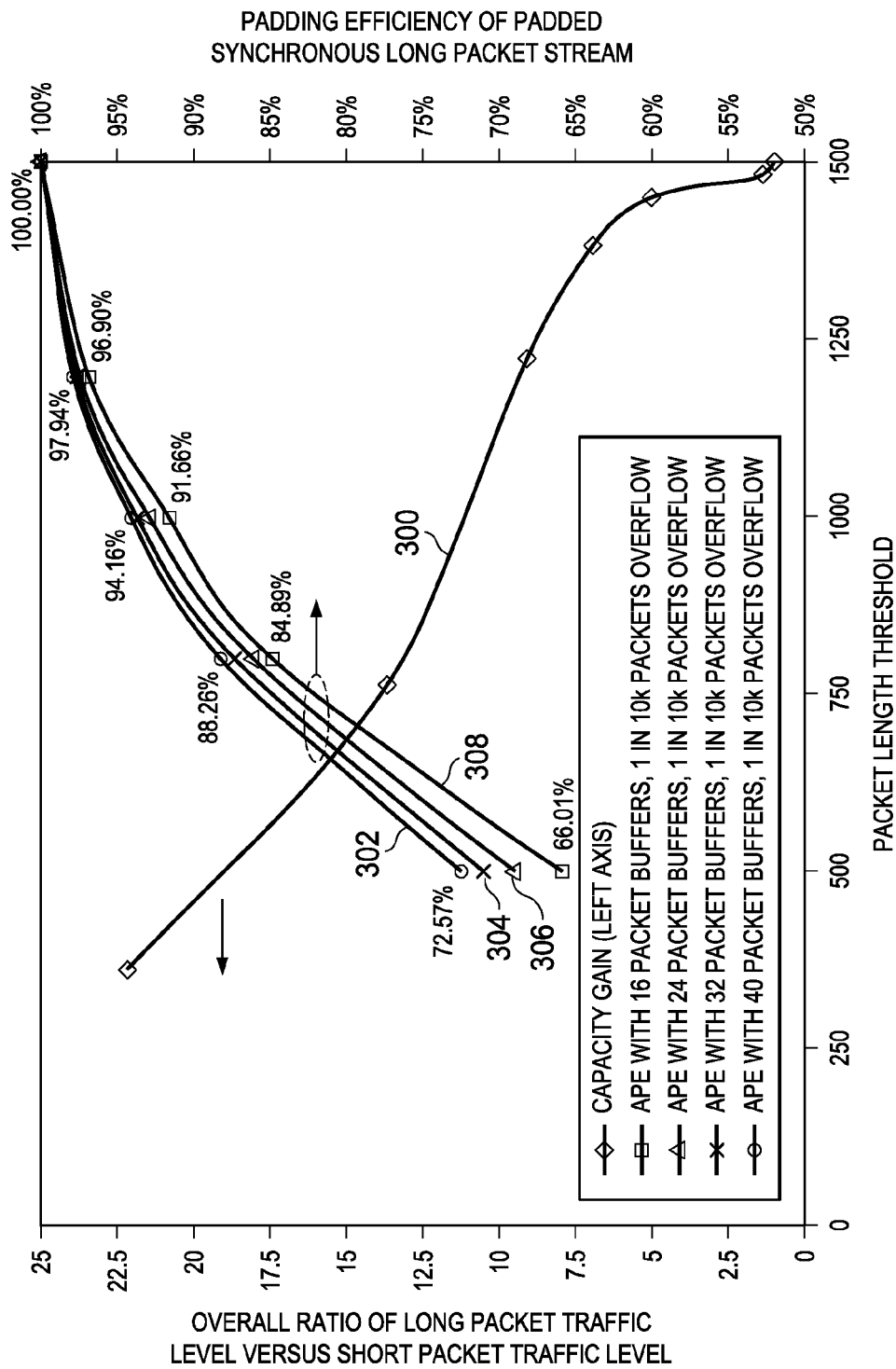
FIG. 5 illustrates another graph of overall node capacity gain versus packet length threshold.

FIG. 5 shows the overall node ratio of long packet traffic to short packet traffic capacities and synchronous circuit switching packet padding efficiency versus packet length threshold for a 0.01% probability of buffer overflow. Curve 300 shows the capacity gain as a function of the packet length threshold. Curve 302 shows the padding efficiency with 40 packet buffers, curve 304 shows the padding efficiency with 32 packet buffers, curve 306 shows the padding efficiency with 24 packet buffers, and curve 308 shows the padding efficiency with 16 packet buffers. Longer buffers better improve aggregate padding efficiency (APE) at the expense of delay. There is a trade-off between the delay and the APE, and hence clock rate acceleration. In one example, this delay is set to just below the processing delay of the centralized processing block which generates the switch connection mapping, resulting in the connection processing in that block setting the overall processing delay.

Also, container overhead information contributes to clock rate acceleration. The overhead information may be about 10 bytes to about 20 bytes, leading to additional acceleration of about 0.67% to about 1.33%.

The short packet photonic switch is a fast circuit switch operating at the container frame rate. For 100 Gb/s packet splitters and 1500 byte long packets, a frame duration is about 120 ns, based on the level of clock acceleration to address bursts of short packets, but without acceleration for padding, container overhead, or an increase in the IPG/ICG. The frame rate increase and clock rate increase to combat short bursts reduces the frame duration from 120 ns to between 85% of 120 ns (750 byte threshold packet length) and 95% of 120 ns (1000 byte threshold packet length), for a maximum frame duration under these conditions of between 103 ns and 113 ns. Shorter frame times may also be used, for example with higher acceleration and faster switching speeds.

Figure 6:
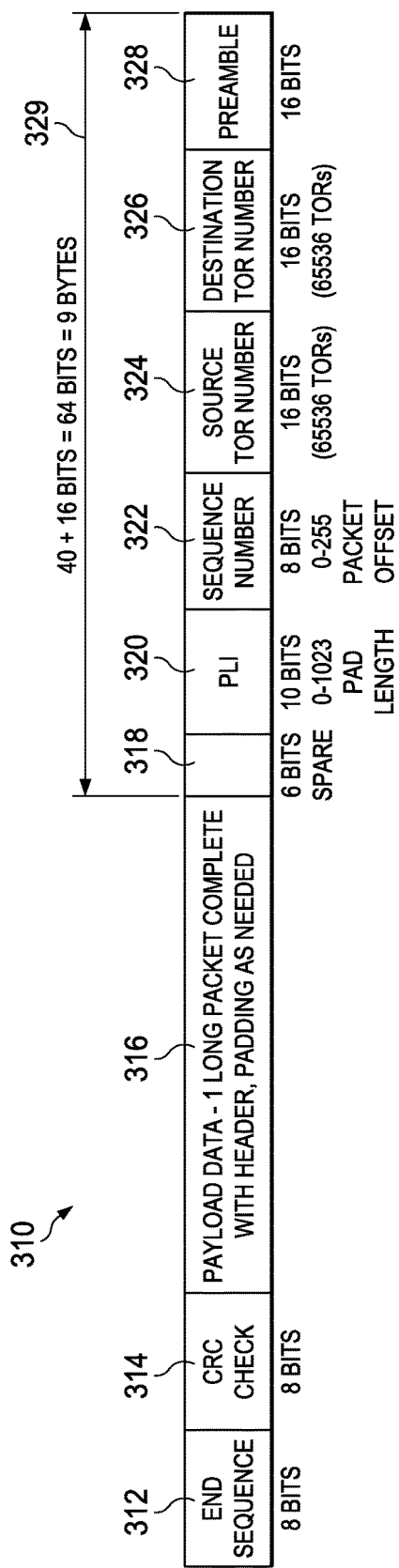
FIG. 6 illustrates an embodiment long packet container.

FIG. 6 illustrates an example long packet container 310 with a header, payload data, and trailer for use in the long packet path of a dual path photonic switching system. Payload data 316 contains one long packet, including the packet header. The long packet has a length between the long packet threshold and the maximum long packet length. Long packets which are shorter than the maximum packet length are padded out to the maximum packet length. When the long packet has a length equal to the maximum packet length, additional padding may not be added. The packet clock is accelerated to facilitate the handling of small bursts of packets shorter than the maximum packet length, which may arrive at the switch more frequently. The acceleration level depends on the length of the smoothing buffer, and may be combined with packet acceleration for increasing the IPG or ICG for more time for setting up the photonic switch and handling timing skew. Additional details on controlling optical switch setup times are included in U.S. patent application Ser. No. 14/455,034 and U.S. patent application Ser. No. 14/508,676 filed on Oct. 7, 2014, and entitled "System and Method for Commutation in Photonic Switching," which this application incorporates hereby by reference.

The header includes preamble 328, destination TOR address 326, source TOR address 324, sequence number 322, packet length indicator (PLI) 320, and spare bits 318. Preamble 328 may be two bytes of a distinctive sequence. In other embodiments, a different length preamble, or no preamble, is used.

Long packet container 310 includes destination TOR address 326 and source TOR address 324, which may each be 16 bits, for addressing up to 65,536 source TORs and 65,536 destination TORs. With 4×100 Gb/s TORs in a quadranted topology data center, this provides addressing capacity for up to 26 Petabits/sec core throughput. The source TOR address may be used for reconstituting the sequencing integrity when recombining the long and short packet flows. Also, the source TOR address may be used in rapid formatting of addresses for return messages.

Sequence number 322, which may be 8 bits for a packet offset between 0 and 255, is used to restore the order of the source streams at the destination. The sequence number facilitates the flows being reassembled in the correct sequence when the short packet stream is combined with the long packet stream. The sequence numbers are applied at the source TOR or packet splitter according to the flow destination, i.e. the TOR address being used with the destination TOR routing based on the de-containerized packets, and each ascending or ascending re-cyclic sequence of sequence numbers is applied to containerized packets destined for the same destination TOR. With ascending sequence numbers, the sequence numbers continuously increase. On the other hand, with ascending re-cyclic sequence numbers, the sequence numbers increase until they reach a maximum, when they return to zero to repeat the sequence. When reassembling the flow sequence at the destination, both the sequence number and the source address of the flows are used to match the received packets to the correct flows (source address) and to establish the correct sequence in each of those flows (ascending/ascending re-cyclic sequence numbers). Padding Length Indicator (PLI) 320, which may be 10 bits for a padding length of 0 to 1023 bytes, indicates the demarcation point between the payload and the padding. The PLI provides a direct figure of the padding length to be removed by the packet combiner at the destination TOR. A padding size range of 0 to 1023 bytes can accommodate a long packet size ranging from 477 bytes to 1500 bytes. Using 11 bits would accommodate any long packet length from 0 bytes to 1500 bytes.

Six spare bits 318 complete the long packet container header 329 with 72 bits, or nine bytes.

The trailer includes end sequence 312 and CRC check 314. An eight-bit CRC check 314 may be placed across the container. Alternatively, another value of CRC check size, or another method of integrity validation may be used.

End sequence 312 may be eight bits. Alternatively, another end sequence, for example a two byte distinctive pattern, or no end sequence, may be used. As illustrated in FIG. 6 the total overhead is 11 bytes. In other examples, other overhead amounts may be used.

When a common control processing approach is used with prior common channel signaling of connectivity to the switch control pipelined processing entity, a similar header structure may be used, and the destination TOR may be used to confirm that the correct routing has occurred, and that the packet sequence integrity is intact. Also, the header may be used to handle ongoing routing to correct dependent servers, and to facilitate rapid acknowledgment messages being generated in the return path.

For a 100 Gb/s ported 1.6 Pb/s four plane data center with 4096 quad-ported TORs, the TOR address field may be 12 bits for 4096 locations. With an eight bit packet sequence number to unambiguously identify packet sequence offsets of 256 packets peak-to-peak, in a packet flow when convolved with the source-granular source address, the total destination address space is 12+8=20 bits=2.5 bytes. Another 2.5 bytes supports a similar full source addressing to the same level. Allocating another byte for CRC brings the header and trailer without preamble trailer sequence to six bytes. Expanding the address field to 65,536 source TORs and 65,536 destination TORs, plus the sequence number and a byte for CRC, brings the header to seven bytes without a preamble or end sequence. Thus, a 10-12 byte overhead may be used, which is less than 1% of the overall payload capacity for a maximum length packet.

Figure 7:
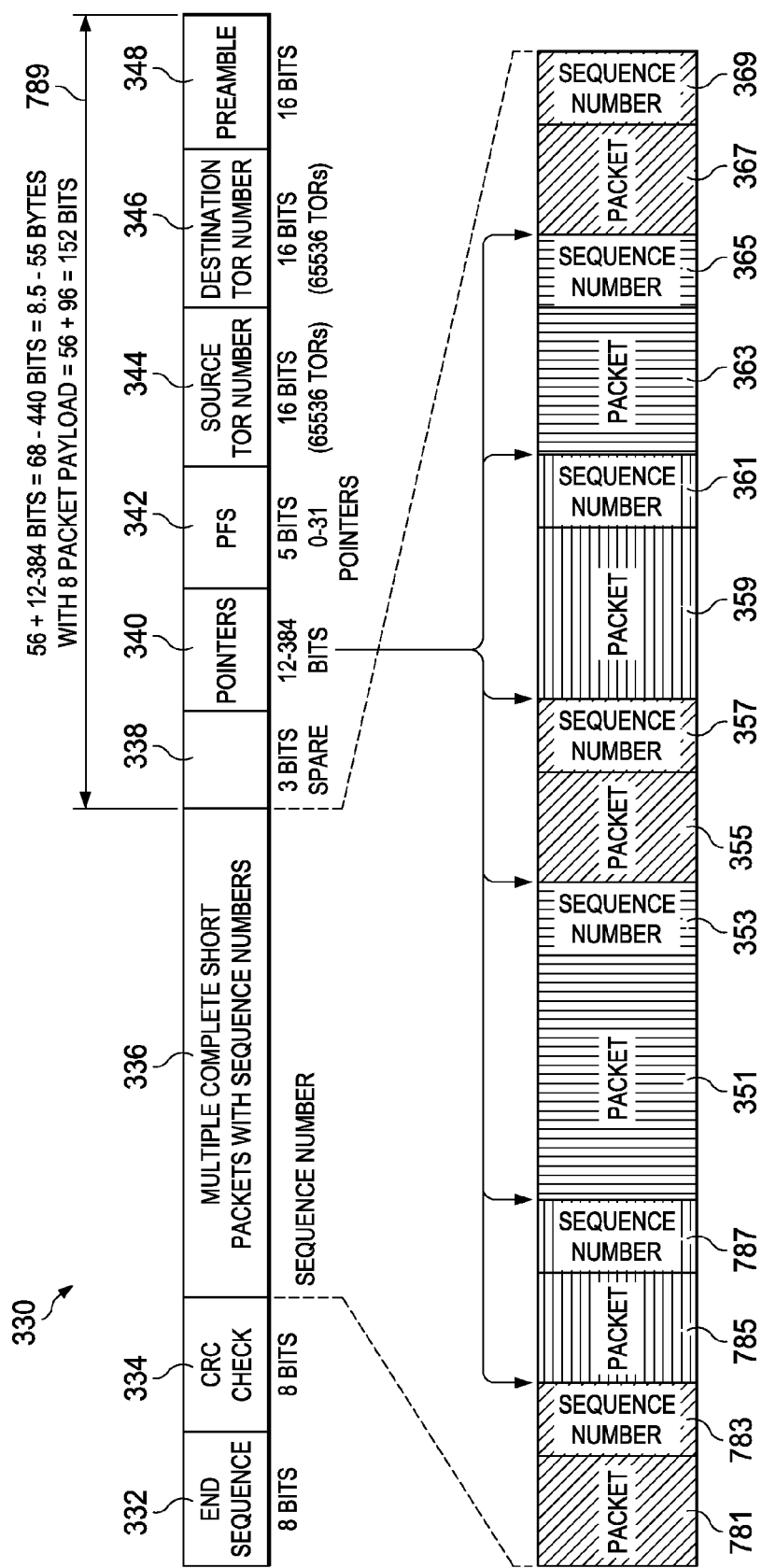
FIG. 7 illustrates an embodiment short packet container.

FIG. 7 illustrates a short packet container 330 for use in a system with a dual path photonic switching approach. The short packet container contains a header, payload data, and trailer. Payload data 336 includes multiple complete short packets each packaged in its own mini-container, including the packet header, and the sequence number(s) corresponding to the short packets. In this example, the payload is sized to make the overall container the same size as the long packet container, which facilitates switching the short packets and the long packets by the same switch or the same switching technology. Because the header size is variable, the payload may be from about 1420 bytes to about 1490 bytes. Packets with a length between the shortest packet and the maximum short packet are mapped into the payload. The packet clock may be accelerated to the same level as the long packets, to retain the same frame length.

Payload data 336 includes multiple short packets, and sequence numbers corresponding to the individual packets. For example, packets 781, 785, 351, 355, 359, 363, and 367 correspond to sequence numbers 783, 787, 353, 357, 361, 365, and 369, respectively. The sequence numbers are used for restoring the ordering of the streams from the source TORs at the destination TOR packet combiner. The sequence numbers may be 8 bits for a packet offset of between 0 and 255.

The header includes preamble 348, destination TOR number 346, source TOR number 344, pointer field size (PFS) 342, pointer field 340, and three spare bits 338. The preamble may be a two byte distinctive pattern. Alternatively, a different length preamble, or no preamble, may be used.

The destination TOR number 346 is the address of the destination TOR. It may be 16 bits, to identify up to 65,536 destination TORs. Similarly, the source TOR number 344, which also may be 16 bits, can identify up to 65,536 source TORs. The source TOR number may be used for sequence integrity when the short packet containers and long packet containers are combined.

Pointer field 340 delineates the packet boundaries between multiplexed short packets. Pointer field 340 contains up to 32 12-bit pointers, which take 48 bytes. The pointers define 31 short packet boundaries in the payloads. For a 1500 byte payload, up to around 29 50-byte short packets may be used in a short packet container. In other examples, around 12 short packets of different lengths may be placed in a short packet container.

PFS 342 has five bits to identify up to 32 pointers. PFS may be used to dynamically vary the pointer size. Pointer field 340 may be adjusted based on the number of pointers in use. When fewer pointers are used, more space may be allocated to the payload data.

The header also optionally contains 3 spare bits. Header 789 may be from about 8.5 bytes to about 55 bytes. In one example, with an eight packet payload, the header is 152 bits or 19 bytes, about 1.3% of the container length.

The trailer includes CRC check 334 and end sequence 332. CRC check 334, which may be eight bits, may be used for CRC check across the entire container. Alternatively, another method of integrity validation is used.

End sequence 332 may be one or two bytes with a distinctive pattern. Alternatively, no end sequence, or another end sequence, may be used.

A photonic switch which may be used is a high port count multi-stage photonic switch which may use a variety of architectures, such as a three stage highly dilating Clos switch, which is controlled by a series-parallel structure using pipelined control or a matrixed switch using direct addressing. The pipelined control and connection mapping process may take several microseconds to complete from generating connection maps for indirectly addressed switches with free path search algorithms. However, because the control system is a pipeline of control processing elements, various parts of the process of generating sequential connection maps may be implemented simultaneously on each of the processors in the pipeline with a hand-off between activities to produce a flow of connection maps every frame period, offset by several microseconds from the receipt of the raw connection requests for each frame in the process. This delay is invisible to the switching delay and switching process when the overall computation delay through the control pipeline is shorter than the container assembly, acceleration, and buffering delays in the packet splitter, which may be about 16 frames to about 64 frames, or about 1.92 µs to about 7.68 µs, depending on the buffer size. A value of around 40 frames, for a 40 packet buffer, has a delay of 5 µs, which provides 5 µs for the control to complete the connection commutation. This is independent of delays from cross-data center fibers running from the packet splitter and the core switch, because the connection request is transmitted along the same optical path as the container to be switched on a separate optical carrier, so both are subject to a similar optical delay. To maintain this independence, a send before ACK and store in case of NACK approach is used, because the return ACK to the TOR located packet splitter is delayed by the central connection processing time plus two times-of-flight over the data center TOR-switch fiber cabling, which may be 500 m-1 km long, introducing a fiber flight time of 5-10 µs. Also, the packet splitter is phase locked to the switch, at the container phasing level, so the IPGs/ICGs on the inputs are aligned at the frame numbering level by controlling the timing of the packet splitter from the switch timing so the switch receives containers which are time-aligned to the switch.

The packet splitter does not necessarily wait for confirmation that a connection is in place before transmitting the container. Instead, the packet splitter transmits the container a fixed time period after requesting a connection, coinciding with the frame number, and places the sent container in a sent container store awaiting an ACK or a NACK. When the packet splitter is close to the photonic switch, the ACK or NACK may arrive before the container is transmitted, and the sent container store immediately dumps the container as it is written when an ACK is received, or the container is not written to the sent container store. When the packet splitter is further from the photonic switch, the ACK or NACK has a longer round trip delay, the sent container store holds the container until an ACK or a NACK is received.

The control blocks may include the interaction of source matrix controllers (SMCs), group fan-in controllers (GFCs), and orthogonal mappers. The control process, along with a particular example of a photonic switch, is further described in U.S. patent application Ser. No. 14/455,034. Other topologies, such as a three stage space switch highly dilated Clos switch, or a matrixed switch, may be used. When a three stage space switch Clos switch is used, a center stage controller (CSC) assembles center stage connection maps based on the results of the SMCs and the GFCs. When a matrixed switch is used, direct and very fast addressing with fast output port contention resolution can be used. Additional details on ultrafast photonic switch are further discussed in U.S. patent application Ser. No. 14/710,815 filed on May 13, 2015, and entitled "System and Method for Photonic Switching," which this application incorporates hereby by reference.

Figure 8:
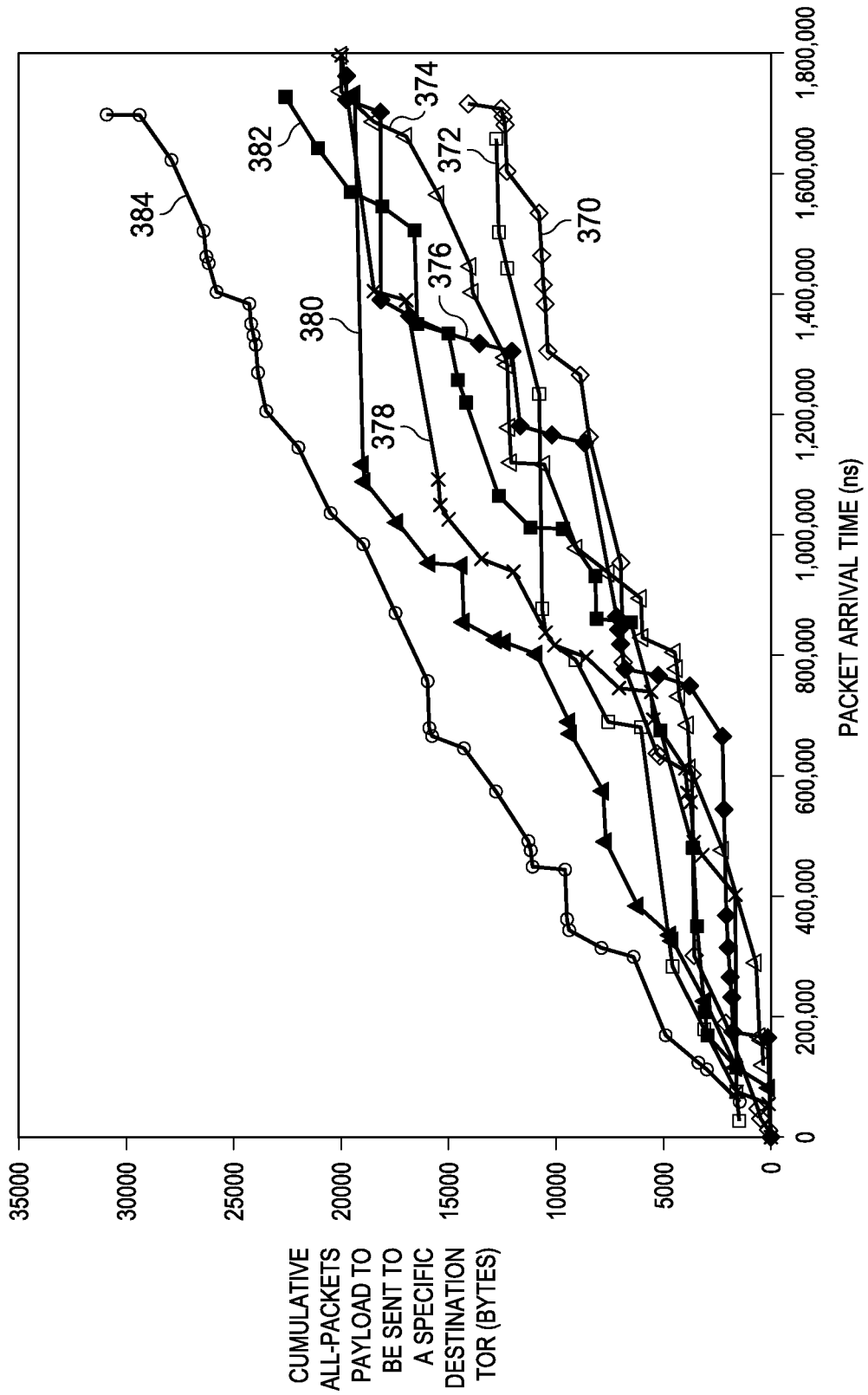
FIG. 8 illustrates a graph of cumulative short packet payload sent to a particular top-of-rack (TOR) switch over time.

Referring to FIG. 8, a model is used to assess aspects of burst mode switching of conventional mixed length packets in long bursts and for dual path systems where packets are assembled in multi-packet containers and short packet container transmission. FIG. 8 illustrates a graph of cumulative all packet length (un-split) packet payload to be transmitted to a specific TOR over time from a model which generates various lengths of packets at approximately the probability of occurrence, and individually randomly addressed across a variable number of TORs, in this case 1024. FIG. 8 shows the behavior for traffic flows in eight destination-specific all-length container stacks, with curves 570, 572, 574, 576, 578, 590, 592, and 584 showing the behavior of eight stacks. The number of bytes in specific TOR-TOR streams over time is shown for the case of all lengths of packets to similarly loaded TORs in a 1024 TOR data center. After 1.6 ms, the stacks have received between about 12,000 bytes and about 27,500 bytes, so the bandwidths are low, and the inter-packet arrival time is long. This corresponds to about 160 kilobits or 20 kilobytes over 1.6 ms. At less than 100% load the bandwidth would be lower, resulting in a lower packet delivery rate and longer fill times.

Figure 9:
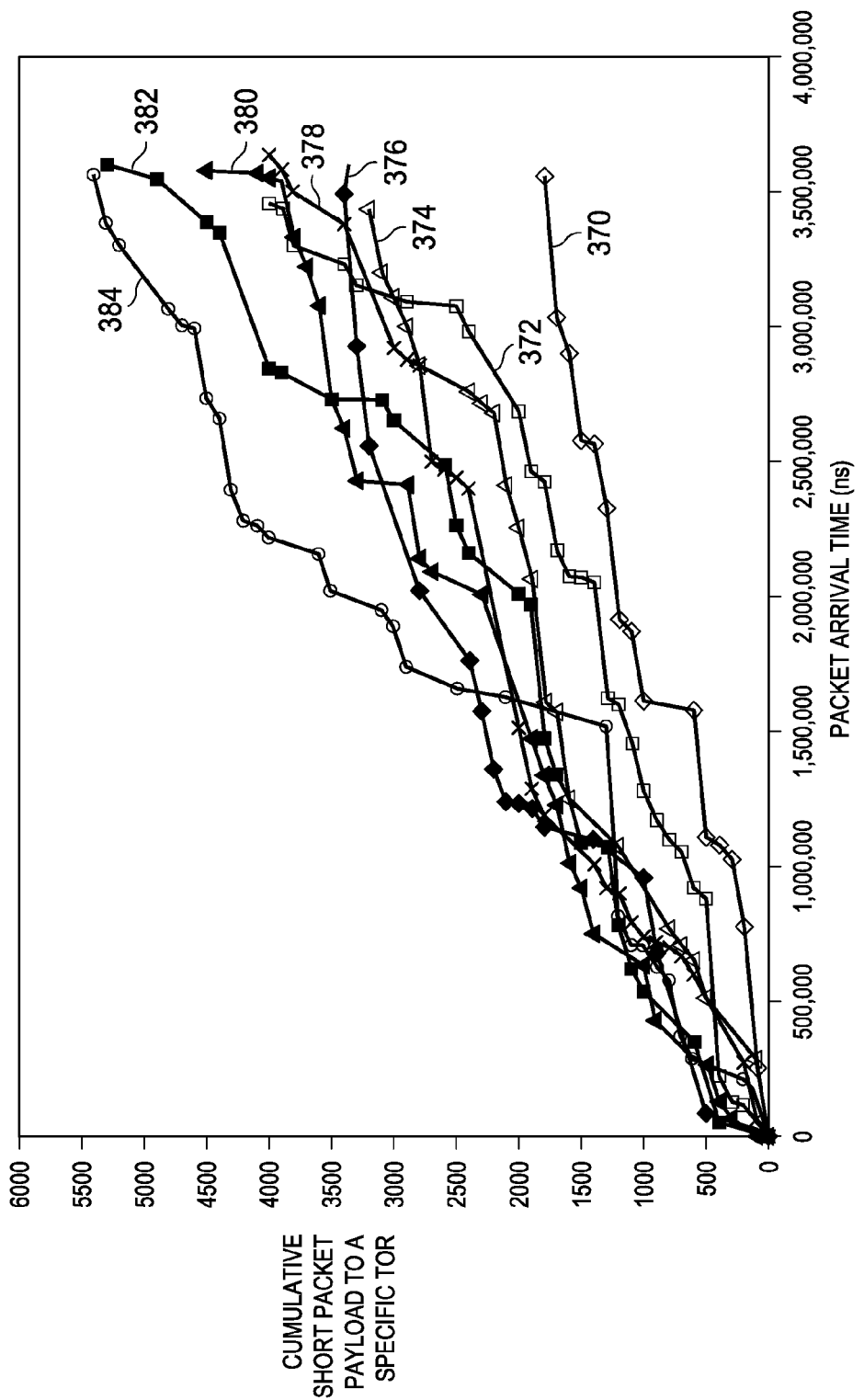
FIG. 9 illustrates another graph of cumulative short packet payload sent to a particular TOR switch over time.

FIG. 9 illustrates a graph of cumulative short packet payload to be sent to a specific TOR over time from a model which generates various lengths of packets at approximately the probability or occurrence and individually randomly addressed across a variable number of TORs, in this case 1024. FIG. 9 shows the behavior for traffic flows in eight destination-specific short packet container stacks, with curves 370, 372, 374, 376, 378, 380, 382, and 384 showing the behavior of eight stacks. The number of bytes in specific TOR-TOR streams over time is shown for short packets to similarly loaded TORs in a 1024 TOR data center. After 3.6 ms, the stacks have received between about 1600 bytes and about 5300 bytes, so the bandwidths are low, and the inter-packet arrival time is long.

Figure 10:
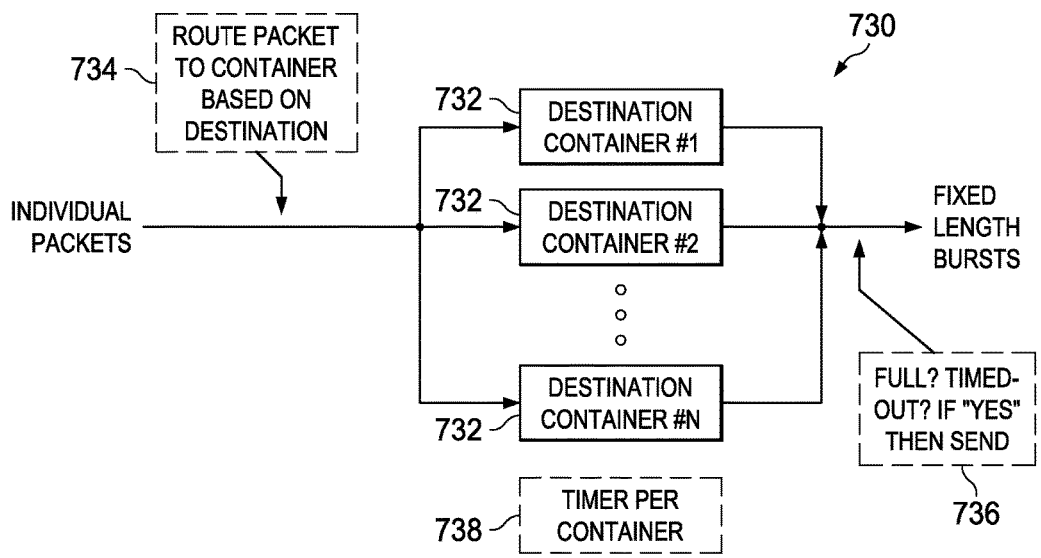
FIG. 10 illustrates an embodiment burst mode switch.

FIG. 10 illustrates the containerization process 730 of a photonic burst mode switch. Packets are routed to containers based on the destination in block 734. Individual packets are accumulated in containers 732, with one container per destination. A container is created when a packet enters the switching process when there is not already an existing container for that packet's destination. When there is already a container awaiting completion which is addressed to the same destination as the packet, the packet is added to that container. Each container is associated with a time-out period 738, after which it must be sent, as shown at block 736, whether or not it is full. When the container fills before time-out, it is transmitted as shown in block 736, and the next packet to that destination is placed in a new container. The containers have a fixed length, for example many times the length of the largest payload entity, such as a longest packet. Burst mode switch frame times are usually from about 1 µs to about 5 µs, although they may be from about 500 ns to about 10 µs or more. The containers are switched as synchronous or asynchronous bursts. Burst mode switches are well suited for systems with a limited number of individual massive data flows, for example a packet transport system. A large container resulting from a long frame time is easy to switch but may take significant time to fill, which may become problematic, especially in data centers. In data centers, the core switch interconnects hundreds, thousands, or tens of thousands of individual TORs, each of which may be communicating with some or all of the other TORs. Thus, traffic from the source TORs to the destination TORs may be very destination-fragmented and may contain individual short flows, slow flows, even single packet transactions and flows. With slow flows or fragmented destination traffic, containers may be transmitted partially full or nearly empty, reducing throughput. Because a burst mode switch aggregates packets for a specific destination, it is affected by the per-destination flow characteristics.

Figure 11:
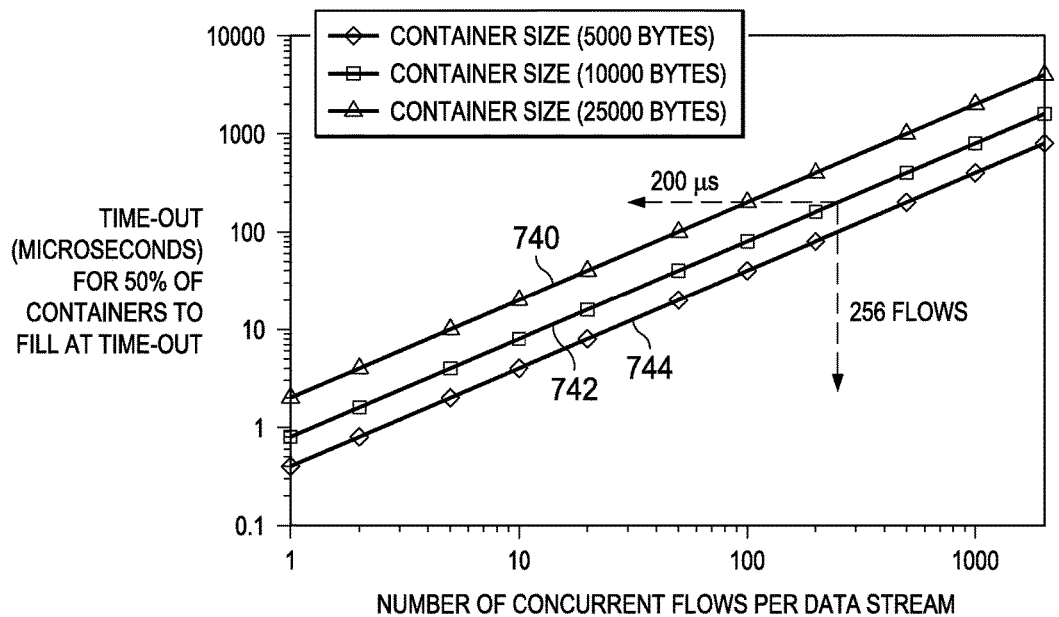
FIG. 11 illustrates a graph of timeout for half the containers to fill versus the number of concurrent flows per data stream.

FIG. 11 illustrates a graph of the timeout time for a long-burst burst mode switch containerization process for half of the containers to be full at timeout versus the number of concurrent flows per data stream at 100 Gb/s. Curve 740 shows the results for 5000 byte containers, curve 742 shows the results for 10,000 byte containers, and curve 744 shows the results for 25,000 byte containers. According to curve 742, corresponding to 10,000 byte container, for one half of the transmitted containers to be full, with a fragmentation of the destination traffic per source TOR into 256 destinations, a time-out of 200 µs is needed. A much shorter time-out in the region of 2, 5, 10 or 25 µs may be used with a burst mode switch. However, shortening the time-out results in a lower percentage of containers being filled or even being significantly partially filled, which leads to bandwidth expansion, because an unfilled container occupies the same bandwidth/bus occupancy as a filled container. Thus, the switch goodput (the throughput of usable data) is reduced by this bandwidth expansion factor.

Figure 12:
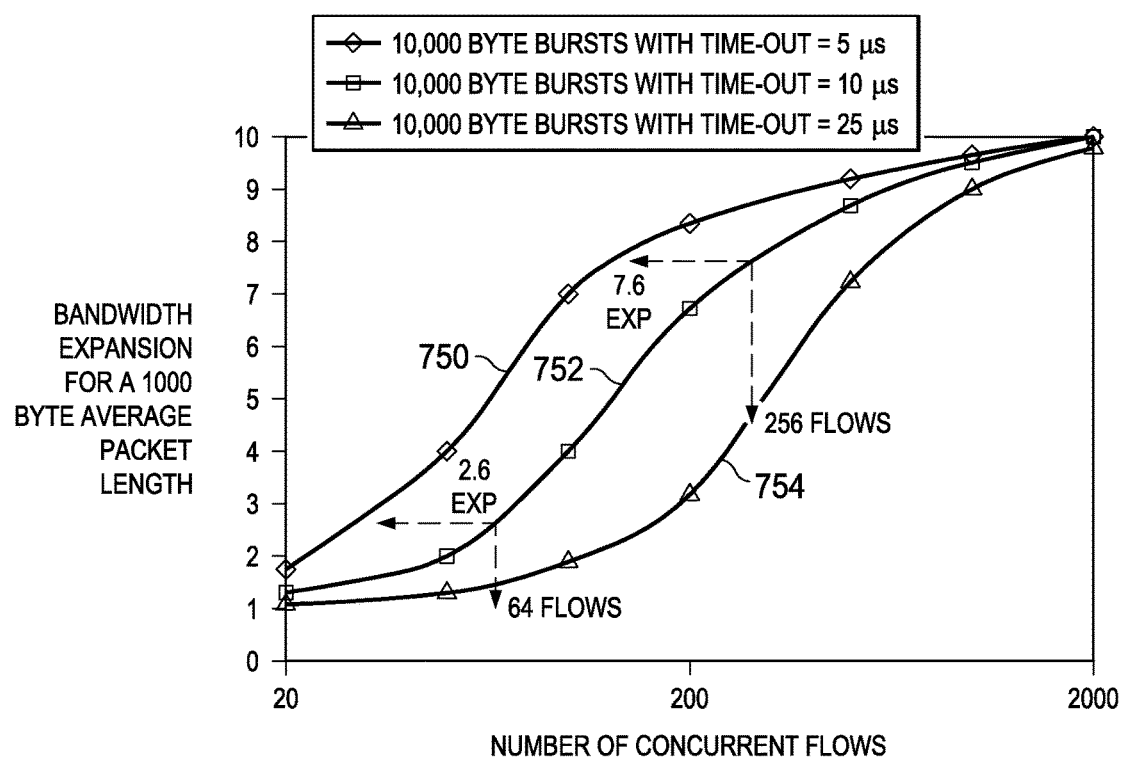
FIG. 12 illustrates a graph of bandwidth expansion versus the number of concurrent flows.

FIG. 12 illustrates a graph of bandwidth expansion within the burst mode switch containerization process for a 1000 byte average packet length versus the number of concurrent flows with 10,000 byte bursts. Curve 750 shows the results for a 5 µs timeout period, curve 752 shows the results for a 10 µs timeout period, and curve 754 shows the results for a 25 µs timeout period. The results asymptotically converge to just over 1 at a low number of flows, due to container quantization effects. The bandwidth growth increases as the number of flows increases, plateauing at a level of the container payload capacity/one packet length, because a container always contains at least one packet, because the container is only created when the first packet arrives to be transported to the appropriate destination. For a packet length of 1000 bytes with a 10,000 byte payload container this leads to a bandwidth expansion of 10:1. However, very few packets are actually 1000 bytes long. The majority of packets are either close to 1500 bytes, which, with a 10,000 byte container payload, gives a bandwidth expansion of 6.67:1; or are close to 50-100 bytes in length, which, with a 10,000 byte container, provides a plateau of bandwidth expansion of around 100-200:1. Thus, the blended bandwidth growth effects from an equal number of short and long packets is likely to be significantly more than is shown in FIG. 12. This reduces the throughput of a burst mode switch significantly in a data center application when a TOR is communicating with a significant number of other TORs. In a data center, the aggregated server-server flows at the TOR may create a significant amount of bandwidth addressing fragmentation with short flows, slow flows, and large numbers or addresses being accessed simultaneously. A photonic switch switches the aggregated TOR-TOR traffic at a destination TOR level of granularity, which may include multiple server-server activities or a single server-server activity where some transactions may be as short as a single packet. TOR-to-core switch traffic is the sum of the server-server traffic to servers not on the same TOR. Server activities may interact with multiple servers, and some individual activities may interact with multiple servers. The server communication equals the sum of the resources of constituent activities.

In a data center, several activities may be going on simultaneously in each server. For example, server 1 of TOR k has activities A, B, . . . Y, Z. Activity A may involve server 1 of TOR k interworking with server M of TOR 1, when the traffic is routed through the core packet switch, or it may interact with server M of TOR k, when the link may be made at the local TOR. At the same time, activity B on server 1 of TOR k may be interacting with server M on TOR k. Each of these involves separate data flows across the core switch. When the number of processes running on each of the servers which subtend each of the TORs is considered, the number of server-to-server flows may be very large. Some of these can be aggregated together for core switching when they are occurring at the same time and share both source and destination TORs. Thus, the traffic addressing at the TOR-TOR level may be very fragmented, depending on the community of interest of each TOR, the group of TORs it tends to communicate with. This may be a small subset of the total number of TORs, or it may be a large number of other TORs. In an example, some flows are very long, but many of them are short, even single packet flows. The flow sizes may be millions of bytes or more, but most of the flows (but not most of the bandwidth) are relatively short. A significant number of flows may be short ACK, NACK, or simple instruction/request transactions. These server-to-server flows are combined at the TOR into source TOR-to-destination TOR data flows, depending on the geographic relationship between the servers within the data center. This produces a flow inter-arrival time characteristic for the traffic exiting the TOR towards the switch. Thus, the nature of the traffic from the TOR output port to the other TOR input ports is likely to be highly fragmented, with multiple servers, and thus TOR destinations, present at once and with a significant subset of the flows being short or very short.

The presence of many small flows is problematic with long containers, unless a long wait time is used, because TOR-TOR flow inter-arrival times may be long. A significant number of flows may include single packet containers. Flow lengths may have a long duration but moderate capacity, suggesting that adjacent packets of the same flow may be well spaced out. There is a wide range in the number of concurrent flows which may exist at any one time on any TOR port in a data center. Multiple concurrent destinations per flow group or TOR port implies that multiple containers are built concurrently, leading to a long fill time.

FIG. 8 shows the modeled flow rates into 8 of 1023 container stacks for a TOR communicating equally with 1023 other TORs in a 1024 TOR data center. The responses of a 10,000 byte/container burst mode switch containerization process to examples at this level of traffic fragmentation, as well as with 256 destination and 64 destination fragmentation are shown in FIGS. 13-16. The 256 and 64 destination fragmentation represent a TOR communicating with ¼ and $\frac{1}{16}^{th}$ of the other TORs, respectively. The horizontal arrows represent the time-out period, which is initiated on the reception of a packet requiring a new container. The vertical arrows represent the sent container overall capacity and the timing of the transmission of that container. The transmission occurs at the end of the horizontal arrow when a time-out occurs or before the end of the horizontal arrow when the container fills before the time-out. The dotted horizontal lines represent the cumulative traffic bytes prior to the sending of the associated container.

Figure 13:
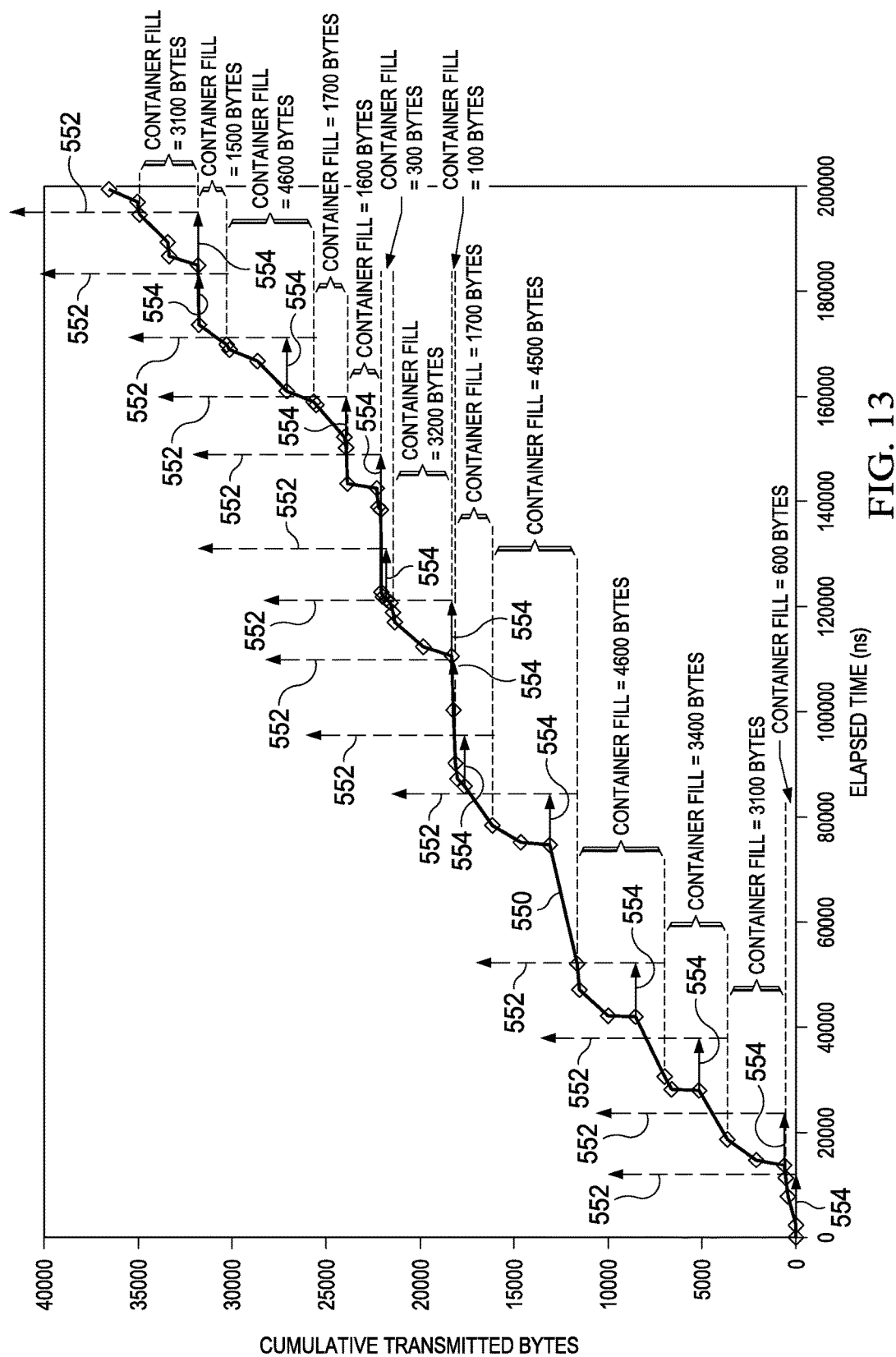
FIG. 13 illustrates a graph of cumulative short packet payloads for a particular TOR over time.

FIG. 13 illustrates a burst mode switch quantizing a 64 destination traffic flow in a 100 Gb/s packet stream, with fill times 554 and container transmittal times 552. Curve 550 shows the arrival of new packets. With a 10 μs timeout, the container fill across the bandwidth of the switch is around 24.3%, resulting in a bandwidth increase of more than 4:1 across the bandwidth of the switch.

Figure 14:
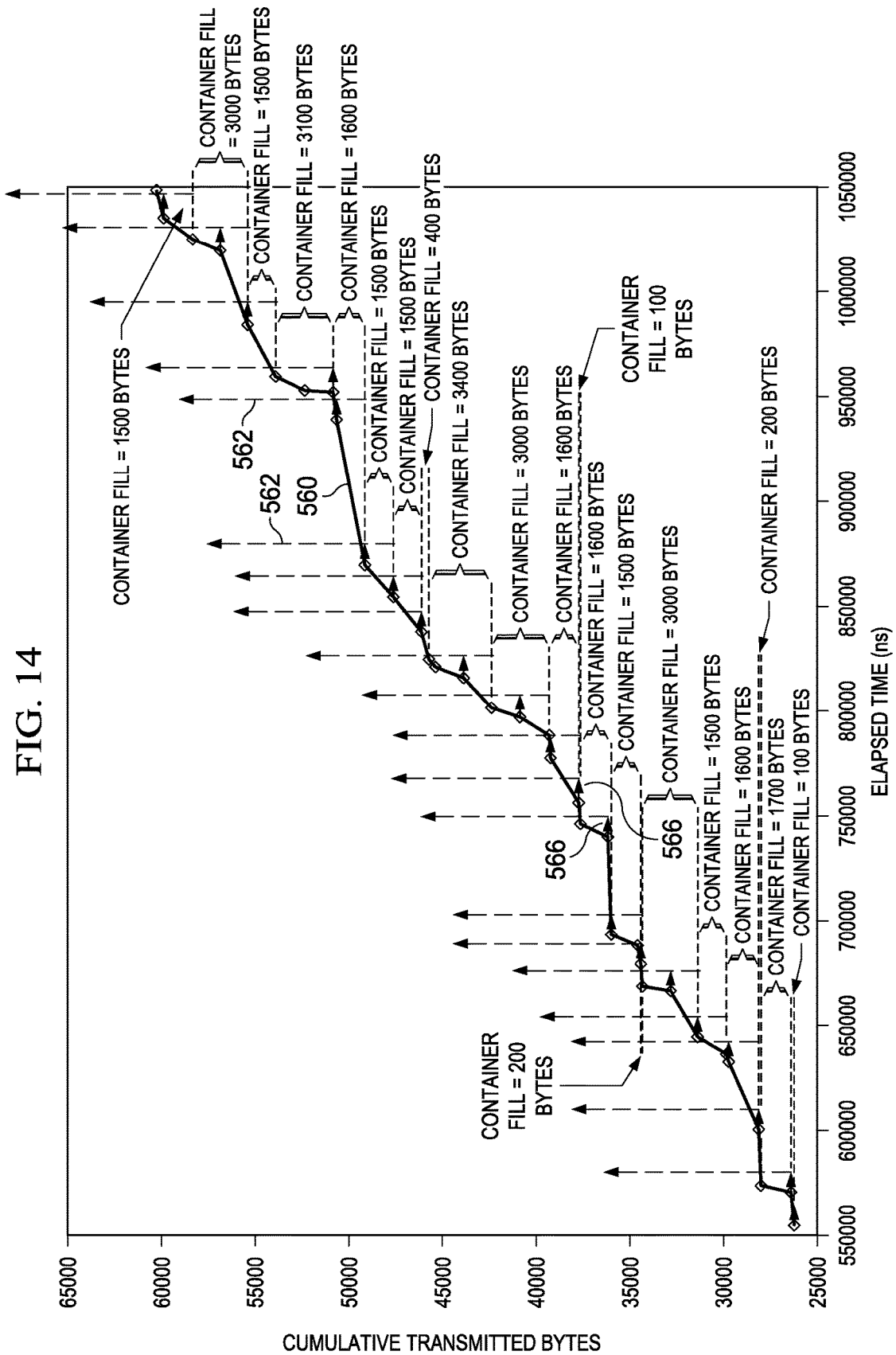
FIGS. 14-17 illustrate cumulative probability graphs of packet arrival time.

FIG. 14 illustrates a burst mode switch quantizing a 256 destination traffic flow in a 100 Gb/s packet stream. FIG. 14 shows container fill times 566, container transmittal times 562, and container arrival curve 560. With a 10 μs timeout, the container fill across the entire bandwidth of the switch is around 16.8%, with an increase in bandwidth of almost 6:1.

Figure 15:
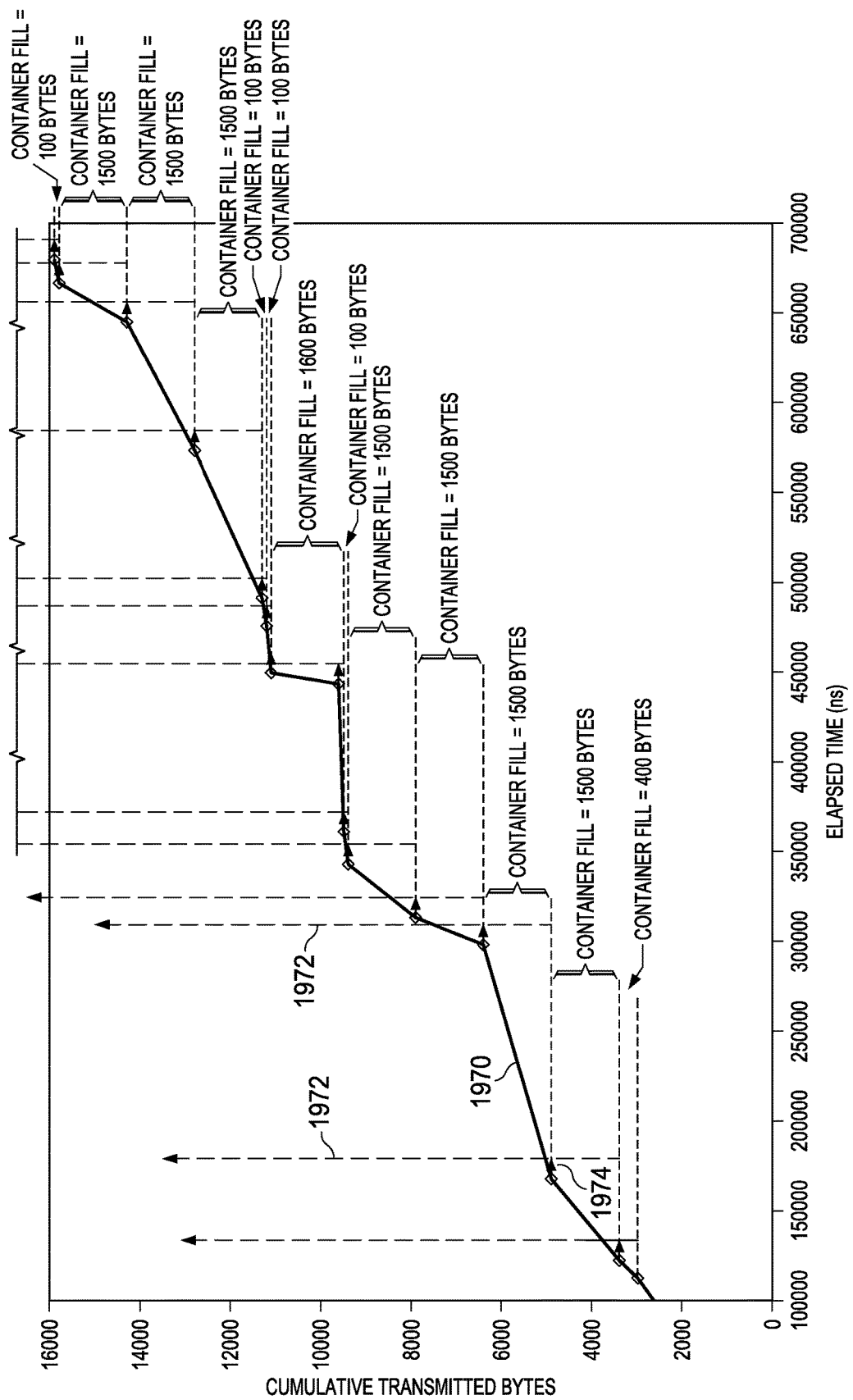

FIG. 15 illustrates a burst mode switch quantizing a 1024 destination traffic flow in a 100 Gb/s packet stream. FIG. 15 shows container fill times, container transmittal times 1972, and container arrival curve 1970, with packets being added to a container at times 1974. With a 10 μs timeout, the container fill across the entire bandwidth of the switch is around 9.8%, with an increase in bandwidth of just over 10:1.

Figure 16:
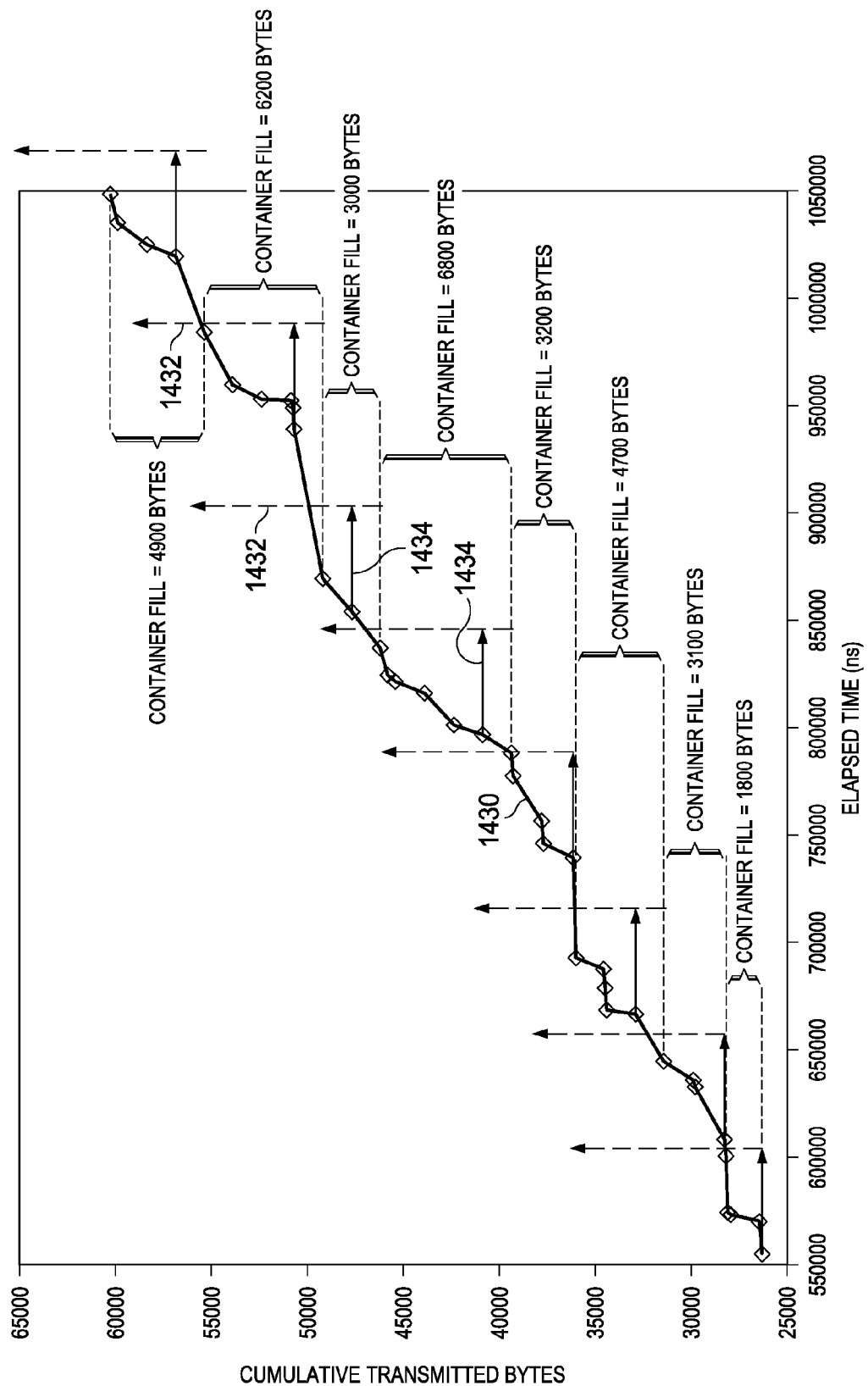

FIG. 16 illustrates a burst mode switch with a 50 μs timeout with 256 equally loaded destinations. Curve 1430 shows the arrival of packets, lines 1432 show the container transmittal, and lines 1434 show the timeout. Increasing the timeout to a very high level facilitates better filling, with bandwidth growth of around 2.36:1. At 256 equal traffic flows per TOR, the burst mode switch, at 10,000 byte bursts, has problems efficiently packing containers. However, a 10,000 byte burst is towards the lower end for a burst mode switch, and smaller bursts are even more inefficient due to packing quantization where, after a number of packets have been quantized, the next packet does not fit, despite the availability of significant burst payload capacity.

FIGS. 13-16 show the bandwidth expansion performance of a 10,000 byte container burst mode switch burst assembly process. This yields a bandwidth expansion of more than 4:1 across the entire bandwidth of the switch for a 64 address random address fragmentation, almost 6:1 for a 256 address random fragmentation, and greater than 10:1 for a 1024 address random fragmentation for a container time-out of 10 μs. This would result in the goodput—the usable data throughput—being reduced to <25% with 64 random destinations, approximately 17% with 256 random destinations, and approximately 10% with 1024 random destinations. Shorter time-outs lead to higher bandwidth expansion.

Increasing the time-out to 50 µs somewhat improves bandwidth expansion at the expense of delay.

The trade-off of time-out ratio (the length of the time out versus the length of the container) and bandwidth efficiency is such that, with a higher time-out ratio, the container fill improves under adverse conditions, such as highly destination-fragmented traffic. However, short containers with a capacity not much larger than the largest individual packet may incur quantization problems for multi-packet payloads. For example, for a container with a 2000 byte payload capacity, when the first packet into the container is a 150 byte packet, the second packet is a 400 byte packet, and the third packet is a 1500 byte packet, the third packet overflows the payload capacity by 50 bytes, and the container will be transmitted with just 550 bytes of payload, despite having sufficient source material to fill the container.

The packet stream may be split into short and long packet streams. The long packets, which may be padded, may be carried in containers just long enough to accommodate a single longest packet. Because there is only one packet per container, time-outs are not used, as the container is filled by one packet and immediately available for transmission to the switch when the assembly and conditioning is completed. The short packets may have a length up to a threshold value of 400-1200 bytes, and may represent from about 5% to about 15% of the total packet bandwidth, dependent on the threshold. Multiple short packets may be mapped into longer containers, which may be the length of one long packet, or into shorter containers, about the size of the packet length threshold or shorter. At this level of container length, the quantization concerns are less problematic, because the quantization only occurs on 5-15% of the bandwidth and the statistical probability of encountering a relatively long short packet is very low.

While long packets are unaffected, short packets suffer a delay/payload bus occupancy expansion. However, these affects are not too problematic, because short and medium length packets only represent about 5% to about 15% of the bandwidth, and the payload container size may be reduced from the 25,000 bytes of the 2 µs framed system down to, for example, 1500 bytes for a 120 ns framed system. This change in traffic levels and shortening of the container length reduce the severity of the impact of the bandwidth expansion.

Figure 17:
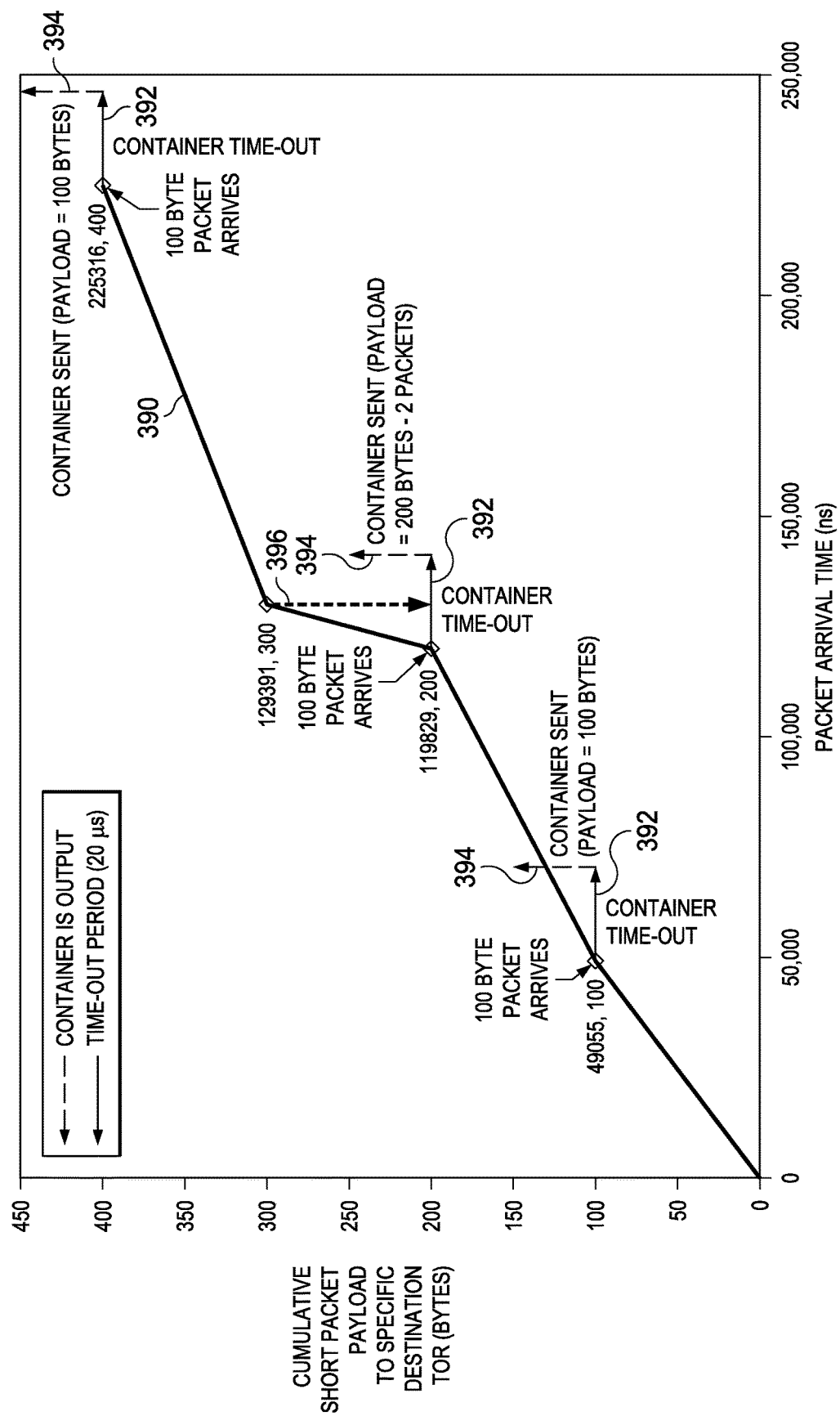

FIG. 17 illustrates an expanded time scale detail of one container input flow of short packets, covering one sixteenth of the time period for one container stack, which corresponds to a short packet container stack of a dual path switch. In FIG. 17, a 20 µs timeout is depicted. Lines 392 represent the timeout duration from the start point, where a packet arrival triggers the formation of a new container, until the time when the container is transmitted irrespective of fill. Lines 396 show the arrival of packets, and curve 390 shows the pattern of packet arrival. When the container fills, it is immediately closed and transmitted, and the next packet to that container address triggers the creation of a new container. Lines 394 show when the container is output. The first 100 byte packet to arrive initiates a container, which does not receive additional payload during the timeout window. Thus, the initial packet is transmitted after 20 µs with only the single packet in the container. The second packet to arrive triggers a new container, and a third packet arrives during the timeout period, so it is incorporated into that container. However, the container is not full after the second packet is added, so the container is not yet sent. The container is sent when the timeout period expires, 20 µs after the arrival of the initial packet. The fourth packet also triggers a new container, which is transmitted after the 20 µs timeout expires. In the case of a 1500 byte payload container on the short packet container path, two containers have one packet and one container has two packets, with an average fill of 133/1500=8.86%, for a bandwidth expansion of 11.3:1. When the container payloads are reduced, for example by shortening the frame time so that the container payloads are 500 bytes, and the frame times are about 40 ns, the average fill increases to around 26.6% for a short packet bandwidth growth of about 4:1 and an overall bandwidth growth of 1.4:1.

While long packets are unaffected, short packets suffer a delay/payload bus occupancy expansion. However, these effects are not too problematic, because short and medium length packets only represent from about 5% to about 15% of the bandwidth, and the payload container size may be reduced from the 25,000 bytes of the 2 µs framed system down to 1500 bytes for a 120 ns framed system, 500 bytes or less for a 40 ns framed system, or faster. This change in traffic levels and shortening of the container length reduce both the amount of, and severity of the impact of, the bandwidth expansion.

Figure 18:
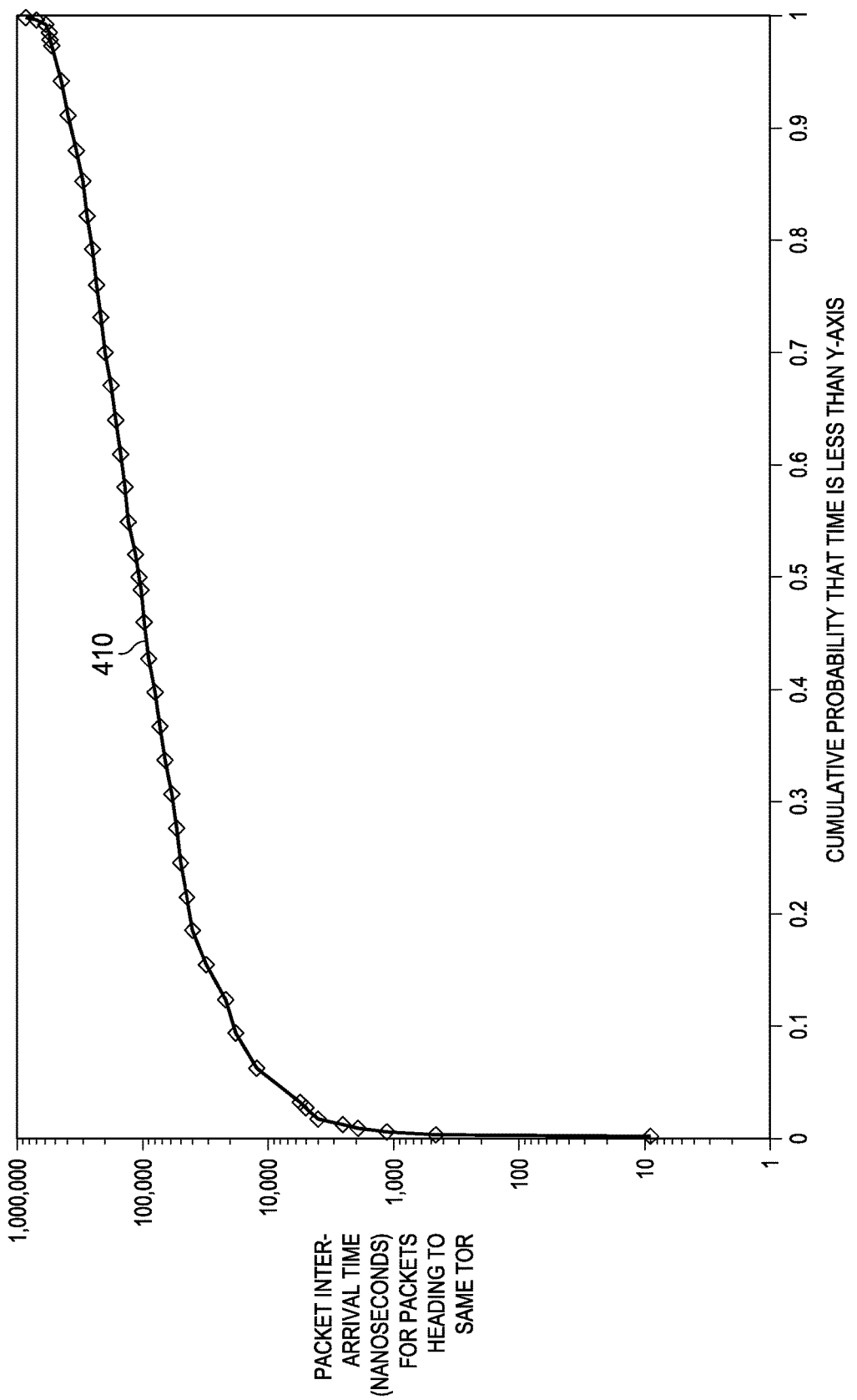
FIG. 18 illustrates a graph of packet inter-arrival time.

FIG. 18 illustrates placing the short packet traffic in individual source TOR-to-destination TOR addressed containers with an address fragmentation of 1024 destinations, from the perspective of the inter-arrival time between successive packet arrivals into a specific container stack. FIG. 18 illustrates curve 410 with packet inter-arrival time for packets heading to the same TOR over time. The median inter-arrival time for an equal flow to and from all other TORs in a 1024 TOR data center is around 100 µs. With a timeout of from about 2 µs to about 10 µs, very few containers carry more than one packet, let alone enough packets to fill a container. It is desirable to make the containers small and the time-out low to minimize delay. The bandwidth growth from under-filled containers of the bandwidth is absorbed by the overprovisioning of the switch capacity.

Figure 19:
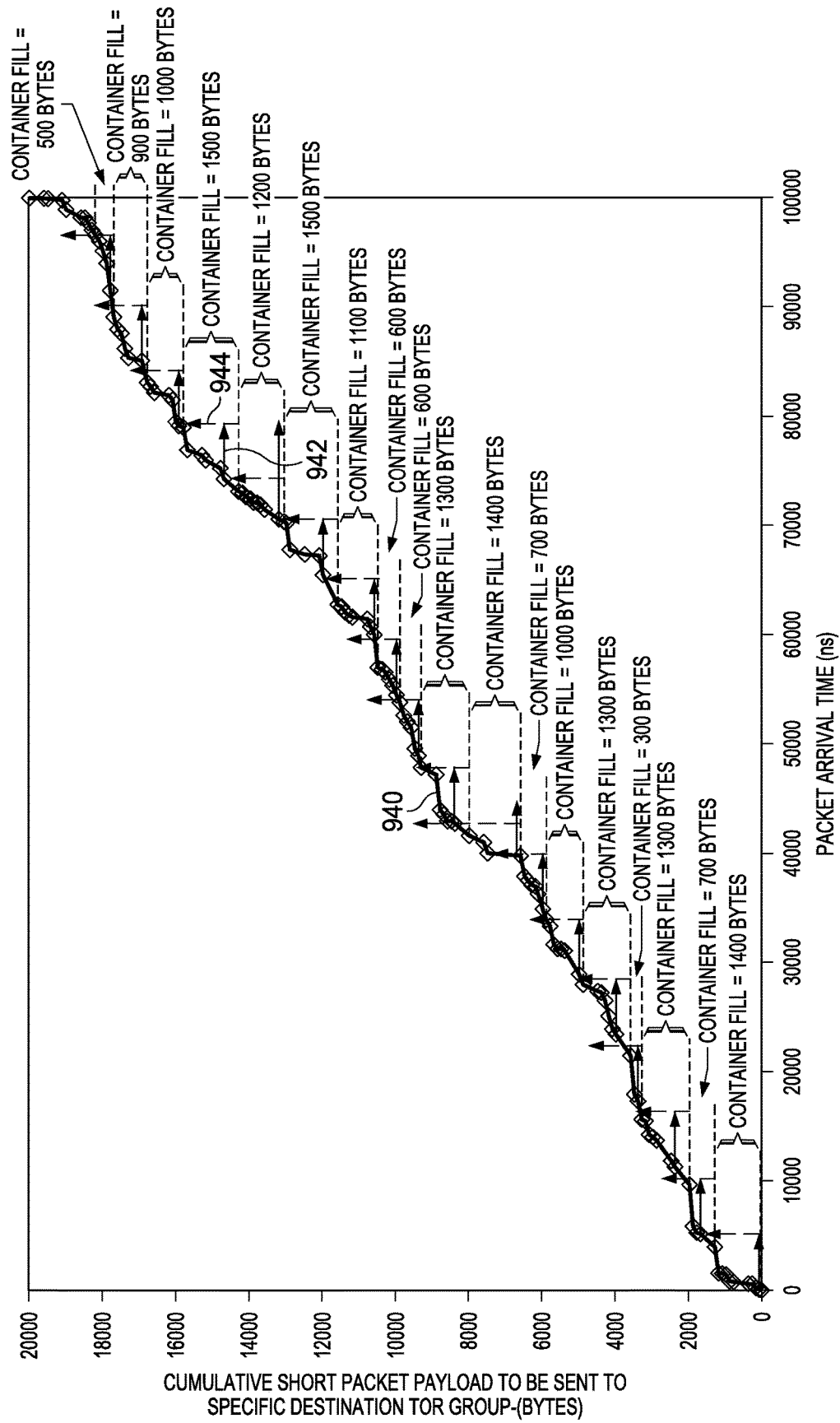
FIG. 19 illustrates another cumulative probability graph of packet arrival time.

FIG. 19 illustrates a graph of the short packet traffic in a switch using TOR grouping on the short packet path and a short packet container switch operating on those TOR groups. FIG. 19 shows a specific source TOR group-to-destination TOR group stream with 1024 TORs with a group size of 16 and equal traffic per TOR group. Curve 940 shows the arrival of short packets, lines 942 show the timeout, and lines 944 show the short packet transmission containers. This example uses a 5 µs timeout for 1500 byte containers with a short packet threshold of 400-700 bytes. The average delay in this example is 4.85 µs, and few containers fill before the timeout expires. Containers are about 70% full, with a bandwidth occupancy in the short packet switching plane of about 13% to about 15% when about 9% of the traffic is short packets. The long packet path is not affected by address fragmentation, because each packet is individually containerized. Thus, the bandwidth expansion is about 1.4:1 on the short packet path on the 9% of the traffic, for an overall bandwidth expansion due to traffic addressing fragmentation of 1.04:1. In the example illustrated in FIG. 19, group level short packet stream multiplexing is used, which routes multiple incoming mini-container streams of short packets together to more rapidly fill containers. The transport containers are addressed at the group level, and may be switched by smaller photonic switches. Because statistical multiplexing leads to fewer higher-fill data streams, the fill rate statistics in the long containers are more favorable. The containers on average have a higher fill rate, both due to increasing the traffic delivered to the overall array of containers being filled in parallel and from reducing the maximum number of containers within the array. This facilitates a shorter timeout period without excessive bandwidth growth. Multiplexed short packet containers may be switched in a smaller photonic switching fabric than the long packet photonic switches, because the number of sources and destinations is reduced by a factor equal to the grouping, so there is one switch port per TOR group. Thus, in a 1024 TOR data center with a grouping of 8, the short packet container switch may be 128×128.

In a synchronous fast photonic switch, there is synchronism between the control delays and the delays on the packet transport paths. The containers experience a timeout delay, which is not problematic when it is matched to the delay in the control system. The extended path through the stream multiplexer meets the delay requirements from packet splitter to packet combiner. Thus, the multiplexing delay and switching delay on the short packet path is about the same as the switching delay on the long packet path. The switch set-up time on the short packet path may be more rapid than the switch set-up time on the long packet path to provide a time budget for the packet multiplexing.

The short packet container switching fabric may be less efficient than the long packet container switching fabric without impacting the overall node performance, because the short packet container switch may have sufficient excess capacity to accommodate this inefficiency and the inefficiencies do not affect the long packet photonic switch, which carries the bulk of the bandwidth, because this switches on a one packet per container basis. Also, the short packet photonic switch, which is smaller the long packet photonic switch in the grouped short packet flow approach, may be somewhat further enlarged to compensate for inefficiencies. These inefficiencies may be reduced by grouping short packets from the same TOR group together, which reduces the maximum size of the destination address field and increases the flow rate into the containers by a factor of the grouping size. For example, in a 1024 TOR data center where the TORs are in groups of 16, with 64 groups, the packet bandwidth split from long packets to short packets may be set to 20:1 by choice of threshold. The output from the 16:1 packet statistical multiplexer is on average 80% of the average traffic on the long packet path, and may be switched by a 64×64 short packet photonic switch in parallel with a 1024×1024 long packet photonic switch. The incremental system complexity of the 64×64 short packet photonic switch may be trivial compared to the system complexity of the 1024×1024 long packet photonic switch. For example, when the switch efficiency due to bandwidth expansion is between 40% efficiency and 20% efficiency, there would be 2.5:1 to 5:1 bandwidth growth/bus occupancy from inefficient container filling. When the statistical multiplexers/sub-container assemblers have two to four outputs, the switch would be increased to a 128×128 photonic switch or a 256×256 photonic switch, with a complexity of one sixty-fourth and one-sixteenth, respectively, of a 1024× 1024 photonic switch. By isolating the effects of concatenating packets for only short packets, the bandwidths from packet concatenation may grow significantly. For a long/short split ratio of 8:1, the 16 TOR statistical multiplexers/sub-container assemblers have two outputs (or 8 TOR statistical multiplexers/sub-container assemblers have one output) and the short packet switch has 128×128 ports, 12.5% of the port capacity of the 1024×1024 photonic switch. For a bandwidth efficiency of 50% or 25%, the small photonic switch is 256×256 or 512×512, respectively.

Figure 20:
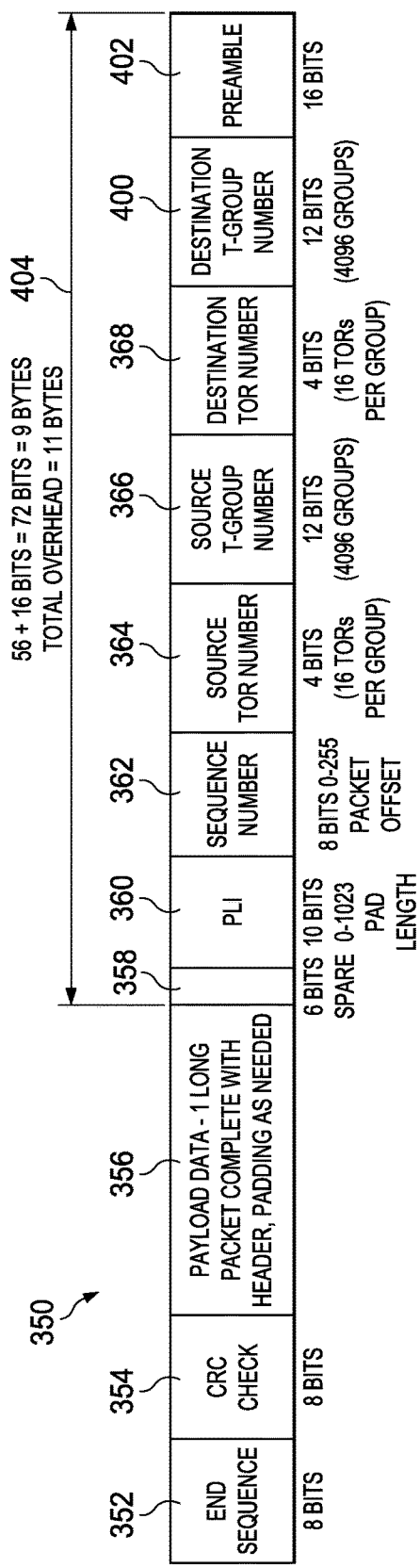
FIG. 20 illustrates another embodiment long packet container.

A specialized container structure for the long packet containers and the short packet containers may be used with TOR grouping. FIG. 20 illustrates long packet container 350, an example long packet container for a grouped TOR approach. The addressing in the long packet path is split into TOR group and individual TOR number within the group. Payload data 356 contains one long packet, including the packet header, along with padding. The payload data may be from about 1000 bytes to about 1500 bytes. For example, a fixed, known payload size of at or just above 1500 bytes may be used. The long packet have a length between the long packet threshold, which may be from about 400 bytes to about 1000 bytes, and the maximum long packet length, which may be 1500 bytes. Long packets which are shorter than the maximum long packet length are padded out to the maximum long packet length. When the long packet has a length equal to the maximum packet length, additional padding may not be added.

The header includes preamble 402, destination TOR group address 400, individual destination TOR address 368, source TOR group address 366, individual source TOR address 364, sequence number 362, PLI 360, and spare bits 358. Preamble 402 may be two bytes of a distinctive sequence. In other examples, a different length preamble, or no preamble, may be used.

The destination TOR group address, which may be 12 bits for up to 4096 groups, identifies the destination TOR group. The individual destination TOR address, which is 4 bits for up to 16 TORs per group, identifies the particular destination TOR within a destination TOR group. Similarly, the source TOR group address, which may be 12 bits for up to 4096 TOR groups, identifies the source TOR group; and the individual source TOR address, which may be 4 bits for up to 16 TORs per group, identifies the source TOR within the source TOR group. Other numbers of bits and address field sizes may be used for both individual TOR numbers within a group and the number of TOR groups.

Sequence number 362, which may be 8 bits for a packet offset between 0 and 255, is used to restore the order for the source streams at the destination. The sequence number facilitates the flows being reassembled in the correct sequence when the short packet stream is combined with the long packet stream. The sequence numbers are applied according to the flow granularity, i.e. the TOR address being used with the destination TOR routing based on the de-containerized packets, and the sequence number applies to containerized packets destined for the same destination TOR. When reassembling the flow sequence, both the sequence number and the source address of the flows are used.

PLI 360, which is 10 bits for a pad length of 0 to 1023, is measured in bytes of padding length. The PLI marks the demarcation point between the payload end and the padding start. The PLI provides a direct figure of the padding length to be removed by the packet combiner at the destination TOR. A padding size range of 0 to 1023 accommodates a range of 0 bytes to 1023 bytes for padding, for a long packet size ranging from 477 bytes to 1500 bytes. Using 11 bits would accommodate any long packet length from 0 bytes to 1500 bytes.

Six spare bits 358 complete a long packet container header 404 with 72 bits, or 9 bytes.

The trailer includes end sequence 352 and CRC check 354. An eight-bit CRC check 354 may be placed across the container. Alternatively, another CRC check length, or another method of integrity validation may be used.

End sequence 352 may be eight bits. Alternatively, another end sequence, for example a two byte distinctive pattern, or no end sequence, may be used. The total overhead is 11 bytes. In other examples, other overhead amounts may be used.

Figure 21:
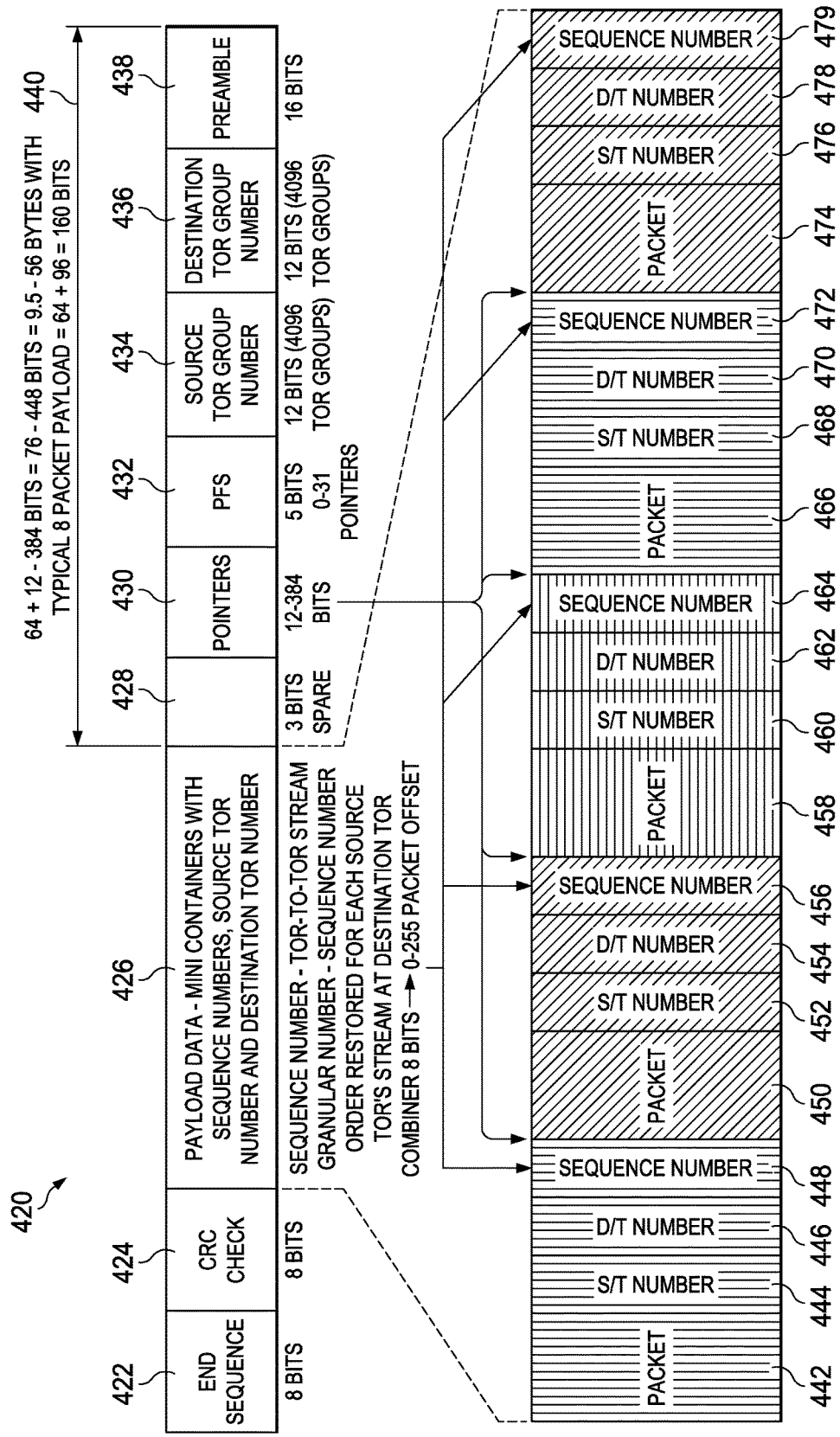
FIG. 21 illustrates an embodiment short packet container.

FIG. 21 illustrates short packet transport structure 420, an embodiment transport structure for carrying multiple short packets in a grouped TOR approach. The short packet containers, while carrying traffic from one TOR group to another TOR group, are carrying traffic from multiple TORs within that group to multiple TORs within the destination group. The short packet transport structure contains a header, the payload, and trailer. Payload data 426 includes multiple mini-containers, each including the packet header, and the sequence number, individual source TOR number, and individual destination TOR number for one short packet. The payload is sized to make the overall transport container the same size as the long packet container, which facilitates switching the short packets and the long packets by the same switch. Because the header size is variable, the payload may be from about 1420 bytes to about 1490 bytes. Packets with a length between the shortest packet and the maximum short packet are mapped into the payload.

Payload data 426 includes multiple short packets, sequence numbers, individual source TOR addresses, and individual destination TOR addresses corresponding to the packets. For example, packets 442, 450, 458, 466, and 474 respectively correspond to individual source TOR addresses 444, 452, 460, 468, and 476, individual destination TOR addresses 446, 454, 462, 470, and 478, and sequence numbers 448, 456, 464, 472, and 479. The destination TOR addresses and source TOR addresses may be 4 bits to address up to 16 TORs in a group, while the TOR group number may be 12 bits, to address up to 4096 TOR groups, and sequence numbers may be eight bits each. In other examples, other sizes may be used, such as 6 bits, 8 bits, or 10 bits. The individual destination TOR numbers are used for directing the packets to the destination TOR within the destination TOR group. Also, the individual source TOR numbers are used in re-sequencing the packet streams. Additionally, the sequence numbers are used for restoring the ordering of the streams from the source TORs at the destination TOR packet combiner. The sequence numbers may be 8 bits for a packet offset of between 0 and 255. The mini-containers in a short packet transport structure have the same source TOR group number and the same destination TOR group number.

The header includes preamble 438, destination TOR group number 436, source TOR group number 434, PFS 432, pointer field 430, and three spare bits 428. The preamble may be a two byte distinctive pattern. Alternatively, a different length preamble, or no preamble, may be used.

The destination TOR group number 436 is the address of the TOR group for this short packet transport structure. The destination TOR group number may be 12 bits, for addressing up to 4096 TOR groups. Similarly, the source TOR group number 434, which may also be 12 bits, can identify up to 4096 source TOR groups. The source TOR address, including the source TOR group and individual source TOR number, may be used for sequence integrity when the short packet containers and long packet containers are combined.

Pointer field 430 delineates the packet boundaries between the mini-containers. Pointer field 340 contains up to 32 12-bit pointers, which take 48 bytes. The pointers define 31 mini-container boundaries in the payloads. Up to 12 mini-containers may be used in a short packet container.

PFS 432 has five bits to identify up to 32 pointers. PFS may be used to dynamically vary the pointer size. Pointer field 430 may be adjusted based on the number of pointers in use. When fewer pointers are used, more space may be given for the payload data.

The header also optionally contains 3 spare bits. Header 440 may be from about 8.5 bytes to about 55 bytes. In one example, with an eight packet payload, the header is 152 bits.

The trailer includes CRC check 424 and end sequence 422. An eight-bit CRC check 424 may be placed across the entire container. Alternatively, another CRC check length, or another method of integrity validation, may be used.

End sequence 422 may be one or two bytes with a distinctive pattern. Alternatively, no end sequence, or another end sequence, may be used.

Figure 22:
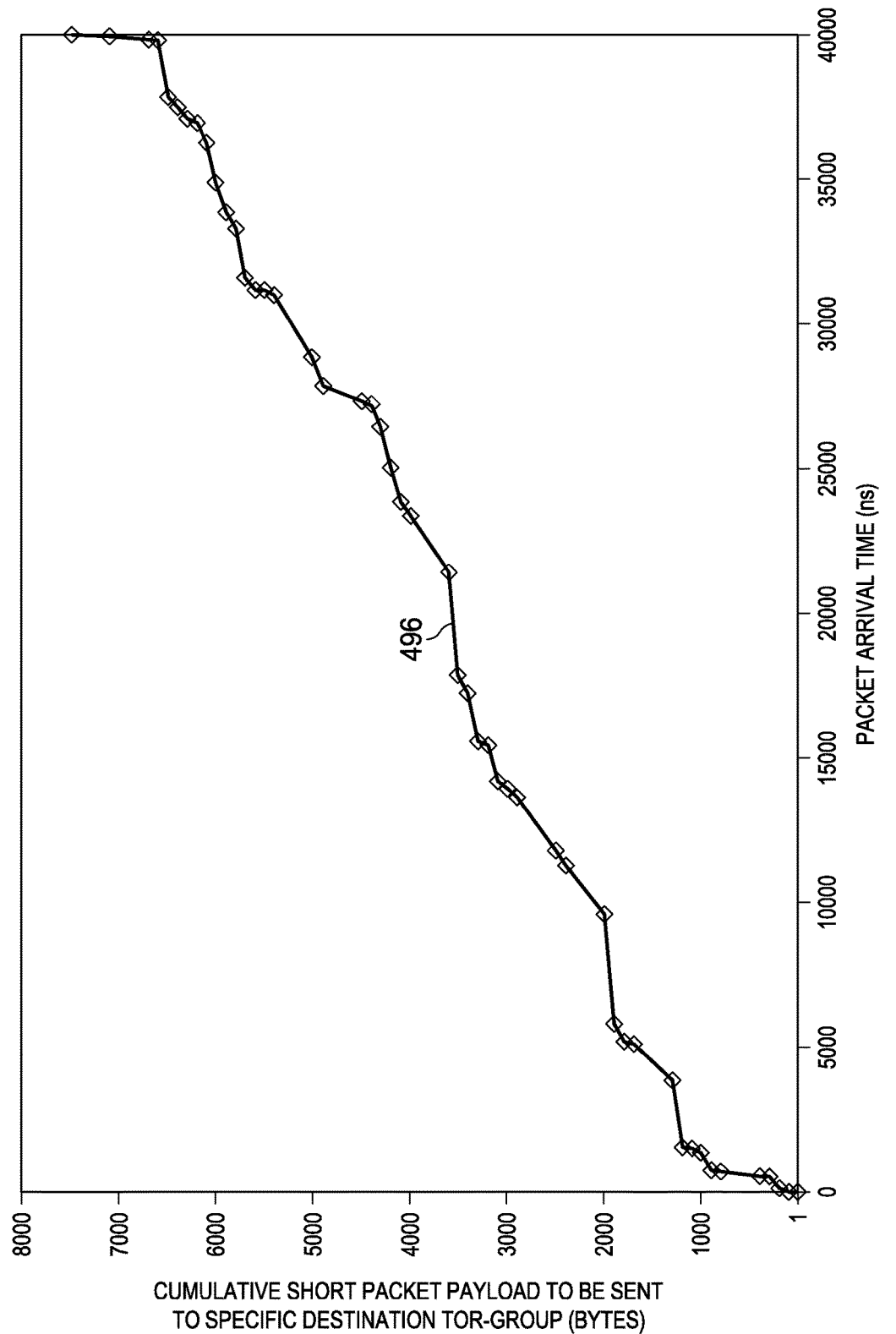
FIG. 22 illustrates a graph of cumulative short packet payload to be sent to a specific destination TOR group.

A model is used to analyze the effects of bringing together the short packet traffic of an entire TOR group and switching that traffic photonically as TOR group-to-TOR group connections before directing the streams out to individual TORs. FIG. 22 illustrates traffic in a specific stream with 1024 TORs in groups of 16 TORs, with equal traffic per TOR. Curve 496 shows a graph of cumulative short packet payload to be transmitted to a specific destination TOR group over time.

Figure 23:
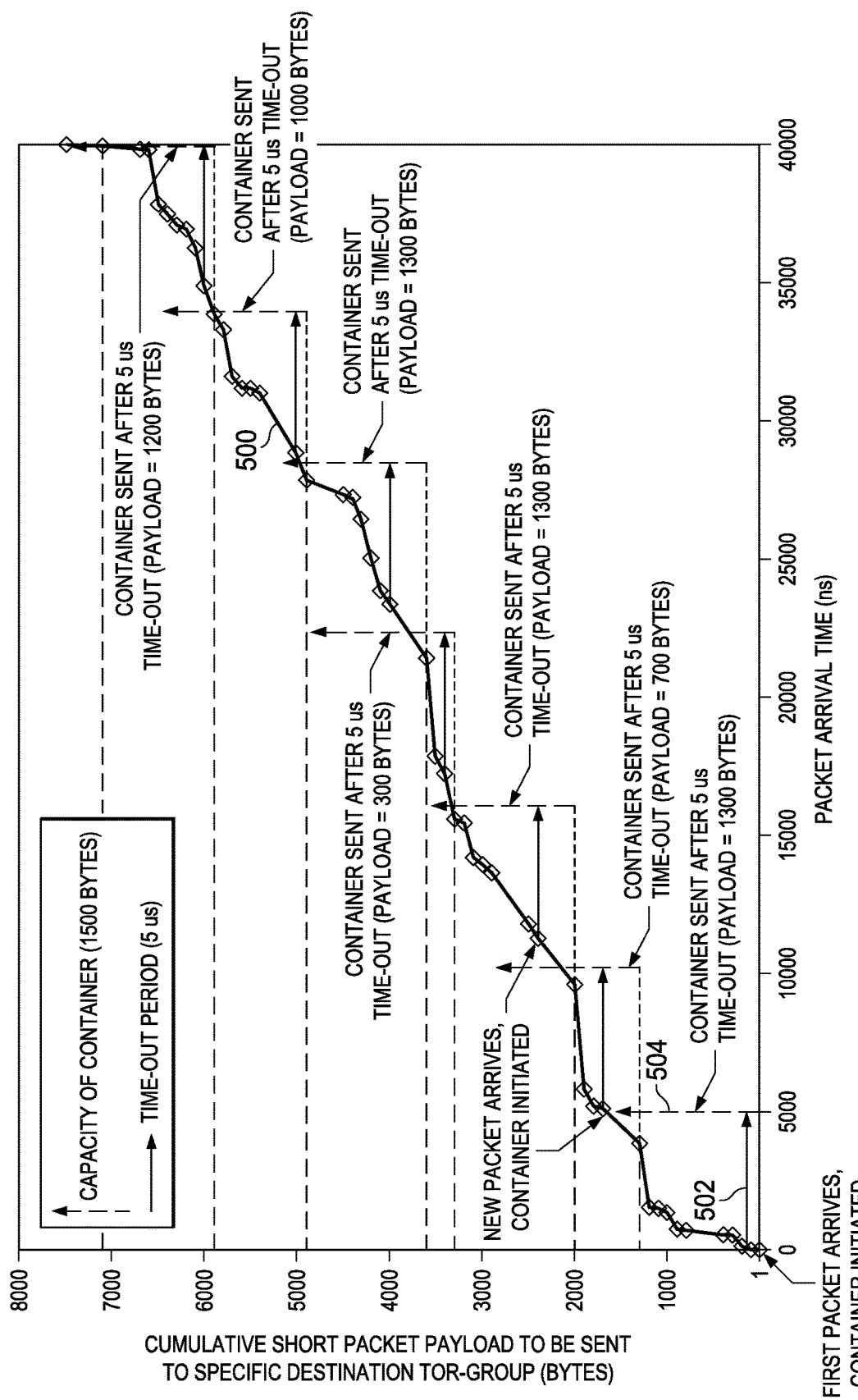
FIG. 23 illustrates another cumulative probability graph of packet arrival time.

FIG. 23, which is based on FIG. 22, shows the traffic in a specific stream for a 1024 TOR data center with 16 TORs per group and equal traffic per TOR group, with a 5 µs timeout and 1500 byte payload containers. Curve 500 shows the packet arrivals, lines 502 show the timeout period, and lines 504 show the container transmission. A fill rate of about 68% is achieved. However, none of the containers are completely filled, and they are all transmitted when the timeout period expires.

Figure 24:
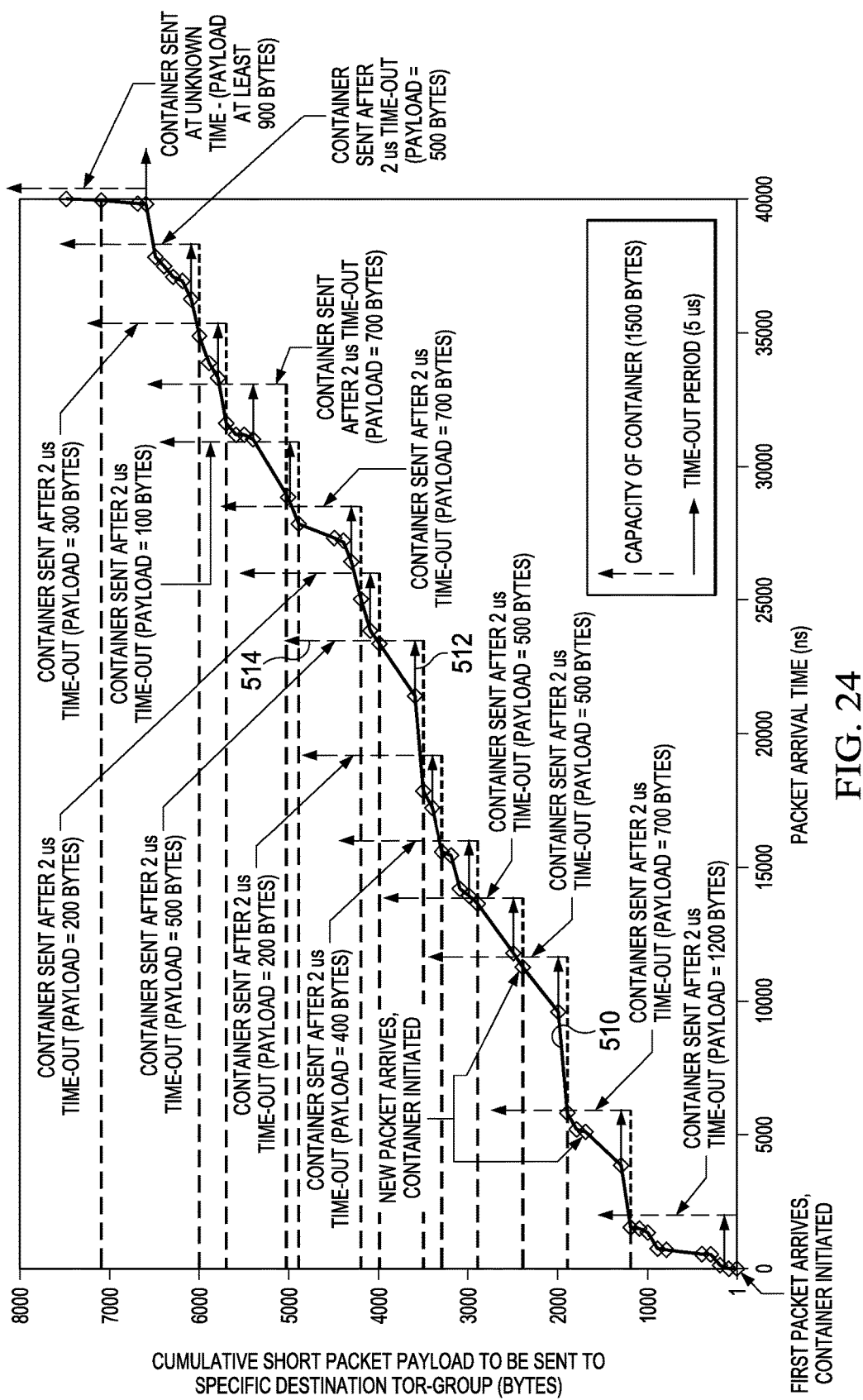
FIG. 24 illustrates an additional cumulative probability graph of packet arrival time.

FIG. 24 illustrates a graph of traffic in a specific stream with 1024 TORs in groups of 16 TORs, with equal traffic per TOR, with a 2 µs timeout and 1500 byte payload containers. Curve 510 shows the arrival of packets, lines 512 show the timeout period, and lines 514 show the container transmission. The efficiency is about 35%.

The container fill may be improved by increasing the time-out, which adds to the delay. However, when the short packet container has a shorter duration, and consequently a smaller payload capacity, than the long packet container, the short packet container fill may be improved and the bandwidth expansion may be reduced without increasing the time-out.

A faster and lower port count switching fabric may be used to switch the short packet transport containers than to switch the long packet containers. A frame size of about 30 ns to about 40 ns or less may be used for the short packet transport containers. The short packet transport container may be in the range of from about 375 bytes to around 500 bytes, or at or above the size of the largest short packet. Container concatenation may be used to facilitate the short packet transport container to be smaller than the largest short packet. For example, a short packet transport container may be 300 bytes, 200 bytes, 150 bytes, 100 bytes, or another size. The use of 500 byte containers leads to a bandwidth growth of about 2:1 or better for the small packets. A shorter container may be used, which may, for example, hold at most 4 to 8 mini-containers. With 8 mini-containers in a packet and an 8 bit source TOR number within a group, an 8 bit destination number within a group, an 8 bit sequence number, and a minimum fill of 9 50 byte packets, the maximum container payload size is 424 bytes.

Figure 25:
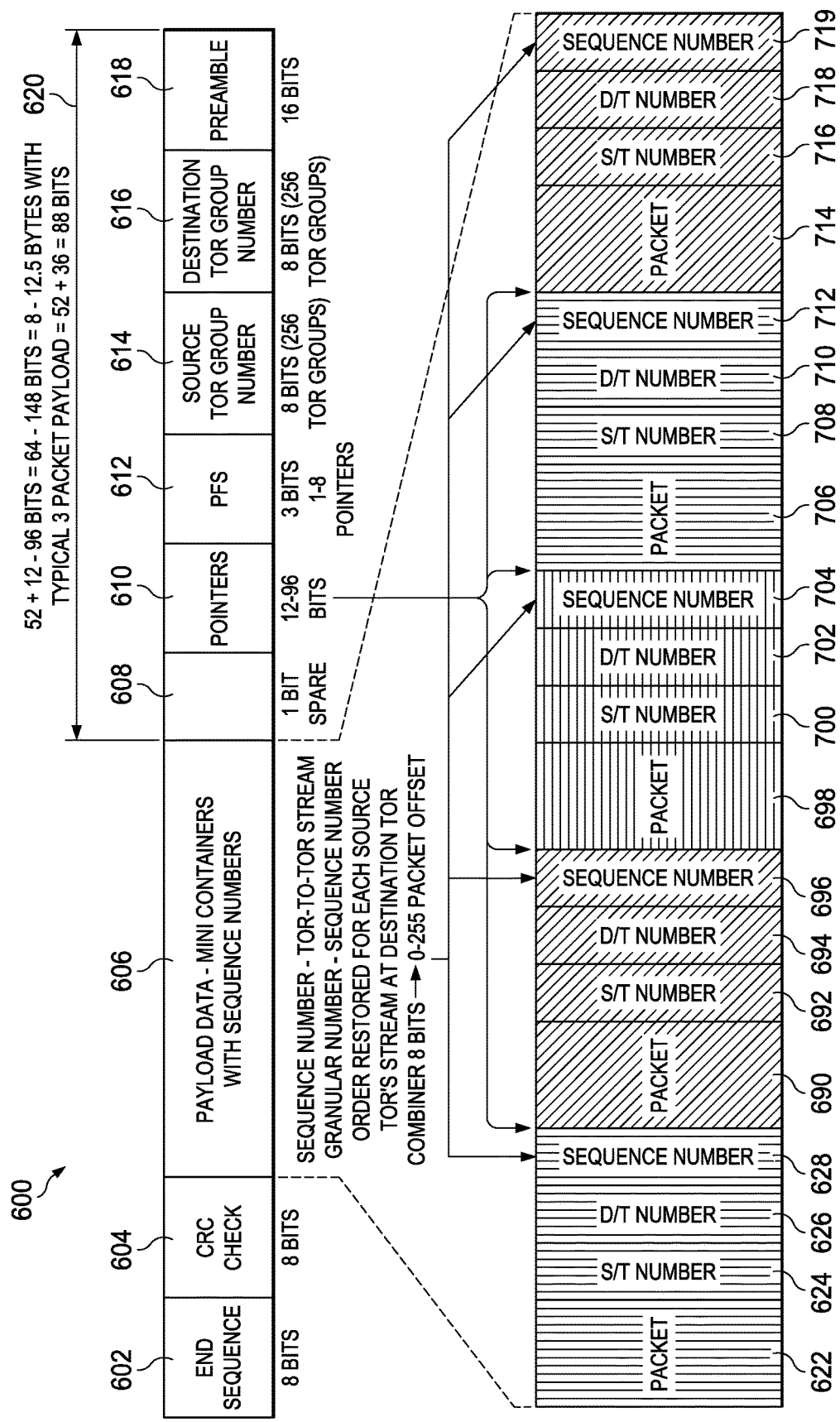
FIG. 25 illustrates another embodiment short packet transport structure.

FIG. 25 illustrates a 40 ns short packet transport container 600. The short packet transport container contains a header, a payload, and a trailer. Payload data 606 includes multiple mini-containers, including the packet header, and the sequence number, individual source TOR number, and individual destination TOR number, for the short packets. The payload window size may be around 490 bytes, with the longest short packet being at or below that level. When concatenation is used, the payload size may be shorter, for example 200 bytes, or the payload size may be maintained and the threshold for long/short packets set higher, for example about 980 bytes, or twice the payload of one container. Because the header size is variable, the payload size may vary somewhat. Packets with a length between the shortest packet and the maximum short packet are mapped into the payload. Payload data 606 includes multiple short mini-containers, and sequence numbers, individual source TOR numbers, and individual destination TOR numbers corresponding to the mini-containers. For example, packets 622, 690, 698, 706, and 714 correspond to individual source TOR numbers 624, 692, 700, 708, and 716, respectively, individual destination TOR numbers 626, 694, 702, 710, and 718, respectively, and sequence numbers 628, 696, 704, 712, and 719, respectively. The individual destination TOR numbers, and individual source TOR numbers, may be four bits for TOR groups with 16 TORs, and sequence numbers may be 8 bits for a 256 packet control sequence. Another number of bits, such as 10 or 12, may be used for the length of sequence numbers. In other examples, other sizes may be used for the TOR address within the group, such as 3 bits, 6 bits, or 8 bits. The individual destination TOR numbers are used for directing the packets to the destination TOR within the TOR group. Also, the individual source TOR numbers and the sequence numbers are used for restoring the ordering of the streams from the source TORs at the destination TOR packet combiner. The sequence numbers may be 8 bits for a packet offset of between 0 and 255. The mini-containers have the same source TOR group number and the same destination TOR group number.

The header includes preamble 618, destination TOR group number 616, source TOR group number 614, PFS 612, pointer field 610, and spare bits 608, one spare bit. The preamble may be a two byte distinctive pattern. Alternatively, a different length preamble, or no preamble, is used.

The destination TOR group number 616 is the address of the TOR group for this short packet transport structure. It may be 12 bits, to identify up to 4096 TOR groups, or may be another number of bits. Similarly, the source TOR group number 614 may be 12 bits to identify up to 4096 source TOR groups, or may be another number of bits. The source TOR address, including the source TOR group and source TOR number, may be used for sequence integrity when the short packet containers and long packet containers are combined.

Pointer field 610 delineates the packet boundaries between the mini-containers. Pointer field 610 contains up to 8 12-bit pointers, which take 12 bytes. The pointers define up to 8 mini-container boundaries in the payloads.

PFS 612 has three bits to identify 0 to 8 pointers. PFS may be used to dynamically vary the pointer size. Pointer field 610 may be adjusted based on the number of pointers in use. When fewer pointers are used, more space may be given for the payload data.

The header also optionally contains 1 spare bit. Header 620 may be from about 8 bytes to about 12.5 bytes. In one example, with a three packet payload, the header is 88 bits.

The trailer includes CRC check 604 and end sequence 602. An eight-bit CRC check 604 is placed across the entire container. Alternatively, another length of CRC check, or another method of integrity validation, may be used.

End sequence 602 may be one or two bytes with a distinctive pattern. Alternatively, no end sequence, or another end sequence, may be used.

Figure 26:
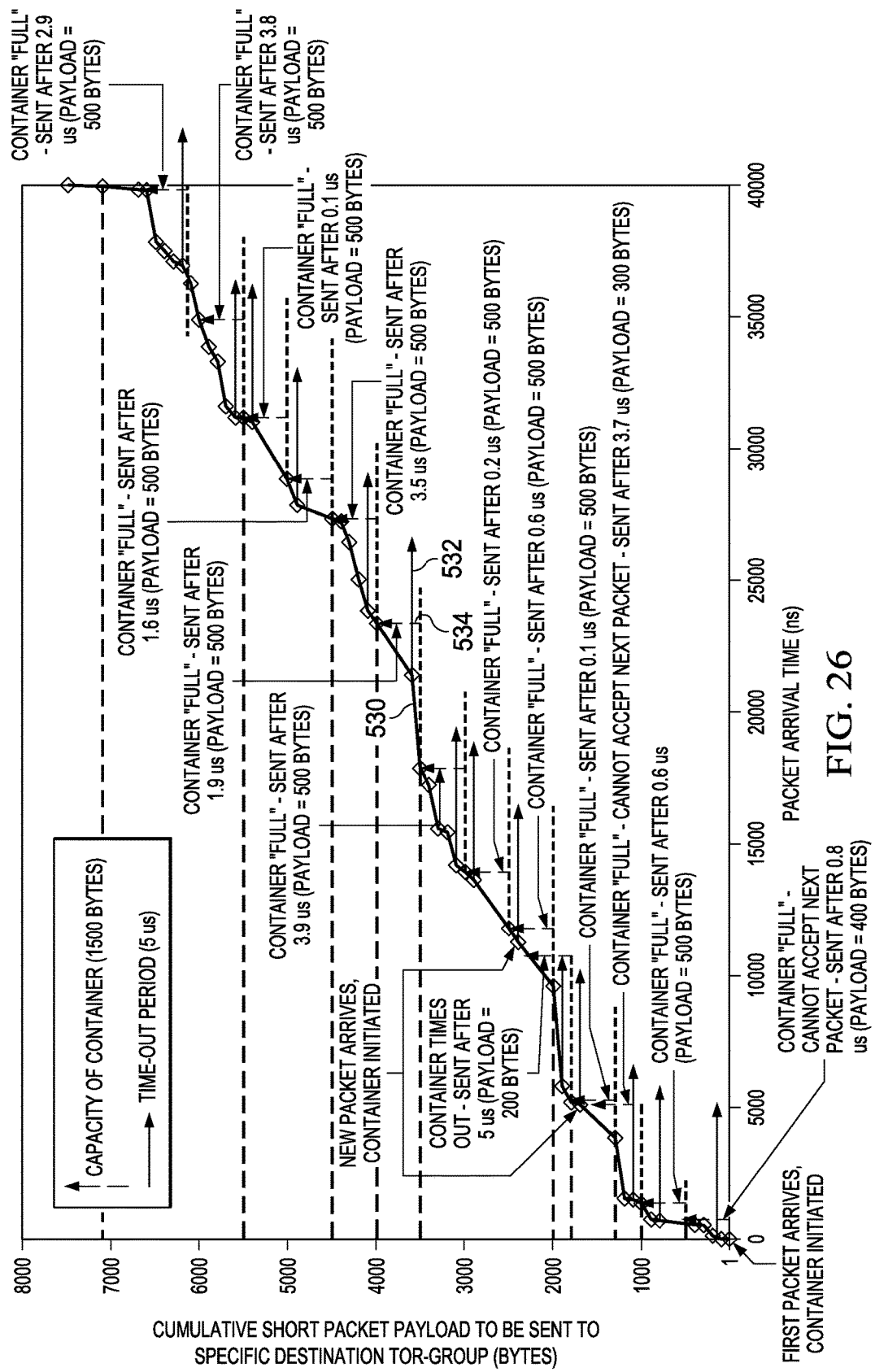
FIG. 26 illustrates another cumulative probability graph of packet arrival time.

FIG. 26 illustrates modeled containerized behavior for a 500 byte short packet transport container with a 5 μs timeout and groups of 16 TORs. The markers on the curve 530 show the arrival of packets, lines 532 show the timeout duration, and lines 534 show the container transmission. A majority of the containers fill completely and are transmitted before the timeout. The average fill is 84%, corresponding to a short packet bandwidth expansion of 1.19:1, and the average delay is 2.05 μs. However, individual ACKs and NACKs may be individual single packet isolated flows, which may experience the full timeout and bandwidth expansion.

Figure 27:
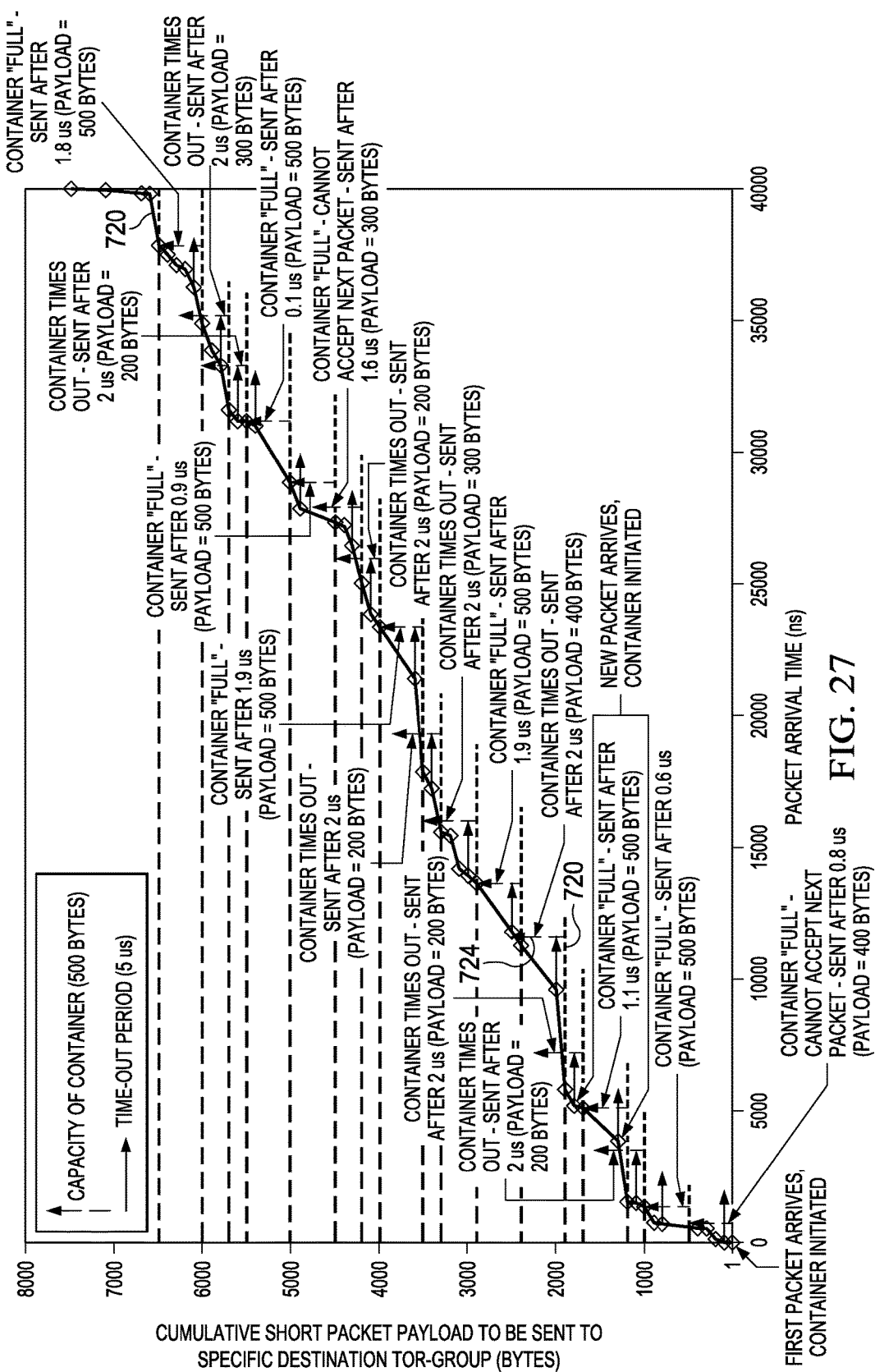
FIG. 27 illustrates an additional cumulative probability graph of packet arrival time.

The delay may be further reduced by reducing the timeout, which also potentially reduces the container fill. This might not be problematic, because the containers are small. FIG. 27 shows the traffic with 1024 TORs with 500 byte payload containers, a 2 μs timeout, and a TOR grouping with 16 TORs. Curve 720 shows the packet arrivals, lines 722 show the timeout period, and lines 724 show the packet transmission. A significant portion of the containers fill completely and are transmitted before the timeout, although many containers timeout before filling. The average fill is 73%, corresponding to a short packet bandwidth expansion of 1.37:1, and the average delay is 1.57 μs. The maximum delay is 2 μs, set by the time-out. Individual ACKs and NACKs may be individual single packets in isolated flows.

The payload size may be reduced by slowing the container clock from 100 GHz to between about 33 GHz and about 50 GHz, reducing the payload capacity from 1500 bytes to between about 500 bytes and about 750 bytes. The short packet photonic switch has about two to three times the number of ports to accommodate a 33 GHz clocking rate compared to the number of ports needed to accommodate a short packet photonic switch at 100 GHz clocking, resulting in an increased port count over a higher speed short packet container switch. For a grouped switch structure with groupings of 16 TORs per TOR group, the switch port count changes from one-sixteenth of that of the long packet switch to one-eighth or three-sixteenths of the port count of the long packet switch. The use of a slower clock and shorter frame times facilitates creation of containers with a 200 byte payload or less with frame times of 30-60 ns. Such containers use concatenation for the few percent of short packets which are over about 200 bytes.

In another example, the clock rate is the same, and the switch frame is shortened, for example to between about 40 ns and about 60 ns. This involves producing a connection map at a rate two to three times faster than the long packet photonic switch for a separate short packet photonic switch. The short packet photonic switch may be smaller, for example 6.25%, 12.5%, or 25% of the port count of the long packet photonic switch, corresponding to grouping levels of 16, 8, or 4 respectively.

Figure 28:
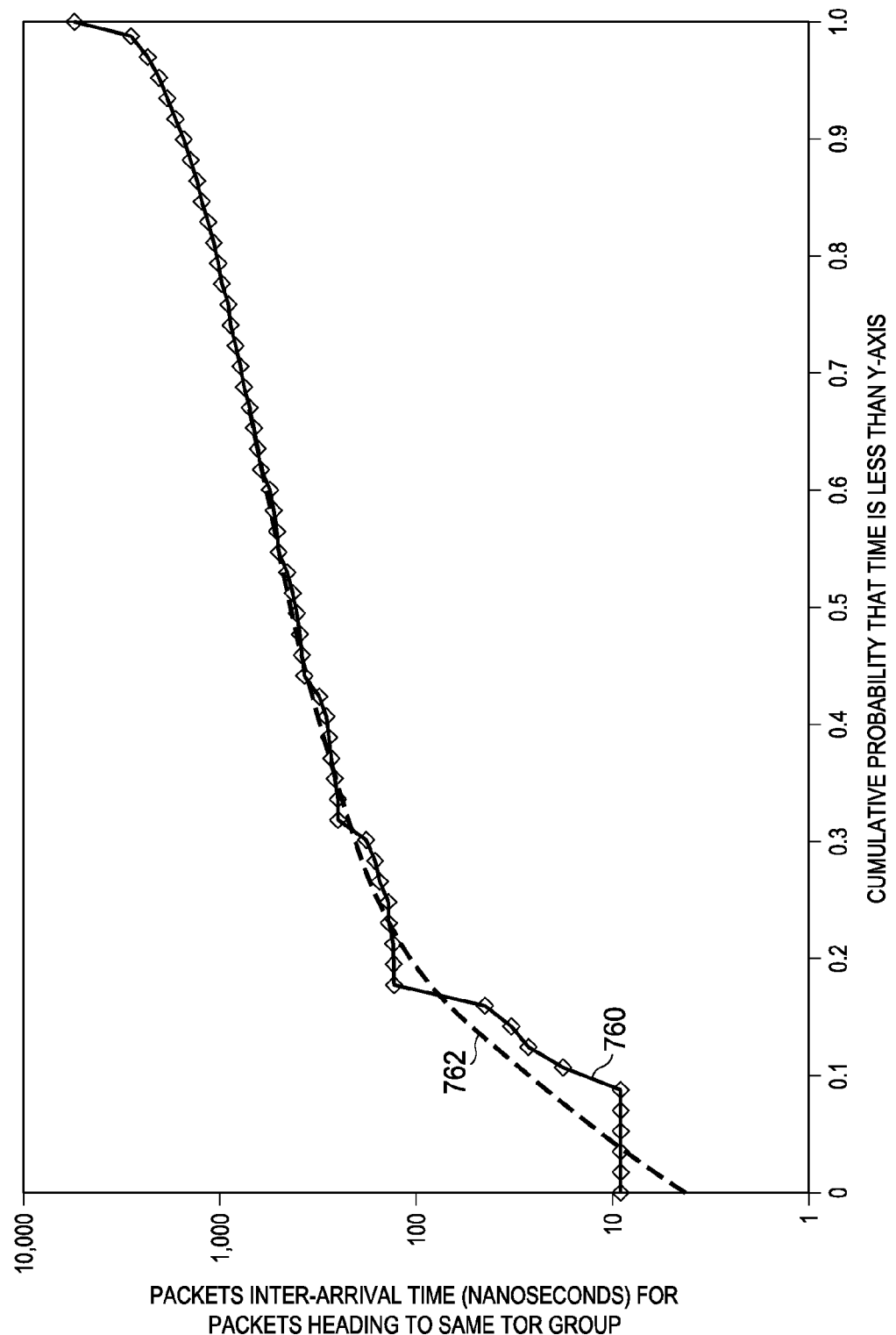
FIG. 28 illustrates a graph of ordered packet inter-arrival time.

FIG. 28 illustrates the cumulative distribution of the packet inter-arrival times for TOR groups with 16 TORs in a 1024 TOR data center. Curve 760 shows the model results, with distortion from the use of specific quantized levels of packet length in the model. Curve 762 shows the estimated real world behavior with random packet lengths. There is a median packet inter-arrival time of around 400 ns, so on average, a 2 μs timeout captures around five packets in a container, and a 5 μs timeout captures around 12 packets per container. Because the packets are a mix of lengths, the best performance may be achieved when the container is just able to hold a single longest short packet or a single largest short packet at the maximum concatenation level when concatenation is used.

An embodiment dual path photonic packet switch includes a packet splitter, a source side multi-TOR short packet conditioner, a long packet photonic switch, a short packet photonic switch, a destination side multi-TOR short packet conditioner, and a packet combiner. The packet splitter includes long packet containerization, connection requests, flow control/rejected container retransmission, long packet sequence marking, short packet sequence marking, and TOR number addressing. The packet splitter is associated with each source TOR, and may be integrated in the TOR. Alternatively, the packet splitter may be a standalone device. The packet splitter generates two optical signals to the core switch complex, and receives two signals from the core switch complex, as well as a short packet mini-container flow to the MTSPC.

The packet streams to be switched enter the packet splitter where the destination TOR group number, individual destination TOR number within the destination TOR group, source TOR group number, individual source TOR number, and the length are established for an incoming packet. The packet is associated with a sequence number, for example the next sequence number associated with its destination TOR. After the sequence numbers have been allocated, the packets are split into separate streams for long packets and short packets, depending on whether they have a length above or below a length threshold. The long packets are padded to a fixed length, accelerated, and containerized, where the container header contains the source and destination TOR addresses, for example in the form of a TOR group number and individual TOR number. The container header also contains the sequence number and additional features. A stream of fixed length containers may be space switched by the long packet photonic switch. A stream of short packets, with the short packets in a mini-container, is passed to the MTSPC, which combines the short packets in a source TOR group with mini-containers from other TORs within the destination TOR group. Destination TOR group specific transport containers are assembled, which are switched by a short packet photonic switch.

The long packet containers are transmitted to the core in photonic form as traffic for photonic switching. Also, the advanced timing connection requests for each long packet container are transmitted to the core, so the core switch controller may set up the connection in advance with sufficient time to set up the connection, but not necessarily enough time to report the success of the connection. The packet splitter receives connection ACKs and NACKs from the long packet container switch. Also, the packet splitter receives timing control feedback from the long packet switch to maintain the packet splitter output timing and framing on the long packet container path, so the containers arrive at the switch with aligned inter-container gaps. Additionally, the packet splitters in a TOR group provide to the MTSPC for streams of mini-containerized short packets and corresponding destination group addresses for that TOR group.

The MTSPC maps the mini-containers into destination TOR group specific transport containers. The MTSPC provides the interfaces to the short packet photonic switch. The MTSPC transmits the short packet container stream, with one packet per container or per concatenated container sent in an optical form as traffic for the short packet photonic switch. Additionally, the MTSPC transmits the advance timing connection requests for the short packet transport containers so the short packet photonic switch may set up a connection in advance. The connection request is transmitted sufficiently in advance for the connections to be set up, but not necessarily with sufficient time to report the connection success, so a copy of each sent container is placed in the sent container store. The MTSPC receives ACKs and NACKs from the short packet photonic switch and deletes the appropriate container from the sent container store when it receives an ACK or retransmits (and re-stores) the copy of the container when it receives a NACK. The MTSPC also receives a timing control feedback signal from the short packet photonic switches to maintain the MTSPC output timing and framing on the short packet container path so the containers arrive at the switch with aligned inter-container gaps at the switch input, having traversed the intervening fiber cabling.

The two photonic switches switch the container streams under control of their respective switch controllers. The switched photonic streams are then output to the packet combiner for reintegration.

Figure 29A:
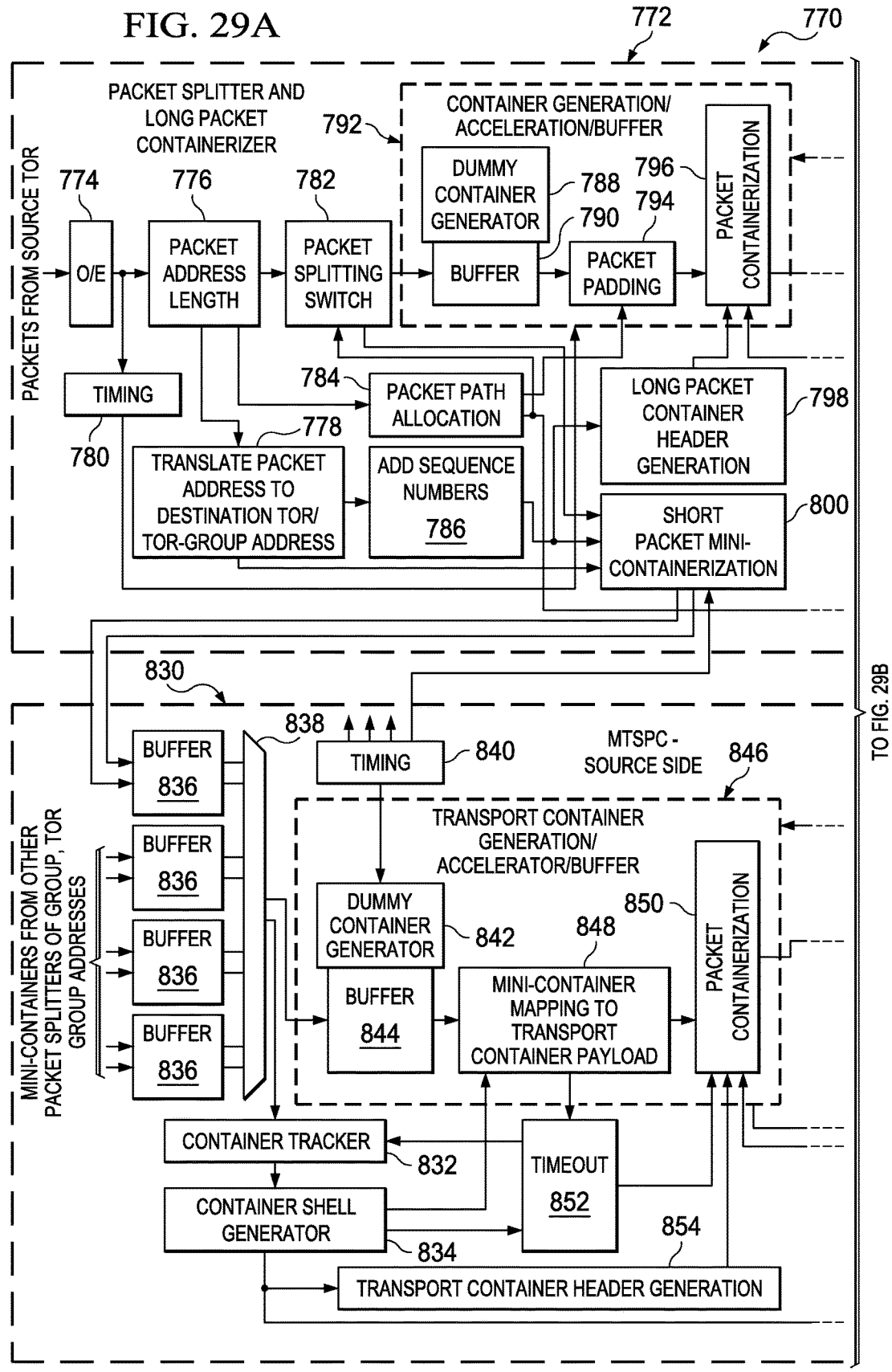
FIGS. 29A-B illustrate an embodiment packet splitter and source side multi-TOR short packet containerizer (MTSPC)
Figure 29B:
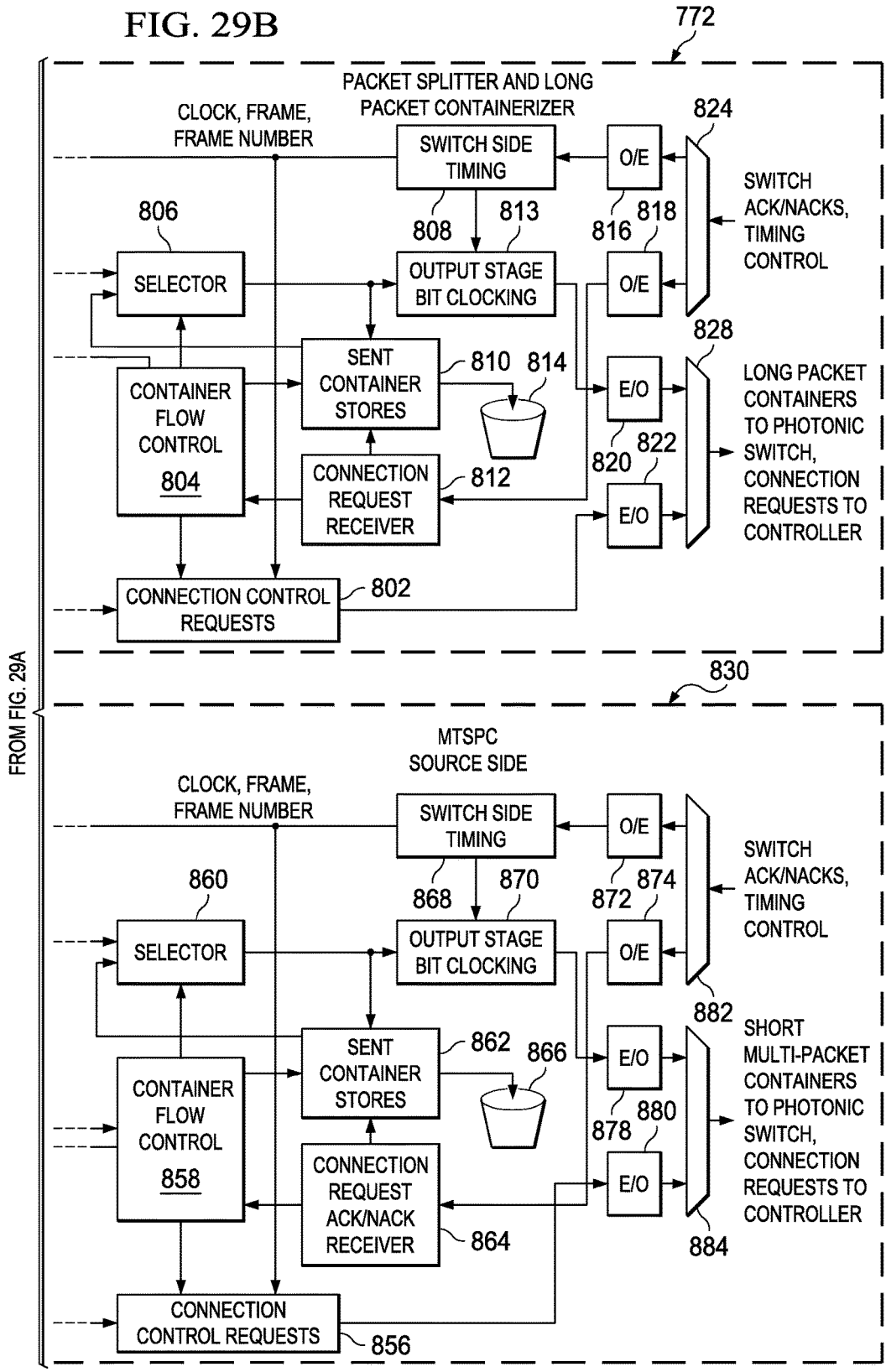

FIGS. 29A-B illustrate packet splitter and source side MTSPC 770 with packet splitter 772 and source side MTSPC 830. Packet splitter 772 performs a variety of functions. The source and destination TOR addresses are determined, along with the packet length. The packet length is compared to a threshold, and the packets are split into sub-streams based on this comparison. Also, sequence numbers are assigned to each packet of each TOR-TOR flow for reintegration at the destination. The long packets are padded to a fixed payload length, and the boundary between the packet and the padding is generated. Also, for the long packets, a container header and/or trailer are generated, and the padded long packets are containerized. Connection requests are transmitted to the long packet photonic switching fabric in advance of the long packet container transmission. The long packet containers may be accelerated to accommodate short bursts of shorter than maximum packets and to facilitate a good IPG/ICG for the level of switch set up time and switch skew. A fixed time after requesting a connection, the long packet containers are transmitted to the long packet photonic switch, where the time is sufficient to set up the connection, but not necessarily enough time to receive an ACK or a NACK. The transmitted containers are stored in a sent container buffer for retransmission in the event that a NACK is received. If an ACK is received, the container is discarded from the sent container store. The short packets are assembled into individual mini-containers with the sequence number, individual destination TOR number within a TOR group, and individual source TOR address within a TOR group. Also, a destination TOR group address is associated with each mini-container prior to propagation to the MTSPC. The source group address is unique to all traffic exiting a specific MTSPC, so is known by the MTSPC, and may be added into the transport container by the MTSPC.

Source side MTSPC 830 performs a variety of functions, including multiplexing mini-container streams from the packet splitters for TORs in the TOR group into a stream for transport containerizing. Mini-containers are mapped into transport containers based on their destination TOR group. A timer is started upon container creation, which is tracked, and when the timer times out (or the container payload is full), the transport container is transmitted to the short packet photonic switch. The mini-containers are mapped to the transport container payload based on the destination TOR group, and pointer information is generated to mark the boundaries between individual mini-containers. A header and/or trailer are generated for the transport containers. Multiple mini-containers may be placed in a transport container. A connection request is transmitted in advance of a transport container to the short packet photonic switch, so the short packet photonic switch may be set up in advance of transmitting the transport container. The short packet transport containers are conditioned, which may include container acceleration. The short packet transport containers are transmitted a fixed time after a connection request to the short packet photonic switch, where the period of time is sufficient to set up a connection in the short packet photonic switch, but not necessarily sufficient to receive an ACK or NACK for the connection. The transmitted containers are stored in a sent container store. If an ACK is received, the stored containers are discarded, and if a NACK is received, the stored containers are marked for retransmission, and later retransmitted and re-stored.

A 100 Gb/s data stream of packets enters the packet splitter from the source TOR. This packet stream is converted from an optical stream to an electrical stream by optical to electrical (O/E) converter 774. This may be done using a byte wide or wider structure to match the clock speeds.

The packet addresses and packet lengths are read in packet address module 776. The packet addresses, which may be specific server/server flow granular addresses, are translated into individual destination TOR and TOR group numbers. In one example, this is generated by a process of mapping the destination server/server flow address to the destination TOR address, which is the TOR address for that server. This may be done by a pre-loaded look-up table, or may be a part of the overall server or server flow address. Alternatively, when the packet address is integrated in a TOR, the destination TOR and TOR group addresses are directly available. The destination TOR address is output in the form of a destination TOR group number and an individual destination TOR number within the destination TOR group. Similarly, the source TOR number is output in the form of a source TOR group number and an individual source TOR number within the source TOR group. The length of the packet may be read from the packet header, for example from bits 16-31 of the packet header, or by directly measuring the packet length as it enters the address reader.

The packet length information is passed to packet path allocator 784, which compares the packet length to a packet length threshold. In one example, the packet length threshold is fixed. Alternatively, the packet length threshold is adjusted dynamically, for example on a data center wide basis or a TOR specific basis, so the splitting process dynamically adapts to the traffic. When the packet length is greater than or equal to the packet length threshold, the packet is determined to be a long packet. When the packet length is less than the packet length threshold, the packet is determined to be a short packet. Packet path allocator 784 passes the decision to packet splitting switch 782. Also, the packet path allocator provides the decision to long packet connection request block 802, which requests a connection for the long packet container, and to long packet container header generator 798, which generates a header for long packets.

Packet splitting switch 782 diverts the individual packets of the streams into long packet processing or short packet processing based on the packet threshold decision from packet path allocator 784. The long packet stream is passed to long packet container generation block 792, and the she short packet stream is transmitted to mini-containerization block 800.

In mini-containerization block 800, the short packets are placed in mini-containers, which are transmitted to source side MTSPC 830.

The long packet stream is fed to long packet container generation block 792, which conditions the long packets. Each packet is containerized, synchronized, and timed for transmission to the long photonic switch. Long packet container generation block 792 contains buffer 790 with dummy packet generator 788, packet padding module 794, and packet containerization module 796. Also, there may be two separate buffer elements, an input buffer and an output buffer. As pictured, buffer 790 provides both delay and acceleration based on timing information from timing block 780 to the clock rate, framing, and frame timing of the photonic switch. In other examples, one buffer provides delay and another buffer provides acceleration. The photonic switch side of the long packet container generator is synchronously locked to the photonic switch timing, for the containers from the packet splitters and combiners to arrive aligned and at the same rate at the photonic long packet switch.

The packet stream exits the buffer at the photonic switch clock rate, which is faster than the input clock rate, so the buffer fill is constantly being depleted. When a packet is read out of the buffer, the buffer output halts while the packet is padded with a padding sequence in packet padding module 794. The padding leads to the packet having a fixed payload length. For example, the packets may be padded to a standard length, such as 1500 bytes. A variable amount of padding may be added based on the actual packet length, which may be between the maximum packet length and the packet length threshold, which may be in the range of 500 bytes to 1200 bytes.

The padding only introduces a modest bandwidth increase, because most long packets are typically close to the maximum packet length. However, the padding may introduce a large transient increase in the clock rate during the shorter long packets, especially when a sequence of short long packets occurs. However, these tend to be limited in length. The buffer length, and/or placing some of the buffering at the output of the container generator, leads to the clock rate increase being contained and converted into a small static clock rate increase.

While the container generation is occurring for one packet, the next packet can be read out of the buffer. The output clock rate may be a higher multiple above the input clock rate than the average increase in size of the switched entity from the packet padding and containerization process, so the buffer tends towards underflow. Underflow may be avoided by adding dummy traffic by dummy packet generator 788. Dummy packets may be used to maintain signals during periods of low packet traffic, for maintenance or test purposes, and/or with very low priority packets or containers which may be preempted, for example for contending traffic containers to be retransmitted.

Packet container header information is generated in packet container header generator 798 based on the sequence numbers from sequence number block 786, the destination TOR group number, and the individual destination TOR number.

Packet containerization module 796 adds the header and footer to the padded long packet to produce a long packet container. While this is occurring, the buffer begins to fill again. Buffer output gapping may also be used. Alternatively, a buffer is placed at the output of the container generation block to increase the ICG to relax the switch set-up time between switching frames. The packet containerization module also performs a CRC calculation over the assembled containerized padded packet and writes the computed CRC checksum data in the container. The container then exits packet containerization module 796 for selector block 806.

Selector block 806 may interrupt the flow of containers out of long packet container generation block 792, for example for transmission or retransmission of a container which has not been delivered. The selector is controlled by a control algorithm, which may, for example, transmit valid new traffic first before retransmitting containers. In this example, the selector facilitates the newly formatted containers from the container generation module to flow through to the output stage bit clocking block 813 for a steady stream of new traffic, minimizing delay on new traffic. However, this may result in significant delay for traffic containers to be retransmitted, which may build up a backlog in heavy traffic. This may lead to incorrect sequencing of the containers in the output flow or saturating the sent container store 810. Incorrect sequencing may be prevented by using packet-associated sequential per-packet stream number sequences, which facilitates the detection of incorrect sequencing at the packet combiner, and correcting the sequence before the streams exit the packet combiner. However, other retransmission may be used, including retransmitting the packets first, which minimizes the delay of retransmitted containers, but results in a short hold time for the incoming traffic while the container is inserted. This does not disrupt the relationship between connection requests and transmitting new containers when the retransmission is at least one container signaling delay ahead of the decision by the packet splitter to retransmit a stored container. In other examples, an intermediate method may be used. In an alternative example, instead of receiving a NACK, the packet splitter may receive a frame number reserved for retransmitting the rejected payload. Then, the frame numbers for the new containers already signaled but not yet transmitted may be shifted one frame under coordination between the switch controller and the packet splitter.

Packets passed to output stage bit clocking block 813 are also written into sent container store 810, where they are stored until an ACK or a NACK is received from the long packet photonic switch. The ACK or NACK may arrive before or after the container is written to the sent container store. If an ACK is received, the container is deleted from the sent container store in trash 814. If a NACK is received, the container is marked for retransmission.

ACKs, NACKs, and timing control information are received in wavelength division demultiplexer 824 from the long packet photonic switch. The ACKs/NACKs are on one wavelength, and the timing control information is on another wavelength.

The ACKs/NACKs are routed to O/E converter 818, to be converted from optical signals to electrical signals.

The electrical signals are routed to connection request receiver 812. Connection request receiver 812 requests that sent container store 810 deletes a container when an ACK is received, and requests a retransmission in container flow controller 804 when a NACK is received.

When the sent container store has a container for retransmission and a dummy packet has been created in the initial buffer, the packet container slot is usurped by selector block 806 when the dummy packet emerges. In the meantime, long packet connection request block 802 requests a connection for the container to be retransmitted from the long packet photonic switch. When the dummy packet container reaches the selector switch, it is discarded, and the selector connects the sent container store to output stage bit clocking block 813 to retransmit the container.

In one example, a container is automatically retransmitted after the expiration of a period of time if no ACK or NACK has been received. This interrupts new non-dummy traffic by holding the new traffic in the output stage buffer of the container generation module.

The sent container store 810 may store 100 Gb/s packets for up to about 5 µs to about 10 µs, at which time an ACK or NACK may be received. For a 500 m connection, the time of flight is around 2.5 µs, or 5 µs for round trip. This may lead to a storage capacity of about 500 kbits or 64 kB.

Output stage bit clocking block 813 provides fine tuning of the data timing into electro-optic conversion so the arrival time of the start of the container is precisely aligned in time with the start of the switch frame at the input to the long packet switch. Additional details on the timing are included in U.S. patent application Ser. No. 14/508,676.

The containers are transmitted to electrical-to-optical (E/O) converters 822 to convert the signals from the electrical domain to the optical domain. The traffic is multiplexed with the connection request by WDM 828, for transmission of the long packet containers to the long packet container photonic switch.

Read packet address module 776 passes the packet address to translate packet block 778, where the packet address is converted into a destination TOR group number and an individual destination TOR number within the destination TOR group, which is passed to long packet connection request block 802 via sequence number block 786.

Long packet connection request block 802 associates the address with a particular frame number indicating the timeslot for which a connection will be requested, for either a long or short packet, depending on the packet size. The address is then mapped into a messaging format for propagation to E/O converter 820 for a long packet container, where it is converted from an electrical signal to an optical signal. It is then wavelength division multiplexed by WDM 828 with the long packet traffic. The use of WDM facilitates the use of a single fiber for the long packet container path, reducing the number of optical fibers and facilitating a similar time of flight delay. Long packet connection request block 802 also transmits retransmission requests for packets from sent container store 810.

Timing control information is converted from an optical signal to an electrical signal in O/E converter 816.

Then, switch side timing module 808 adjusts the timing based on this received signal.

Short packets are routed to mini-containerization block 800, where the source and destination TOR addresses within the source and destination TOR group and the sequence number are appended to the short packet to form a mini-container. The stream of mini-containers is fed, along with the destination TOR group number, to source side MTSPC 830.

Source side MTSPC 830 multiplexes or combines the mini-container streams from multiple packet splitters from multiple TORs in the same TOR group into much higher capacity streams. Buffers 836 receive mini-container streams from TORs within the source TOR group. They are read out and buffered by multiplexer 838. The composite stream goes into short packet container block 846.

Short container generation block contains buffer 844, which is coupled to dummy packet generator 842, mini-container mapping module 848, and packet containerization module 850. Container shell generator 834 feeds a delineation marker to define the start and end of a new container payload. This is controlled by timeout block 852, which sets the payload accumulation delay before the container payload is passed on for transmission. If the container payload fills before the timeout period expires, the container can be sent irrespective of the status of the timeout period.

Buffer 844 accumulates mini-containers, and is loaded with dummy packets from dummy packet generator 842 when there are no mini-containers. Buffer 844 provides a controlled delay for timing the containers. Rate conversion from the clock rate extracted from the input data by output stage bit timing block 840 to the clock rate, framing, and frame timing/numbering for the short packet photonic switch is made during the buffer, for example by inserting dummy containers from dummy packet generator 842. Switch reference timing information is provided from the short packet photonic switch. Thus, the multiplexed short packet container side of the splitter is synchronously locked to the photonic switch timing. The packet stream exiting the buffer in the form of concatenated mini-containers is at the photonic switch clock rate, which is faster than the input clock rate. Thus, the buffer fill is constantly being depleted. Because the buffer output clock rate is greater than the input clock rate, the buffer tends towards underflow. Dummy packets are inserted as needed to prevent underflow to keep the signals alive during periods of low packet traffic, for maintenance and/or testing, and/or as low priority packets/containers. When the transport container generator is sufficiently far in the process for one packet, the next packet is read out of buffer 844.

The mini-containers are mapped to transport structures in mini-container mapping module 848. The generation of a new transport structure is controlled by timeout block 852, which sets the accumulation delay. When the container payload fills, the container can be sent irrespective of the status of the timeout period.

Packet container header information is generated in packet container header generator 854 based on the sequence numbers, the destination TOR group number, and the individual destination TOR number.

The container header and trailer are added to the short packet transport container by packet containerization module 850.

Containers exiting short packet container block 846 are containerized, synchronized, and approximately timed to arrive at the short packet photonic switch at the correct frame. After sufficient time, the next container is read out from the buffer.

When the transport container generator functions are sufficiently completed on one packet, the next short packet transport container is read out from the buffer.

Selector 860 may interrupt the flow of containers from short packet container block 846, for example for retransmission of a container which has not been successfully delivered. The selector is controlled by a control algorithm. For example, newly formatted containers from short packet container block 846 may have priority over retransmitted containers for a steady stream of new traffic to output stage bit timing block 840, and to reduce the delay for new traffic. However, this may significantly delay containers for retransmission, leading to a backlog of containers in heavy traffic conditions, which may lead to problems in container sequencing or the saturation of sent container store 862. Sequencing problems may be corrected for by using a packet-associated sequential per-packet stream numbering sequence for detection and correction of sequence problems at the packet combiner. In other examples, retransmitted containers may be prioritized over new containers. Intermediate methods may also be used. In an additional example, the switch processing may transmit a frame number reserved for retransmitting the rejected container, in which case the frame number for the new containers which have been signals but not yet transmitted may be shifted by one frame, which may be coordinated by the switch controller and the packet splitter.

Transport containers passed to output stage bit timing block 870 are stored in sent container store 862 until an ACK or a NACK is received. When an ACK is received, the transport container is discarded in trash 866. On the other hand, the transport containers are marked for retransmission when a NACK is received. The ACK or NACK may arrive before or after the container is initially transmitted.

ACKs, NACKs, and timing control information are received by wavelength division demultiplexer 882, which separates the ACKs/NACKs from the timing control information. Timing control information is converted from an optical signal to an electrical signal by O/E converter 872. Then, the timing in output stage bit timing block 868 is adjusted based on the received timing control information. Based on the timing control information, the multiplexed short packet container photonic switch side of the splitter/conditioner is strictly synchronously locked to the photonic switch timing, which facilitates the containers from all of the TOR groups arriving aligned and at the same clock rate as the short packet photonic switch.

The ACKs and NACKs are also converted to electrical signals by O/E converter 874. Then, they are received by connection request ACK/NACK receiver 864. When an ACK is received, connection request ACK/NACK receiver 864 causes the container to be discarded from sent container store 862. When a NACK is received, connection request ACK/NACK receiver notifies container flow control module 858, which retransmits the container based on the selection algorithm.

When sent container store 862 has a transport container marked for retransmission, and a dummy packet is being created in buffer 844, the packet container slot is usurped by selector 860. In the meantime, connection control request block 856 requests a connection for the transport container to be retransmitted. When the dummy packet container reaches the selector, it is discarded, and the selector connects sent container store 862 to output stage bit timing block 870 for retransmission.

In one example, when neither an ACK nor a NACK is received after a certain period of time, the transport container is retransmitted, and interrupts new non-dummy traffic by holding the new traffic in an output buffer of short packet container block 846.

The sent container store may have capacity to store containers for about 5 μs to about 10 μs, which may be approximately the round trip time to the short packet photonic switch. This may be about 64 kB of storage.

Output stage bit timing block 870 provides fine tuning of the data timing so the container arrives at the short packet switch precisely aligned to the start of the switch frame.

After retiming, the transport containers are passed to E/O converter 878 to be converted from the electrical domain to the optical domain for transmission.

The optical signals are multiplexed by WDM 884 for transmission to the short packet photonic switch. The containers are WDM multiplexed with the short packet connection request optical carrier.

Read packet address module 776 determines the address of the packet, and passes the address to translate packet block 778, where the packet address is converted into a destination TOR group number and individual destination TOR number. In some examples, translate packet block 778 may not be used. The destination TOR group address is passed to short packet mini-containerization module 800 and through buffers 836 and multiplexer 838 and container tracker 832.

Container tracker 832 determines whether a transport container to that destination TOR group is already open and accepting additional payload packets, i.e., a transport container to that TOR group was opened less than a timeout period previously, and it still has remaining payload capacity. When a transport container is available, the new packet is added to the payload of that container. When there is not an open container for the destination, the container tracker notifies container shell generator 834, which generates a new container to that destination, and the mini-container becomes the first mini-container in the new transport container. Also, container shell generator 834 passes a connection request to connection control request block 856 to request a connection for the new transport container in the short packet photonic switch. A transport container is completed either at the expiration of the timeout or when the transport container is full. Short packet container block 846 generates a full signal to clear the residual time in the timeout block 852 when the container approaches being full, when the remaining space is less than the length of the next packet. Then, the new packet becomes the first packet of the next container.

Connection control request block 856 associates a requested container destination address with a particular future frame number for a transport container. The request is converted to an optical signal by E/O converter 880, and multiplexed by WDM 884 with the short packet traffic to the short packet core switch. This facilitates the use of one optical fiber between the source side MTSPC and the short packet photonic switching fabric. Also, the time of flight is similar between the traffic and the connection requests.

In one example, container concatenation is used. Concatenation may be used when the payload size of the transport container is shorter than the longest short packet. Packets longer than the payload size are split into two or more containers which are transmitted to the same destination in succession. The short packet photonic switch may be notified of a hold time when concatenated packet connections are requested. When the short packet photonic switch sets up a connection for concatenated packets, it holds the connection for all of the containers carrying the concatenated packet to be switched.

Figure 30:
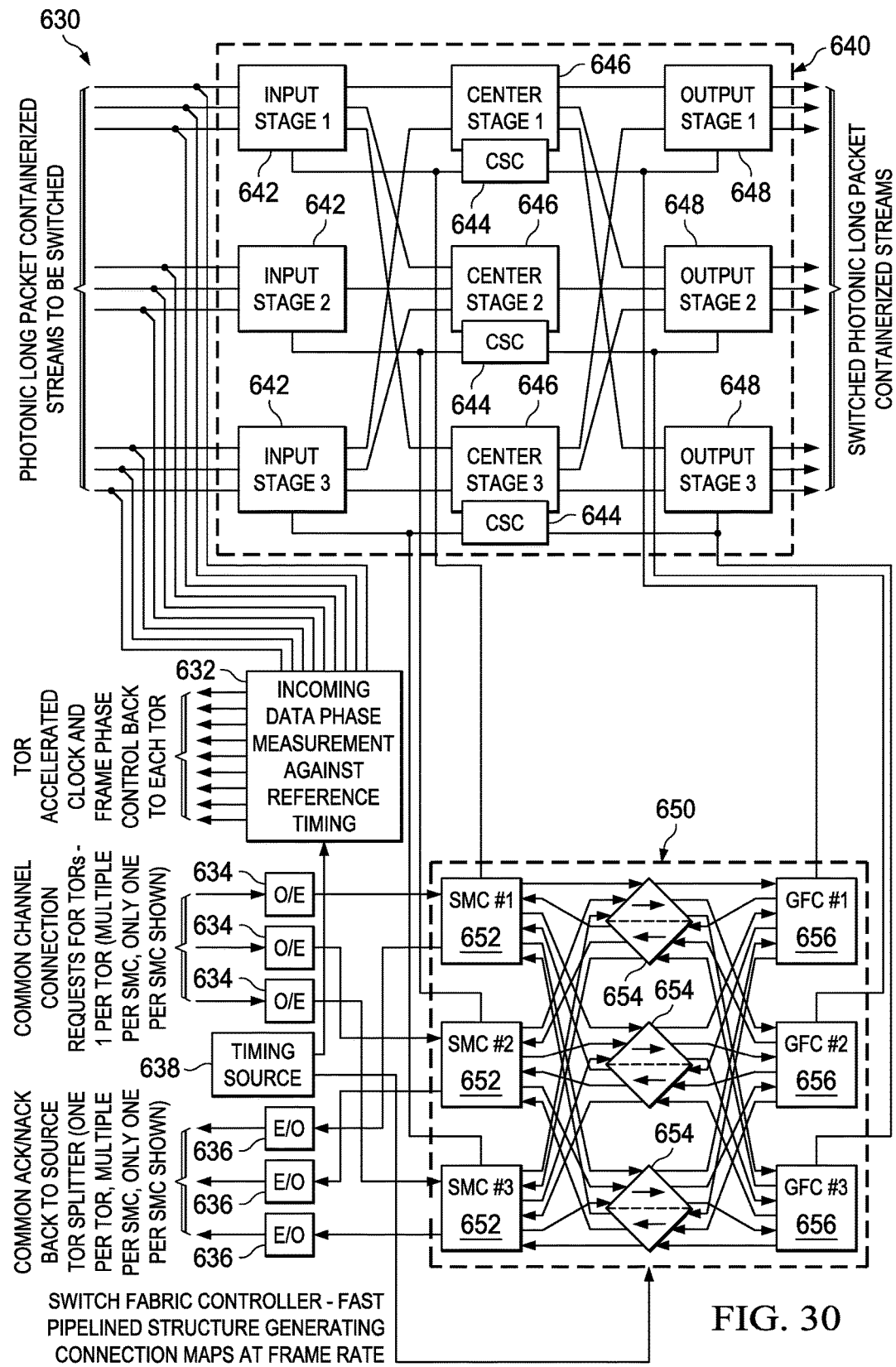
FIG. 30 illustrates an embodiment photonic switch.

FIG. 30 illustrates photonic switch 630, which may be used as a long packet photonic switch. Photonic switch 630 shows photonic switch fabric 640, a three stage Clos structure, but a variety of alternative structures, for example matrixed switching fabrics, may be used. Input stage modules 642 and output stage modules 648 are optical space switches. Center stage modules 646 may be optical space switches with fixed wavelength sources within the packet splitters or arrayed waveguide grating routers (AWG-Rs) with fast tunable wavelength sources. In one example, center stage modules 646 include CSCs 644. The optical space switches may be electro-optic silicon switches or GaAsInP/InP active amplifying crosspoint switches. The photonic long packet container streams are received and switched by photonic switch fabric 640. Additional details on example photonic switching fabrics are discussed in U.S. patent application Ser. No. 14/455,034.

In advance of the photonic switching, the connection requests are received by OLE converters 634 from the TORs. There is one input connection request per input TOR per switch frame period. The connection requests are directed towards switch fabric controller 650.

Switch fabric controller 650 includes a parallel array of SMCs, each associated with an input stage module, and GFCs, each associated with an output stage switch module, and optionally an array of CSCs, each associated with a center stage module. Each of these controllers includes a pipeline of series processors which are interconnected with other processors at specific points in the pipeline by a series of orthogonal mappers. Each stage of each processor performs a specific sub-task or set of sub-tasks in the overall process of generating a connection map before handing over the results of its sub-task to the next processor in the pipeline, either directly or via the orthogonal mapper. This facilitates the generation of a very fast delivery rate of connection maps to match the switch frame time, although these maps may individually be delivered after multiple frame times have elapsed. There may be a prior connection request 2-5 μs before the active switching frame is reached. This overall structure performs fast pipelined control to generate connection maps at the frame rates. Switch fabric controller 650 includes SMCs 652, orthogonal mappers 654, and GFCs 656. The switch fabric controller creates an ACK when a connection is achieved and a NACK when a connection is not achieved.

Some requested connections through the switch cannot be completed, for example because more than one input requests a given output in a given timeslot. Also, the computations may not set up every connection path every time by the end of the control process. When a connection request is not completed, a NACK is generated and returned to the appropriate packet splitter. The packet splitter then attempts to retransmit the copy of the container, which has been stored. When the container path is successfully established, the switch transmits an ACK to the packet splitter, which discards the stored copy of the container. A large majority of containers are successfully set up connected on a first attempt, except under conditions of heavy overloading of a specific destination TOR due to too many other TORs attempting to communicate excessive bandwidths to that TOR. With heavy overloading, back-pressure may be applied from the packet splitter back into the TOR and to the sourcing servers. The ACKs and NACKs are transmitted to the source TORs after being converted to optical signals by E/O converters 636.

The photonic long packet container optical signal is asymmetrically power split, and a small amount of the optical power is routed to data phase measurement module 632, which compares the phase against reference timing from timing source 638, and provides feedback to the TORs on the frame timing. The data phase measurement module detects the received container start point phase, which is the location of the ICG, compares this with the switch clock phase, and feeds back a phase correction signal to the packet splitter timing functions, so that the containers may be correctly phase aligned with the switch clock and frame switching phase when they reach the switch inputs after transiting the intervening fiber cabling.

Figure 31:
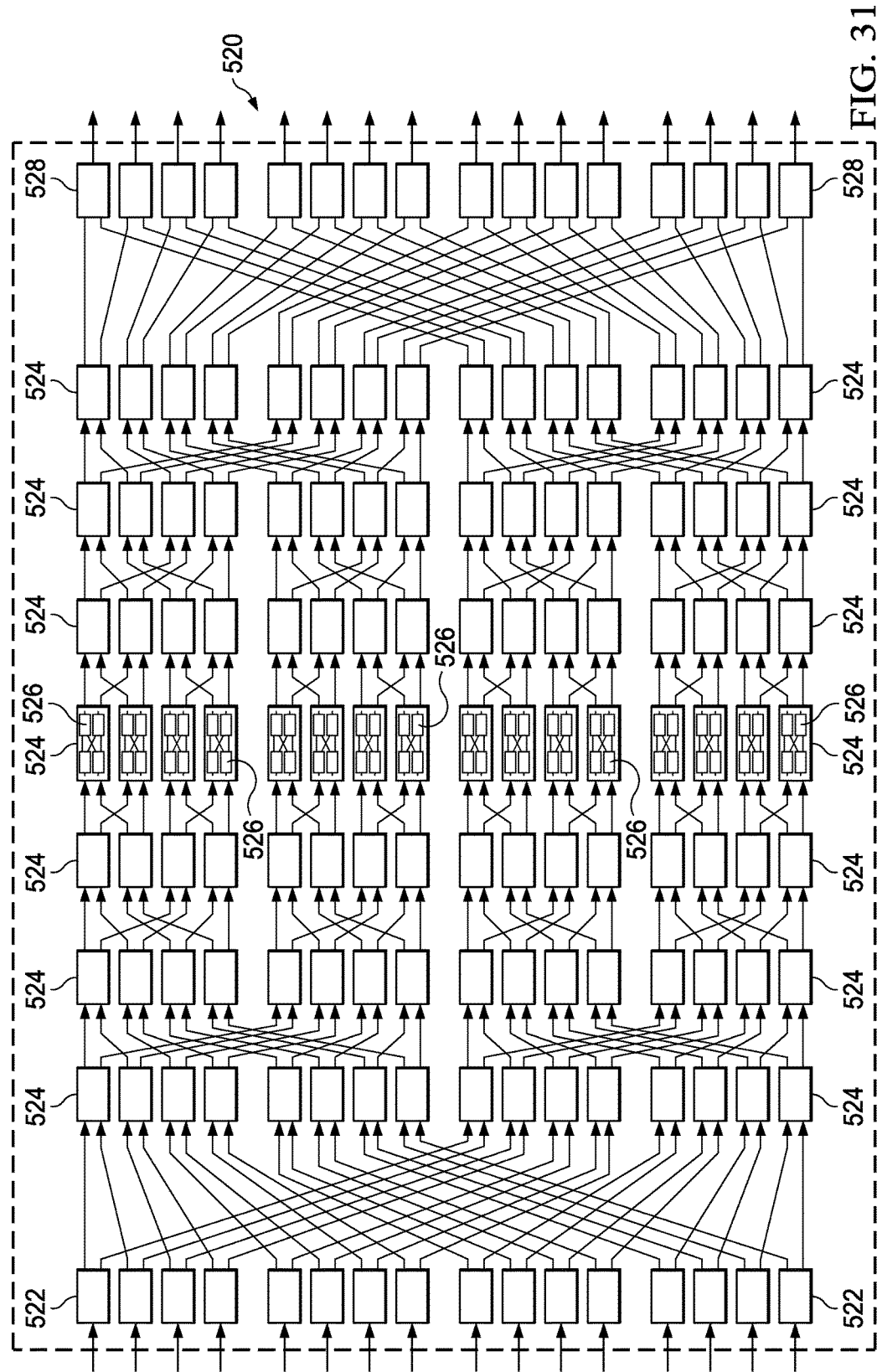
FIG. 31 illustrates an embodiment hybrid dilated Benes (HDBE) photonic integrated circuit (PIC)

The switching stage modules may contain photonic crosspoint switches. One example photonic crosspoint switch is a hybrid dilated Benes (HDBE) photonic integrated circuit (PIC) implemented with 2×2 electro-optic silicon Mach Zehnder switches. FIG. 31 illustrates switching matrix 520, a 192-cell indirectly addressable HDBE 16×16 switching matrix. Input cells 522 receive the inputs, which are switched by switches 524. The central stage of the array of switches 524 contains four switches 526 per switch cell. The outputs are organized by output cells 528. The HDBE switch has path-to-path connection interactions which involve the planning of a given input-output connection in the context of the other input-output connections. In a synchronous application without random pre-existing paths, the set-up algorithm is applied. A simple algorithm may lead to a small residual amount of blocking, because it does not always place all the connections, and involves feedback to the overall fabric control system, slowing the switch responses. A more sophisticated algorithm with re-tries avoids this problem, but may be slower.

Figure 32:
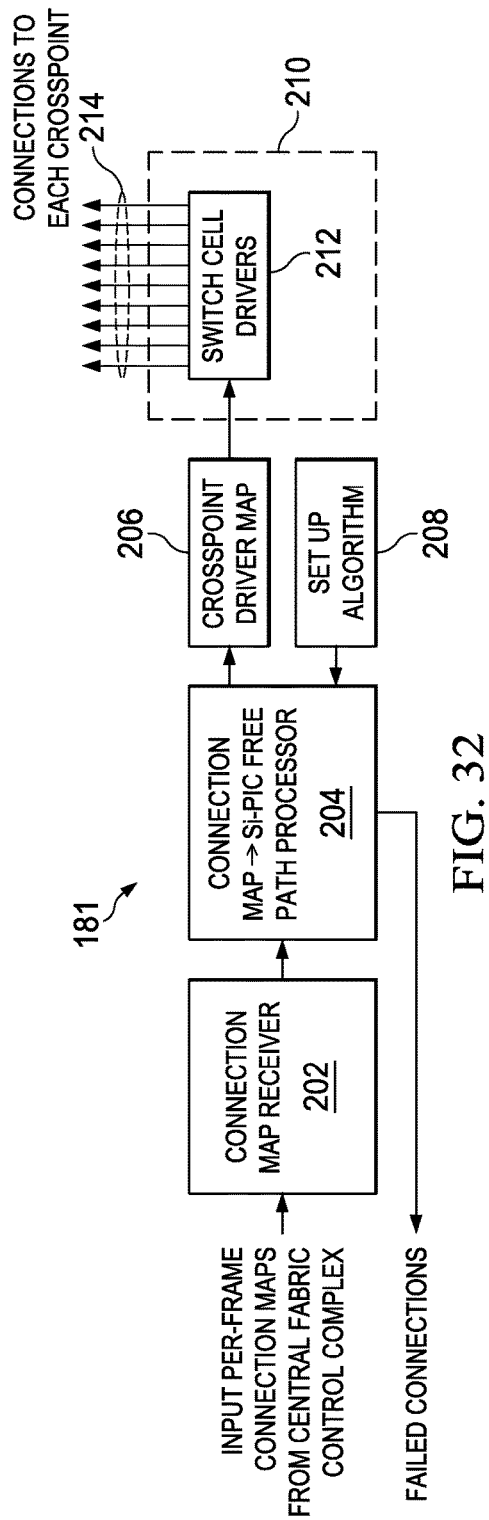
FIG. 32 illustrates an embodiment HDBE PIC controller.

FIG. 32 illustrates control module 181, which may be used, for example, to control switching matrix 520. Control module 181 includes connection map receiver 202, which receives an input per-frame connection map from a central control complex. Connection block 204, which converts the received connection map to a PIC free path processor, uses set up algorithm 208. When there is a failed connection, connection block 204 outputs the failed connection. The connections are output to crosspoint driver map 206. Switch cell drivers 212, in block 210, may be intimately associated with the PIC. For example, each switch cell driver 212 may be mounted directly over the PIC it controls, with mechanical and electrical coupling. The switch cell drivers drive the crosspoints using connections 214.

Figure 33:
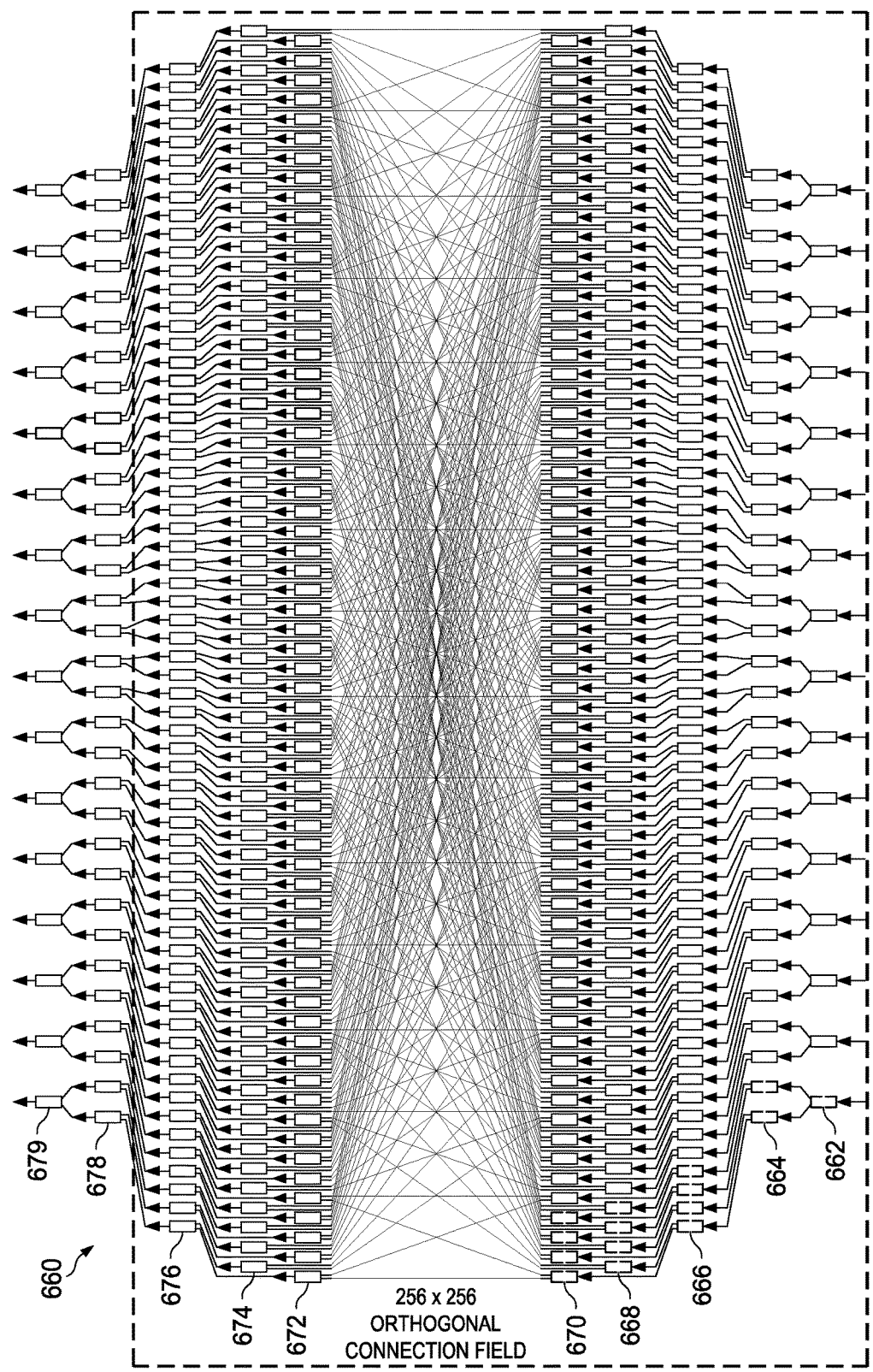
FIG. 33 illustrates an embodiment expand-and-select (EAS) PIC.

In another example, an expand-and-select (EAS) PIC is used. FIG. 33 illustrates photonic switch 660, an EAS PIC topology which uses a larger amount of silicon and a higher crosspoint cell count than the HDBE PIC, but which is strictly non-blocking, has good crosstalk properties, and is directly addressable without a free path search. There are multiple layers 662, 664, 666, 668, 670 of 1×2 switches, coupled to form a binary controlled expansion tree. Switches 668 and 670 are coupled to each of switches 672 and 674 by an intermediate 256×256 orthogonal connection field. Alternatively, more complex interconnect patterns may be used in the other switch stages, and the central connection field may be sixteen 16×16 interconnect fields. Switches 672 and 674 are coupled to switches 676, which are also coupled to switches 678. Additionally, switches 678 are coupled to switches 679, creating a selection tree with one branch of each select being connected to one branch of each expansion tree. Because each switch is a binary 1×2 or 2×1 switch, it may be driven by a single bit of the address, the expansion tree being driven by the output address and the select tree by the input or source address.

Figure 34:
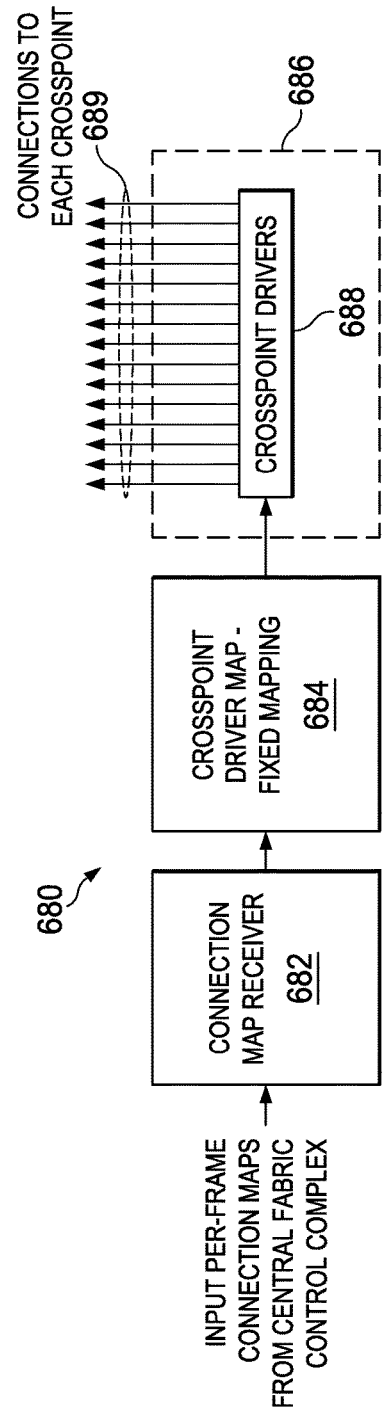
FIG. 34 illustrates an embodiment EAS PIC controller.

FIG. 34 illustrates control system 680, which may be used, for example, to control photonic switch 660. The input per frame connection maps are received from a central control complex by connection map receiver 682. The connections are mapped by crosspoint driver map 684, a fixed mapping. Crosspoint drivers 688 control the connections to the crosspoints with connections 689. Also, crosspoint drivers 688 are in block 686, which is intimately associated with the PIC, for example mounted over the PIC.

The EAS structure is non-blocking and directly addressable, while the HDBE structure is virtually non-blocking and indirectly addressed. A photonic Clos switch fabric based on either the EAS structure or the HDBE structure may be highly dilating for non-blocking capacity at the fabric level and for simplicity in the implementation of the free path search aspects of control. A free path search or free path planning algorithm involves complexity in the control system, because the overall Clos switch fabric would not be directly addressable. In a directly addressable switch, the input to output addressing is constant and known, and is not dependent on other connections. In a highly dilated Clos switch, while a path exits, the intermediate stage-by-stage routing though the switch depends on other connections.

Table 1 shows a comparison between a Clos fabric and a matrix fabric. As the switch size grows, the reduced number of modules of a Clos fabric becomes more significant. However, the Clos input and output modules are rectangular, and have twice the outputs and twice the inputs, respectively, and the center stage modules have twice the inputs and twice the outputs of a matrix module.

TABLE 1

| Number of Input Stages In Parallel | Number of Modules for Clos Switch | Number of Modules for Matrixed Switch | Ratio of Number Matrix Modules to Number of Clos Modules | Ratio of Number of Crosspoints in Non-blocking Matrix Switch to Non-blocking Clos Switch |
| --- | --- | --- | --- | --- |
| 2 | 6 | 4 | 0.667:1 | 0.25:1 |
| 3 | 9 | 9 | 1:1 | 0.375:1 |
| 4 | 12 | 16 | 1.333:1 | 0.5:1 |
| 6 | 18 | 36 | 2:1 | 0.667:1 |
| 8 | 24 | 64 | 2.667:1 | 1:1 |
| 12 | 36 | 144 | 4:1 | 1.333:1 |
| 16 | 48 | 256 | 5.333:1 | 2:1 |
| 24 | 72 | 576 | 8:1 | 2.667:1 |
| 32 | 96 | 1024 | 10.667:1 | 4:1 |
| 64 | 192 | 4096 | 21.333:1 | 8:1 |

Indirect control, with free path search based addressing of the Clos stages, involves a fast complex control system, where the control process is partitioned into many steps in a pipelined process. Some processing steps are related to the inputs and are performed by an SMC, and some of the steps are based on processing data for the outputs in a GFC. An orthogonal mapper is a fast, hardware based, directed router of information between the SMCs and the GFCs. A pipelined process may take multiple data frames to complete, but may deliver one complete connection map every frame from pipelining. Additional details on pipelined control are included in U.S. patent application Ser. No. 14/455,034.

Figure 35:
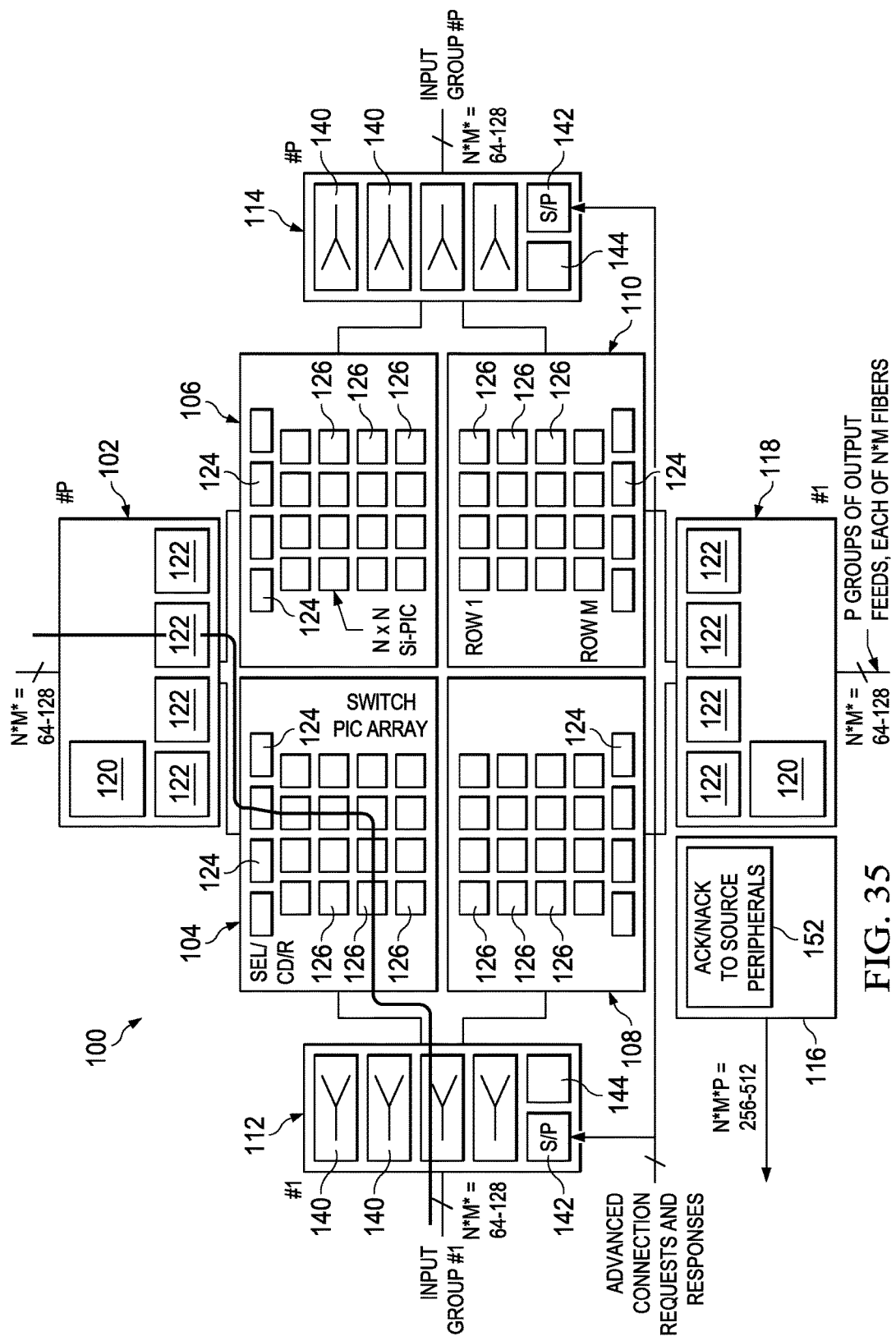
FIG. 35 illustrates an embodiment ultra-fast photonic switch.

FIG. 35 illustrates switch 100, a matrix-based directly addressable photonic switching fabric with integral output port contention resolution which may be used as a short packet container photonic switch, particularly at frame rates faster than those supportable on a 3 stage indirectly controlled photonic switch. Matrix switches show a square-law complexity growth with increased matrixing, which is managed by using macromodules for assembling multiple PICs.

A macromodule is a large area lower resolution passive photonic integrated substrate, which is lithographically constructed, which contains optical tracking and passive optical components. Macromodules may carry and interconnect multiple PICs, for example multiple N×N silicon electro-optic switch PICs. Macromodules also provide a base for hybridizing other components, such as semiconductor optical amplifiers (SOAs) which offset optical losses incurred from complex optical functionality of the PICs due to power splitting the optical signal.

The switching macromodules 108 of switch 100 are arranged in a P×P array (P=2 in FIG. 35) and each macromodule carries $M^2$ switch PIC chips in an M×M array of rows and columns, where each PIC chip has N inputs and N outputs, for a single stage photonic switch of (M*N*P)× (M*N*P). The optical traffic inputs are driven into optical splitters 140 on input macromodule 112 and 114, while the matrix switch outputs are combined by output combiner macromodules 102 and 118, which carry combining switches 122. Combining switches 122 are controlled by column output contention resolution controllers 120 to select only one of the PICs to output on each of the N columnar outputs at a time.

The inputs are optically power-split by arrays of splitters 140 on input blocks 112 and 114, so copies of the inputs are fed to P macromodules 104, 106, 108, and 110, which are hybridized large area precision optical substrates with integrated monolithic optical passive components, optical tracking, and arrays of hybridized photonic and electronic components, including arrays of switch PIC matrices 126 and their corresponding controllers. The macromodules perform optical switching. The macromodules also include selector/output row collision detectors on combiners 124. On macromodules 104, the optical inputs are further optically power-split and fed in parallel into the inputs of a row of M switch matrix PICs, each of which has N inputs and N outputs, which receives optical feeds from N input optical data streams. The optical signal to be switched is then only switched by one of the M PICs.

The signaling request inputs from the sub-groups of sources, for example TORs, are converted from serial to parallel by serial-to-parallel (S/P) converter 142.

During this conversion process, a collision detection module 144 detects the presence within each sub-group of contending requests for the same output port in the same frame period, which would cause an output collision. The contention resolution algorithm associated with the contention detection block causes all but one of the contending requests to be blocked, where the selected request is gated out of the address bus. Blocked connection requests are notified to the collision detection/resolution messaging block 152 in module 116.

The connection requests from the packet splitter are in the form of serial links from each TOR, which are combined in groups matching the port count of the individual PICs (N) and are converted in a serial/parallel converter to an N time-slot frame for each row of each macromodule. Before applying these addresses directly to the macromodule selection, the intra-bus-output-contention on each bus is resolved. Intra-bus-output-contention is when two or more TORs on the same bus request the same destination TOR in the same frame. In this situation, all but one of the connection requests are rejected, and NACKs are sent to the associated packet splitters for the rejected connection requests. Inter-bus-output port contention is addressed in the output columns by the column output contention resolution controller 120 for contention between macromodules and by another controller (not shown) on the macromodules for the PIC column contention, to ensure that only one PIC per column outputs on each columnar line on each frame. Alternatively, both PIC and macromodule contention may be managed by column output contention resolution controller 120, where column output contention resolution controller 120 controls both the macromodule selector switches 122 and the PIC selector switches 124.

Figure 36B:
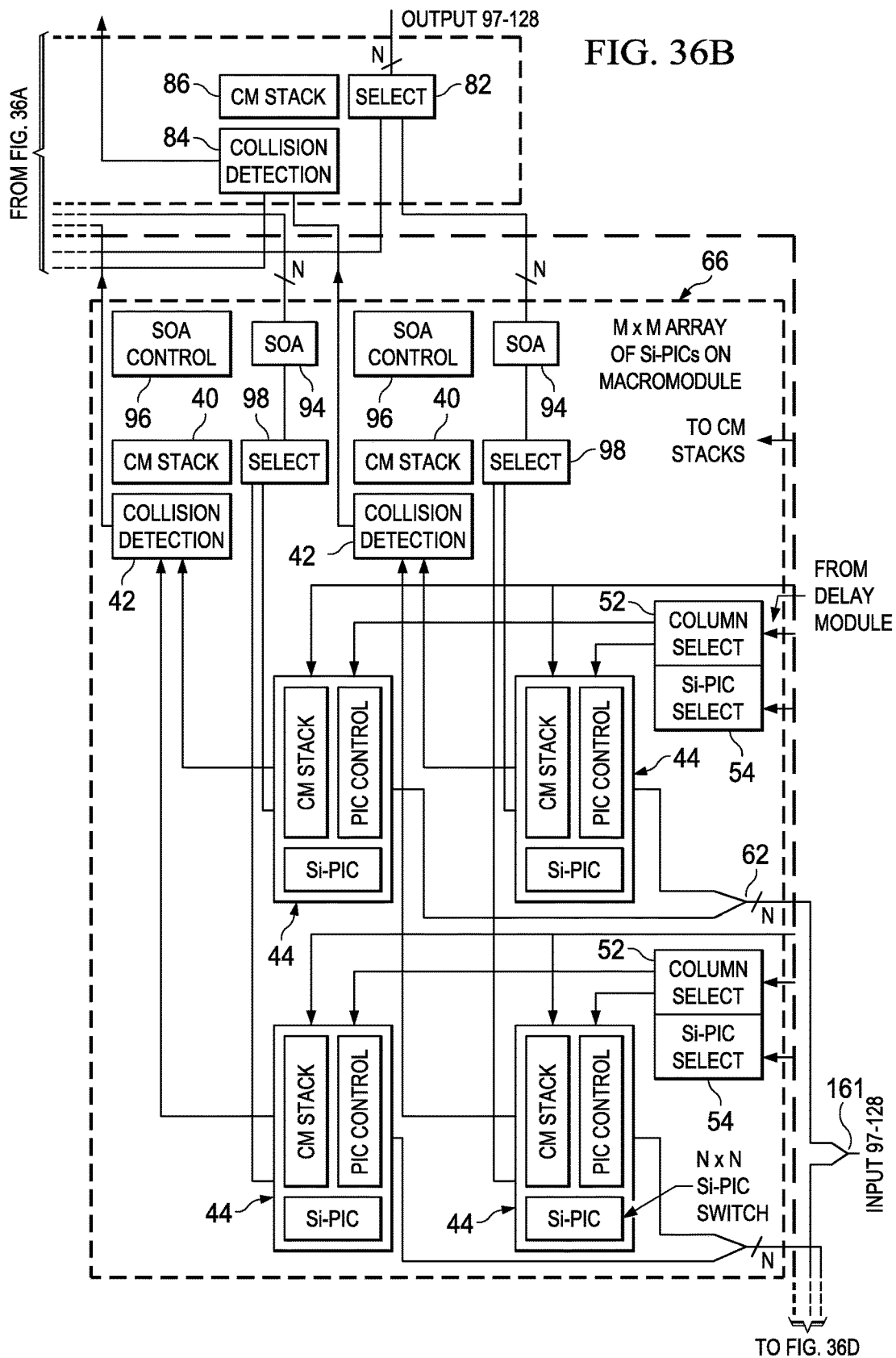
Figure 36C:
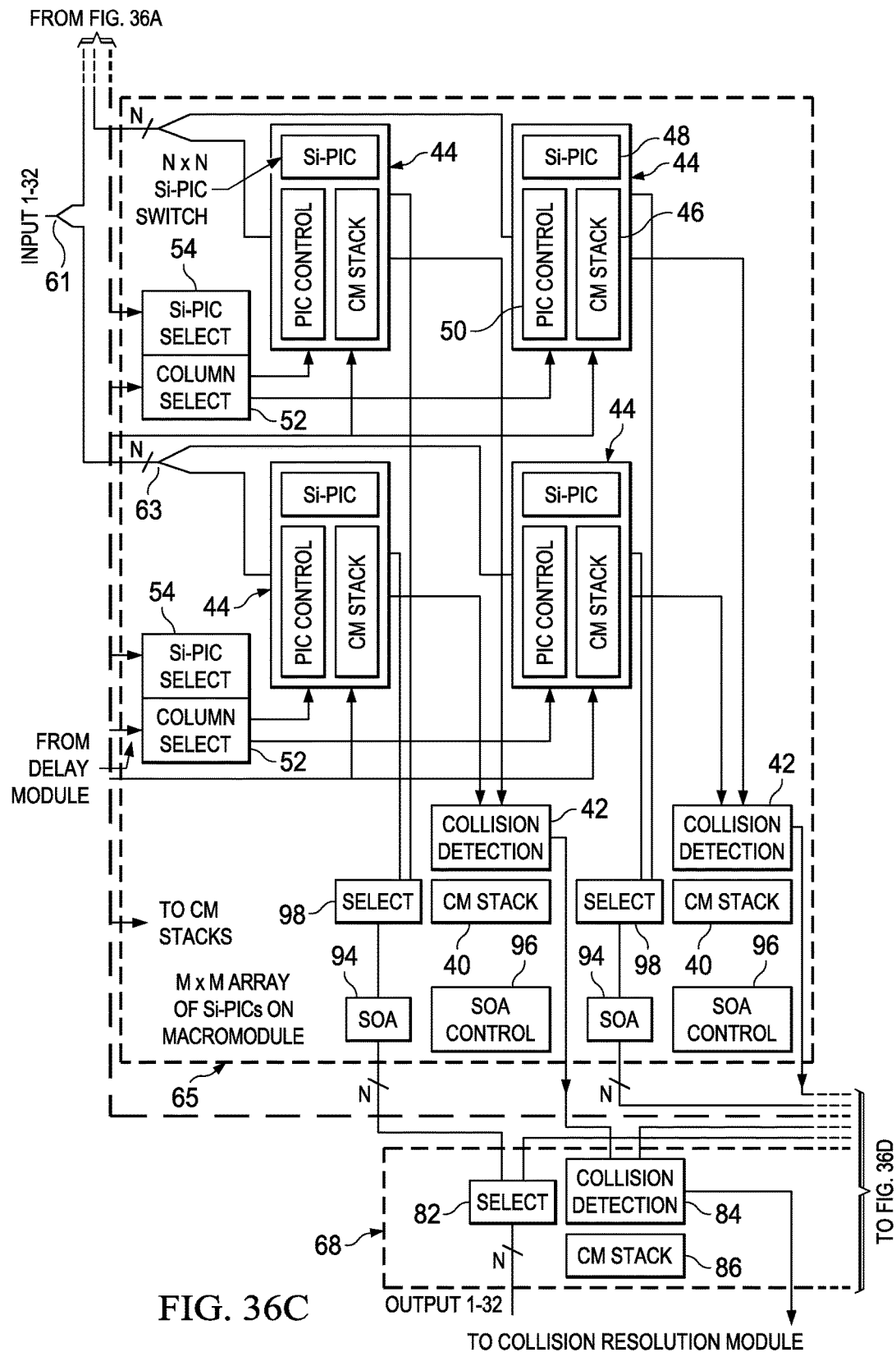
Figure 36D:
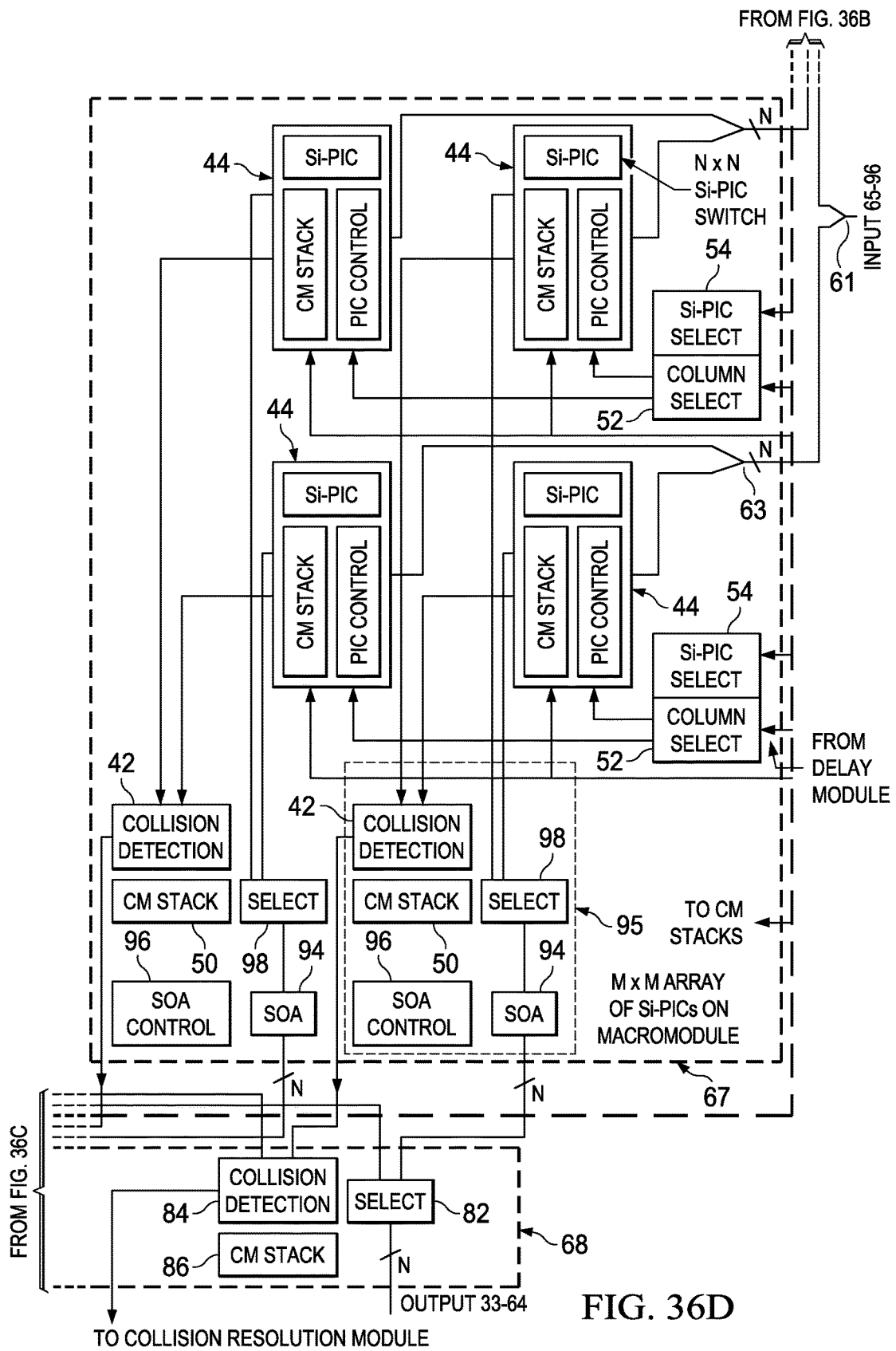

FIG. 36A0D illustrate an example photonic switching module using a similar multi-macromodule structure with a macromodule capacity gain of P=2, active switched output selection, and output contention resolution. FIGS. 36A-D illustrate photonic switch fabric 60, a macromodule based photonic switching structure which provides a scalable, fast, and directly controlled photonic switching structure which may be controlled by direct addressing and distributed contention resolution. In photonic switch fabric 60, array of macromodules 64 is a P×P array of macromodules. For a macromodule matrix size of P, $P^2$ macromodules are used. Because P=2, this is a 2×2 array with four macromodules 65, 66, 67, and 69. The inputs are split by power splitters 61 before reaching the macromodule, and again by power splitters 63 on the macromodules. A macromodule includes four PIC nodes 44, where a PIC node contains PIC 48, CM stack 46, and PIC controller 50. A macromodule also contains a set of selectors in the rows, with PIC selector 54 and column selector 52. Also, the macromodule contains a set of column collision detectors for each row, for example output block contention detection and resolution 95, containing collision detector 42, CM stack 40, and output selector 98. Also on the macromodules, for each output of each column, there is an SOA 94, which is part of an SOA array or SOA arrays, and is controlled by an SOA controller 96.

The CM stack writes an in-sequence list of the output port addresses to be used in a particular frame to the column collision (coll) detectors (det) 84, which identify when more than one PIC attempts to select the same output port in the same frame. The collision information is sent to the contention resolution block, which gates the rejected connections and generates rejection information for the collision detection resolution messaging block. Output block 68 and output block 62 each contain half of the N*M*P selectors 82, along with associated CM stack 86 and P port collision detection blocks 84. The NACKs and source addresses from both levels of collision detection are consolidated to override provisional ACKs. Contention is resolved between outputs of contending macromodules. Once the contention is resolved, the surviving addresses are written to the CM stack 40 associated with the appropriate output selectors (Sels) 98.

Additional details an ultrafast photonic switch are further discussed in U.S. patent application Ser. No. 14/710,815.

Figure 37A:
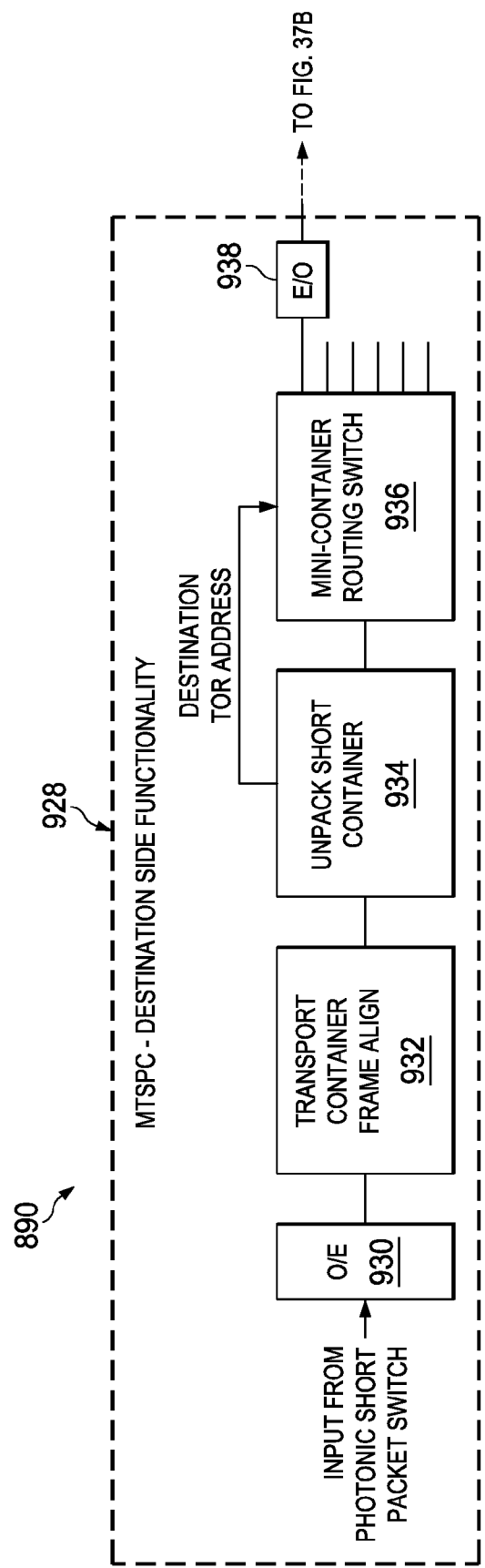
FIGS. 37A-B illustrate an embodiment destination side MTSPC and packet combiner.
Figure 37B:
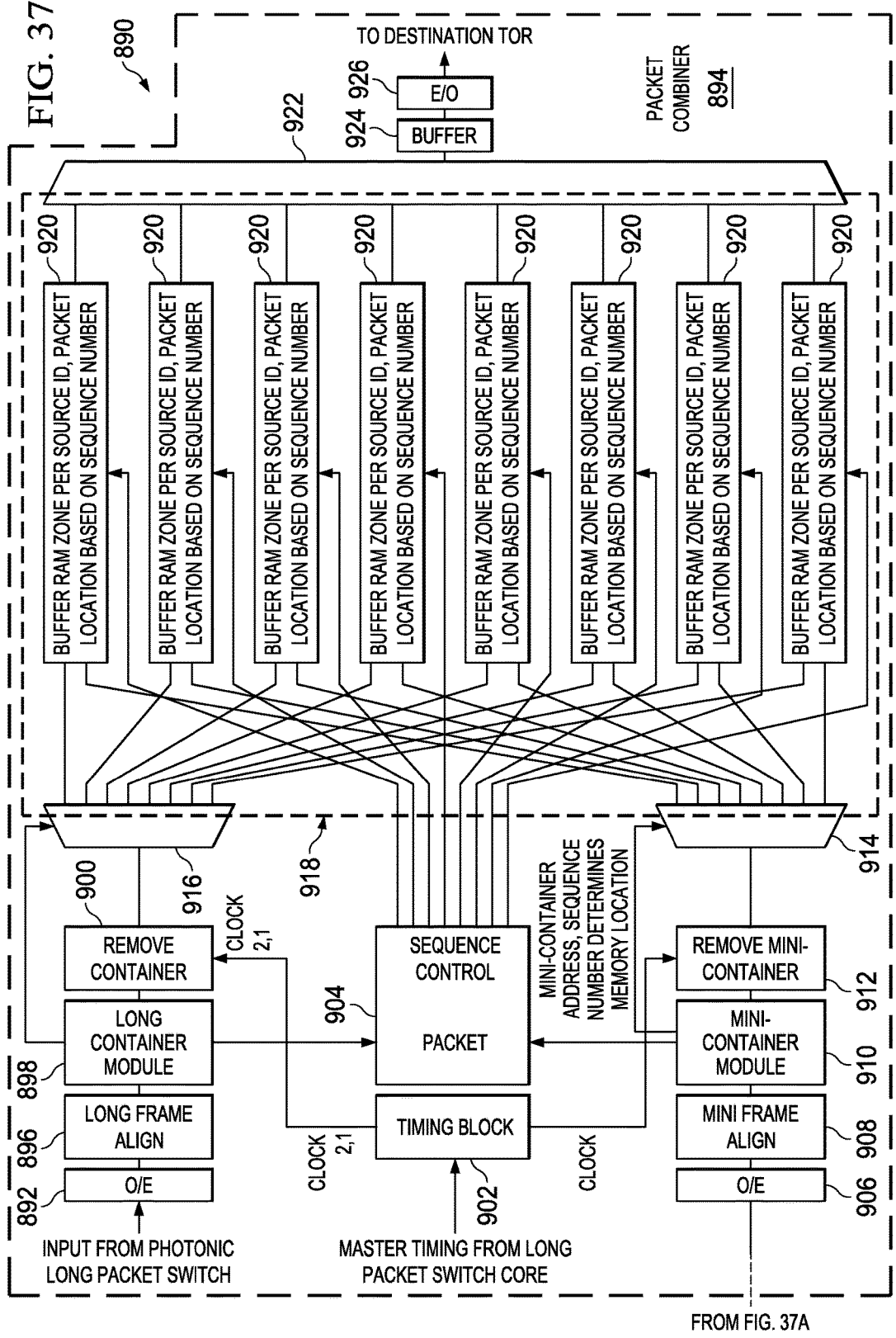

FIGS. 37A-B illustrate destination side MTSPC and packet combiner 890. There is one destination side MTSPC 928 per destination TOR group, and one packet combiner 894 per TOR. The packet combiner may be integrated in a TOR, or may be a stand-alone device. The short packet transport containers are terminated and distributed based on destination TOR number within a group by the destination side MTSPC. The packet combiner reintegrates the long and short packets of each source TOR packet flow to the specific destination TOR into a packet sequence integral stream, where the sequence of the packets is the same as the packet sequence of each of the flows at the packet splitter inputs. Thus, the packet flow has the same packet sequence at the destination TOR and the source TOR. The packet combiner de-containerizes long packets from long packet containers and short packets from mini-containers, and returns the packets to the initial clock rate by removing acceleration, if present. The functionality of the packet combiner may be implemented in hardware, software, or a combination of hardware and software, for example with software and a large fast memory. The packet combiner 894 may be integrated into a TOR or may be a standalone device.

The switched long packet photonic stream is received and converted from an optical stream to an electrical stream by O/E converter 892.

The long packet stream is fed into long frame aligner 896. In the frame aligner, the incoming long packet container frame start is detected, and its timing is adjusted to be aligned with the internal timing of the packet combiner. The timing is obtained in timing block 902 from the master timing, for example from the long packet switch core.

Information is extracted from the long container in long packet container module 898. The container CRC is checked for correct reception. The source TOR address and the sequence number of the packet payload are read and passed to demultiplexer/routing switch 916. Also, the sequence number and individual source TOR number are passed to packet sequence controller 904.

Demultiplexer/routing switch 916 establishes a connection to a memory zone specific to that source address, using both the source TOR group number and individual source TOR number, and a routing to a location in that memory zone that is specific to that packet sequence number and source TOR.

Meanwhile, the container is stripped by remove long packet container module 900. The packet is also decelerated to the destination TOR clock rate, which is derived from timing block 902. The packet is then written into the selected location in memory 918 by demultiplexer/routing switch 916. When a new source address starts streaming, a new zone is created.

A short packet transport container stream is received, and converted from an optical stream to an electrical stream by O/E converter 930.

The transport containers are frame aligned in transport container frame aligner 932 based on timing information from the system timers.

The mini-container payloads are read in unpack short container module 934. The encapsulated packets are read using the pointers to fragments in the payload, and placed in individual mini-containers with individual destination TOR numbers, which are used to route the mini-containers to the correct destination packet combiner. The mini-containers also contain the sequence numbers and individual source TOR number.

The mini-containers are directed to the appropriate destination TOR (or packet combiner) my mini-container routing switch 936.

The mini-containers are converted from an electrical signal to an optical signal in E/O converter 938 for transmission to the appropriate packet combiner (or destination TOR).

In packet combiner 894, the mini-container is converted from an optical signal to an electrical signal by O/E converter 906.

The mini-containers are then mini-frame aligned by mini-container frame aligner 908.

The mini-container information is extracted by mini-container module 910. The individual source TOR and destination TOR addresses are read, and passed to demultiplexer/routing switch 914 and to packet sequence controller 904.

The mini-container is then removed by remove mini-container module 912. The small packets are extracted from the mini-container. The packets are passed to demultiplexer/routing switch 914.

A connection is set up to route the packet to a specific location within the specific memory zones 920 in memory 918 determined by its sequence number and source TOR. The routing is performed by packet sequence controller 904, which also creates new zones in the memory as needed, and may remove dormant zones.

Packet sequence controller 904 builds up a table or list of the sequences in the source packet streams, and causes the packets associated with completed sequences to be read out in order of the sequence number, thereby restoring the same order as they were originally received in the source TORs.

The packet streams are statistically multiplexed by statistical multiplexer 922.

Then the packet streams are stored in buffer 924, which performs rate smoothing.

Finally, the packet streams are read out from buffer 924, and converted from electrical streams to optical streams by E/O converter 926. The optical streams are directed to the destination TOR.

Figure 38:
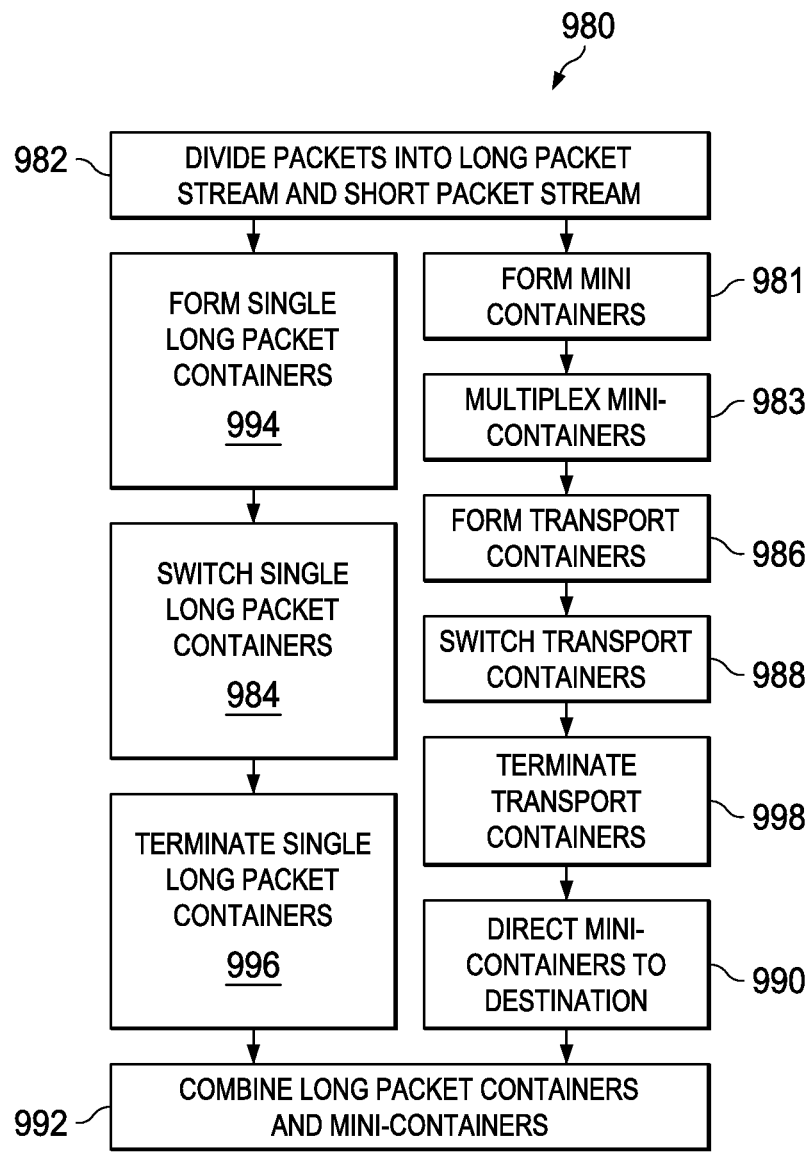
FIG. 38 illustrates a flowchart of an embodiment method of photonic packet switching.

FIG. 38 illustrates flowchart 980 for a method of switching single long-packet containers by one photonic switch and multiple short-packet containers by another photonic switch, where the short packets from multiple TORs in a TOR group are combined in a transport container. Initially, in step 982, the incoming packet stream is separated into a long packet stream and a short packet stream.

In step 994, single long packet containers are formed for the long packets, where each long packet has its own container. The long packet containers have a single long packet as a payload, and include information for reassembling the packet streams at the destination. The long packets may be padded to have equal length. A header and/or footer may be added.

In step 984, the long packet containers are switched by a photonic switch. The long packet containers are directed to the appropriate destination TOR. The long packet photonic switch may be a three stage Clos switch, a matrixed switch, or another large photonic switch.

In step 996, the single long packet containers are terminated. The long packets are extracted from the containers.

In step 981, mini-containers are formed from the short packets. Each short packet forms its own mini-container.

Then, in step 983, the mini-containers from multiple TORs in a TOR group are multiplexed.

The mini-containers are formed into transport containers in step 986. The mini-containers are transmitted to a source side MTSPC. The mini-containers from multiple TORs in a source TOR group which are destined for any TOR in a common destination TOR group may be combined in a transport container.

In step 988, the transport containers are switched by a short packet photonic switch. In one example, the short packet photonic switch is similar to the long packet photonic switch. Alternatively, the short packet photonic switch may be an ultra-fast photonic switch which switches shorter containers faster than the long packet photonic switch. The short packet photonic switch may have fewer ports than the long packet photonic switch.

The transport containers are terminated in step 998. The mini-containers are extracted from the transport containers.

In step 990, mini-containers from the transport structure are directed to the appropriate destination TOR in the destination TOR group. The mini-containers are removed from the transport structure and routed to the destination TOR based on the individual destination TOR number for the mini-container.

Finally, in step 992, the long packet container stream is combined with the short packet container stream. The packets are removed from the containers, and reassembled in the same sequence as they entered the packet splitter.

FIG. 39 illustrates flowchart 1000 for a method of separating long packets and short packets into separate container streams. Initially, in step 1002, packets are received. In one example, the packet splitter is a part of the source TOR, and the packets are received from other portions of the source TOR. In another example, the packet splitter is a separate device, and the packets are received from the source TOR.

Next, in step 1004 the packet addresses (source TOR address and destination TOR address) and length are determined. The packet length may be determined by measuring the packet. In one example, the packet address and length are known, for example when the packet splitter is integrated in a source TOR. In other examples, the source TOR address and/or destination TOR address may be extracted from the packet. The destination TOR address may be converted to the form of a destination TOR group number and an individual TOR number within the destination TOR group address, and the source TOR address may converted to the form of a source TOR group number and an individual source TOR number within the source TOR group.

Then, in step 1006, the packet splitter determines whether the packet is a long packet or a short packet. The packet length is compared to a threshold, which may be static or dynamic. For packets with a maximum length of 1500 bytes, the threshold may be between about 400 bytes and about 1000 bytes. When the packet is shorter than or equal to the threshold, it is determined to be a short packet, and when it is longer than the threshold it is determined to be a long packet. When the packet is a long packet, the packet splitter proceeds to steps 1008 and 1010. On the other hand, when the packet is a short packet, the packet splitter proceeds to step 1016.

In step 1008, the packet splitter requests a connection from a long packet photonic switch controller for a connection in the long packet photonic switch for a future timeslot. The connection request may be an optical signal to the long packet photonic switch controller.

Meanwhile, in step 1010, the packet is placed in a long packet container. The packet is padded to a predetermined size, for example 1500 bytes. A header and/or footer are added to the container. The header and/or footer contain the source TOR group number, individual source TOR number, destination TOR group number, individual destination TOR number, and sequence number for reassembly of the packet stream at the destination TOR. The header and/or footer may include other information, such as a CRC check and an indicator of the amount of padding added. Also, the clock rate of the container may be accelerated.

Then, in step 1012, the long packet container is transmitted to the long packet photonic switch for switching to the destination TOR. The packet splitter waits sufficient time for the connection to be set up in the long packet splitter, but does not necessarily wait for a NACK or an ACK, before transmitting the long packet container.

Also, in step 1014, the packet splitter stores the long packet container. The stored long packet container may later be used for retransmission, for example when a NACK is received in response to the connection request.

In step 1016, a mini-container is formed from the short packet. The mini-container includes the short packet payload, the sequence number for the short packet, and the individual source and destination TOR numbers within the source and destination TOR group.

In step 1018, mini-containers are transmitted from the packet splitter to a source side MTSPC.

Figure 40:
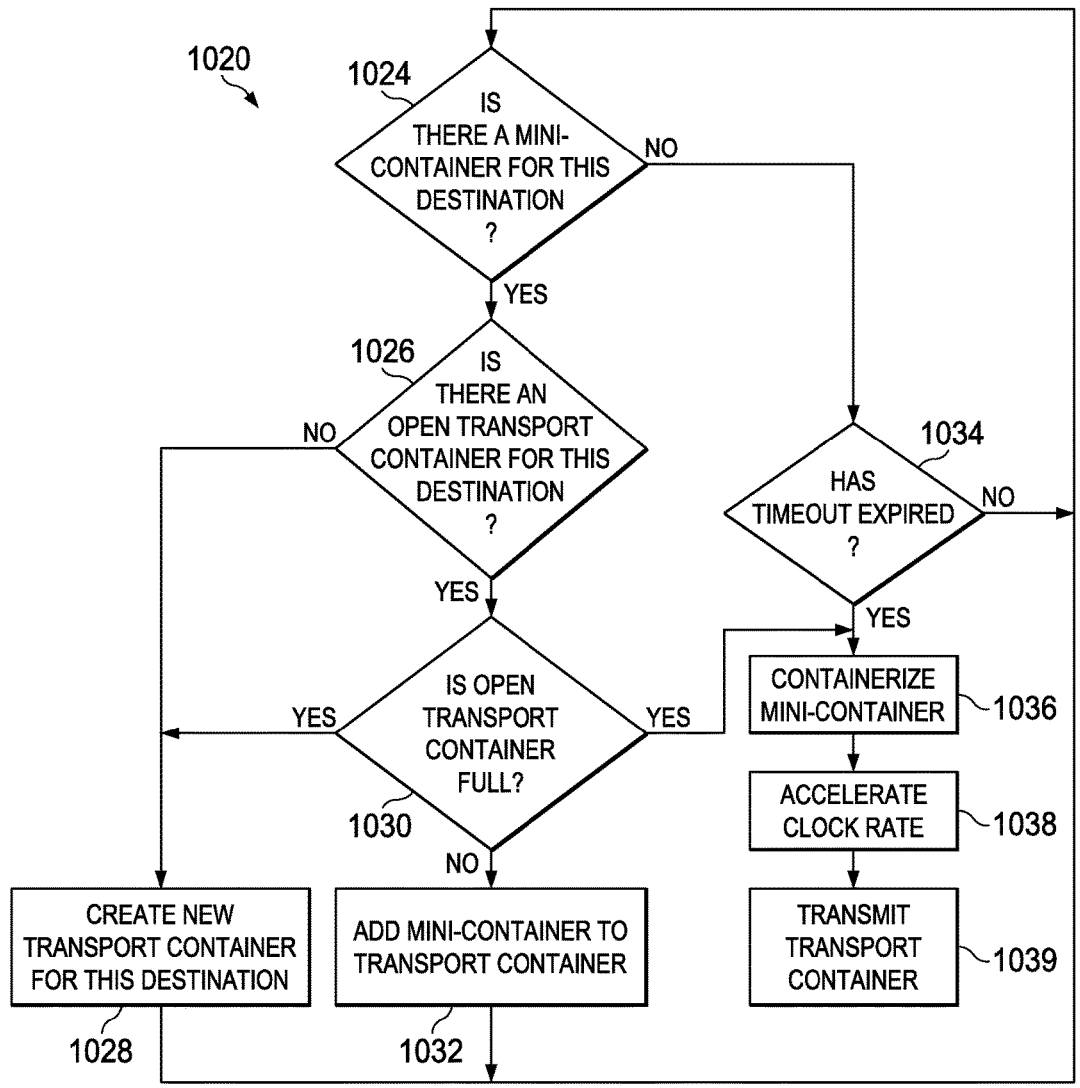
FIG. 40 illustrates a flowchart of an embodiment method of forming short packet transport containers.

FIG. 40 illustrates flowchart 1020 for a method of forming small packet transport containers. Initially, in step 1024, the source side MTSPC determines whether there is a new mini-container. The source side MTSPC may receive mini-containers from all of the packet combiners in the TOR group. When there is not a new mini-container, the source side MTSPC proceeds to step 1034. When there is a new mini-container, the source side MTSPC proceeds to step 1026.

In step 1026, the source side MTSPC determines whether there is an open transport container for the same destination TOR group as the new mini-container. When there is not an open transport container, the source side MTSPC proceeds to step 1028. On the other hand, when there is an open transport container, the source side MTSPC proceeds to step 1030.

In step 1028, the source side MTSPC opens a new transport container. The source side MTSPC may start a timer. If the timer expires before the container is filled, the new transport container will be transmitted irrespective of fill. Also, the source side MTSPC provides a connection request to the short packet photonic switch requesting a connection for a future timeslot for the newly opened transport container.

In step 1030, the packet splitter determines whether the open transport container is full. The open transport container is full when there is not sufficient room in the container payload for the new mini-container. When the transport container is not full, the mini-container is added to the transport container in step 1032, and the source side MTSPC proceeds to step 1024 to wait for new packets. When the transport container is full, the source side MTSPC opens a new container in step 1024. Also, when the container is full, the source side MTSPC proceeds to step 1036 to prepare for transmitting the transport container.

In step 1034, the source side MTSPC determines whether a timeout has occurred. For example, a timeout occurs a fixed period of time after a new container has been opened. The timeout may be 10 µs 5 µs, 3 µs, 2.5 µs, 2 µs, 1 µs, or another value. If a timeout has not occurred, the source side MTSPC returns to step 1024 to wait for a new packet. If a timeout has occurred, the source side MTSPC proceeds to step 1036.

In step 1036, the source side MTSPC containerizes the mini-containers. The mini-containers are loaded into the payload, including their sequence numbers, individual destination TOR number, and individual source TOR number. A header and/or footer are added to the transport container. The header and/or footer may include pointers to the packet boundaries in the payload, an indicator of the size of the pointer field, the source TOR group address, and the destination TOR group address. The header and/or footer may also include a CRC check, a preamble, and/or an end sequence. In another example, the packet payloads are extracted from mini-containers, or from multi-packet transport containers, and placed in the packet payload of the transport container. Some or all of the packet information, such as the sequence numbers, destination TOR numbers, and individual TOR numbers are placed in the header. In an additional example, the packet payload is transmitted separately from the other packet information.

In step 1038, the clock rate of the container is accelerated. This may be done, for example, by writing the container into a buffer at an input clock rate, and reading the container out of the buffer at an output clock rate, where the output clock rate is greater than the input clock rate. The buffer may tend towards underflow. When underflow occurs, a dummy packet may be written to the buffer, and read out.

Finally, in step 1039, the transport container is transmitted to the short packet photonic switch. The clock rate timing of the container transmission is controlled so it arrives at the short packet photonic switch at the correct time. Output clocking may be used to control the timing. Also, timing control information received from the long packet photonic switch controller may be used to control the timing further.

FIG. 41 illustrates flowchart 1040 for a method of directing mini-containers from a short packet transport container towards a specific TOR within a TOR group. This may be done, for example, in a destination side MTSPC. There may be one destination side MTSPC per TOR group. The transport containers are received, for example, from a short packet photonic switch. Initially, in step 1042, the transport containers are aligned. Master timing from the long packet photonic switch, or from another source, such as the short packet photonic switch, may be used to align the transport containers.

Next, in step 1044, the mini-containers are unwrapped from the short packet container. The header and/or footer are removed. In one example, pointers to the packet boundaries are used to extract the mini-containers, along with their corresponding sequence numbers, specific destination TOR address, and specific source TOR address. In another example, the packets are extracted from the payloads, and other packet information is extracted from the header and/or footer.

Finally, in step 1046, the mini-packets are routed to their specific destination TOR or packet combiner based on the individual destination TOR number. This may be done, for example, by an electrical routing switch.

FIG. 42 illustrates flowchart 1050 for a method of combining packet streams, for example a short packet stream and a long packet stream. Packets of a stream of long packets may be combined with packets of a stream of short packets in a packet combiner. In one example, the packet combiner is integrated in a destination TOR. Alternatively, the packet combiner may be a stand-alone device. The packets may be combined to re-establish the original packet order from the source TOR.

In step 1052, the mini-containers are received and aligned. These mini-containers are received from the destination side MTSPC. Master timing from the long packet photonic switch, or from another source, such as the short packet photonic switch, may be used to align the packet containers.

Next, in step 1054, the containerization is removed from the mini-containers. The header and/or footer are removed, and the short packets are extracted. Also, the short packets may be decelerated. The short packets may be read into a buffer at a first clock rate, and read out at a second clock rate, where the second clock rate is lower than the first clock rate. The decelerated packets may have the same clock rate that they originally had before acceleration in the packet splitter.

Then, in step 1056, the short packets are stored in memory. The stored packets are organized by source TOR and sequence number. For example, for each source TOR, the packets may be stored in the order of their sequence number.

Meanwhile, long packet containers are received and aligned in step 1058. These long packet containers are received from the long packet photonic switch. Master timing from the long packet photonic switch, or from another source, such as the short packet photonic switch, may be used to align the packet containers.

Next, in step 1060, the containerization is removed from the long packet containers. The header and/or footer are removed, and the long packets are extracted. Also, the long packets may be decelerated. The long packets may be read into a buffer at a first clock rate, and read out at a second clock rate, where the second clock rate is lower than the first clock rate. The decelerated packets may have the same clock rate that they originally had before acceleration in the packet splitter.

Then, in step 1062, the long packets are stored in memory. The stored packets are organized by source TOR and sequence number. For example, for each source TOR, the packets are stored in the order of their sequence number.

Finally, in step 1064, the packets are read out of the mini-container in sequence number order. Thus, the packets are returned to their original order. Also, missing packets may be detected, when there is no packet in the memory for a given sequence number. When a packet is missing, the packet combiner may request that the missing packet be retransmitted by the packet combiner.

An embodiment method includes receiving a first packet payload, and where the first packet payload originates from a first top-of-rack switch (TOR) and receiving a second packet payload, where the second packet payload originates from a second TOR. The method also includes placing the first packet payload in a transport container and placing the second packet payload in the transport container. Additionally, the method includes transmitting the transport container to a photonic switch.

In another embodiment, receiving the first packet payload includes receiving a first mini-container, where the first mini-container includes the first packet payload, where receiving the second packet payload includes receiving a second mini-container, where the second mini-container includes the second packet payload. This method may also include that the first TOR and the second TOR are in a first TOR group, where the first mini-container is addressed to a third TOR in a second TOR group, and where the second mini-container is addressed to a fourth TOR in an individual destination TOR number and an individual source TOR number. In an additional example, the first mini-container further includes a sequence number.

An embodiment also includes generating a transport container header and placing the transport container header in the transport container. In an embodiment, the transport container header includes a source TOR group number and a destination TOR group number.

An embodiment photonic switching system including a first photonic switching fabric having a first plurality of input ports, each of the first plurality of input ports coupled to one of a plurality of top-of-rack switches (TORs) and a second photonic switching fabric having a second plurality of input ports, each of the second plurality of input ports coupled to a TOR group, each TOR group including a subset of the plurality of TORs.

The photonic switching system of claim 8, where the first photonic switching fabric is configured to receive a plurality of long packet container streams on the first plurality of input ports from the plurality of TORs, and where the second photonic switching fabric is configured to receive a plurality of short packet transport container streams on the second plurality of input ports from each TOR group.

In an embodiment, the plurality of long packet streams includes a first long packet container, where the plurality of short packet streams includes a first transport container, where the first long packet container has a first length, where the first transport container has a second length, and where the first length is greater than the second length. In an embodiment, the second photonic switching fabric includes a directly addressable switch. In another embodiment, the second photonic switching fabric is an ultrafast photonic switching structure configured to switch containers of the plurality of short packet transport containers. In an embodiment, the second photonic switching fabric is configured to switch the containers of the plurality of short packet transport containers at a frame length of less than 60 ns. In an embodiment, the second photonic switching fabric is configured to switch the containers of the plurality of short packet transport containers at a frame length of less than 40 ns.

In another embodiment, the first photonic switch has a third plurality of output ports, where the second photonic switch has a fourth plurality of output ports, and where a number of the third plurality of output ports is greater than a number of the fourth plurality of output ports.

In an additional embodiment, a number of the first plurality of input ports is four times a number of the second plurality of input ports.

In another embodiment, a number of the first plurality of input ports is eight times a number of the second plurality of input ports An embodiment method includes receiving a transport container, where the transport container contains a first packet payload and a second packet payload and extracting the first packet payload from the transport container. The method also includes extracting the second packet payload from the transport container and routing the first packet payload to a first top-of-rack switch (TOR). Additionally, the method includes routing the second packet payload to a second TOR.

In an embodiment, the transport container further includes a pointer field including a first pointer, where the first pointer indicates a boundary of the first packet payload and a pointer field size indicator, where the pointer field size indicator indicates a size of the pointer field.

An additional embodiment also includes aligning the transport container to a plurality of transport containers from a plurality of TORs.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method comprising:
   receiving a first mini-container comprising a first packet payload having a first packet length less than a packet length threshold, wherein the first packet payload originates from a first top-of-rack switch (TOR);
   receiving a second mini-container comprising a second packet payload having a second packet length less than the packet length threshold, wherein the second packet payload originates from a second TOR;
   placing the first packet payload in a transport container, wherein the transport container comprises a transport container header;
   placing the second packet payload in the transport container; and
   transmitting the transport container to a photonic switch.

2. The method of claim 1, wherein the first TOR and the second TOR are in a first TOR group, wherein the first mini-container is addressed to a third TOR in a second TOR group, and wherein the second mini-container is addressed to a fourth TOR in the second TOR group.

3. The method of claim 1, wherein the first mini-container further comprises:
   an individual destination TOR number; and
   an individual source TOR number.

4. The method of claim 1, wherein the first mini-container further comprises a sequence number.

5. The method of claim 1, further comprising:
   generating the transport container header; and
   placing the transport container header in the transport container.

6. The method of claim 5, wherein the transport container header comprises:
   a source TOR group number; and
   a destination TOR group number.

7. A photonic switching system comprising:
   a first photonic switching fabric having a first plurality of input ports, each of the first plurality of input ports coupled to one of a plurality of top-of-rack switches (TORs), the first photonic switching fabric configured to receive a plurality of long packet container streams on the first plurality of input ports from the plurality of TORs, wherein long packet containers in the long packet container streams contain long packets having packet lengths greater than or equal to a packet length threshold; and
   a second photonic switching fabric having a second plurality of input ports, each of the second plurality of input ports coupled to a TOR group, the second photonic switching fabric configured to receive a plurality of short packet transport container streams on the second plurality of input ports from each TOR group, each TOR group including a subset of the plurality of TORs, each TOR group including more than one of the TORs, a number of the first plurality of input ports being greater than a number of the second plurality of input ports, and short packet transport containers in the short packet transport container streams containing short packets having packet lengths less than the packet length threshold.

8. The photonic switching system of claim 7, wherein the plurality of long packet container streams comprises a first long packet container, wherein the plurality of short packet transport container streams comprises a first short packet transport container, wherein the first long packet container has a first length, wherein the first short packet transport container has a second length, and wherein the first length is greater than the second length.

9. The photonic switching system of claim 8, wherein the second photonic switching fabric comprises a directly addressable switch.

10. The photonic switching system of claim 7, wherein the second photonic switching fabric is an ultrafast photonic switching structure configured to switch containers of the plurality of short packet transport container streams.

11. The photonic switching system of claim 10, wherein the second photonic switching fabric is configured to switch the containers of the plurality of short packet transport container streams at a frame length of less than 60 ns.

12. The photonic switching system of claim 11, wherein the second photonic switching fabric is configured to switch the containers of the plurality of short packet transport container streams at a frame length of less than 40 ns.

13. The photonic switching system of claim 7, wherein the first photonic switching fabric has a third plurality of output ports, wherein the second photonic switching fabric has a fourth plurality of output ports, and wherein a number of the third plurality of output ports is greater than a number of the fourth plurality of output ports.

14. The photonic switching system of claim 7, wherein the number of the first plurality of input ports is four times the number of the second plurality of input ports.

15. The photonic switching system of claim 7, wherein the number of the first plurality of input ports is eight times the number of the second plurality of input ports.

16. A method comprising: receiving a transport container, wherein the transport container contains a transport container header, a first packet payload and a second packet payload; extracting the first packet payload from the transport container; placing the first packet payload in a first mini-container, wherein the first packet payload has a first packet length less than a packet length threshold; extracting the second packet payload from the transport container; placing the second packet payload in a second mini-container, wherein the second packet payload has a second packet length less than the packet length threshold; routing the first packet payload to a first top-of-rack switch (TOR); and routing the second packet payload to a second TOR; wherein the transport container further comprises: a pointer field comprising a first pointer, wherein the first pointer indicates a boundary of the first packet payload; and a pointer field size indicator, wherein the pointer field size indicator indicates a size of the pointer field.

17. The method of claim 16, further comprising aligning the transport container to a plurality of transport containers from a plurality of TORs.

18. A method comprising:
obtaining a first packet;
determining the first packet is a long packet;
placing the first packet in a long packet container;
obtaining a second packet;
determining the second packet is a short packet;
placing the second packet in a mini-container, wherein the mini-container comprises the second packet, a sequence number, an individual source top-of-rack switch (TOR) number, and an individual destination TOR number, and wherein the mini-container contains only one packet; and
transmitting, to a source side multi-TOR short packet containerizer (MTSPC), the mini-container.

19. The method of claim 18, wherein the long packet container comprises:
a destination TOR group number;
a second individual destination TOR number;
a source TOR group number; and
a second individual source TOR number.

20. The method of claim 18, further comprising receiving the first and second packets from a same source TOR.

21. The method of claim 18, further comprising transmitting the long packet container to a long packet photonic switching fabric.

22. A method comprising:
receiving, by a packet combiner from a destination side multi-top-of-rack switch (TOR) short packet containerizer (MTSPC), a mini-container, wherein the mini-container comprises a short packet, a first individual source TOR number, and a first sequence number, and wherein the mini-container contains only one packet;
extracting the short packet from the mini-container;
storing the short packet in a first location in memory in accordance with the first individual source TOR number and the first sequence number;
receiving, by the packet combiner from a photonic switch, a long packet container, wherein the long packet container comprises a long packet, a second individual source TOR number, and a second sequence number;
extracting the long packet from the long packet container;
storing the long packet in a second location in memory in accordance with the second individual source TOR number and the second sequence number; and
reading out the short packet and the long packet in accordance with the first and second locations in memory, respectively.

23. The method of claim 22, wherein the mini-container further comprises a first individual destination TOR number, and wherein the long packet container further comprises:
a destination TOR group number;
a source TOR group number; and
a second individual source TOR number.

24. The method of claim 22, further comprising receiving a plurality of mini-containers from the destination side MTSPC, each of the plurality of mini-containers comprising a respective single short packet.

25. The method of claim 22, further comprising, after the reading out, directing the short packet and the long packet to a same destination TOR.

* * * * *